United States Patent
Ueda et al.

(10) Patent No.: US 6,217,473 B1
(45) Date of Patent: Apr. 17, 2001

(54) TOROIDAL CONTINUOUSLY VARIABLE TRANSMISSION

(75) Inventors: Kazuhiko Ueda; Tatsuya Uesugi; Hidenao Takedomi; Hisanori Nakane, all of Hiroshima-ken (JP)

(73) Assignee: Mazda Motor Corporation, Hiroshima-Ken (JP)

( * ) Notice: Subject to any disclaimer, the term of this patent is extended or adjusted under 35 U.S.C. 154(b) by 0 days.

(21) Appl. No.: 09/194,163

(22) PCT Filed: Mar. 23, 1998

(86) PCT No.: PCT/JP98/01228

§ 371 Date: Aug. 9, 1999

§ 102(e) Date: Aug. 9, 1999

(87) PCT Pub. No.: WO98/43002

PCT Pub. Date: Oct. 1, 1998

(30) Foreign Application Priority Data

Mar. 22, 1997 (JP) .................................................. 9-087775

(51) Int. Cl.[7] ................................................. F16H 37/02
(52) U.S. Cl. ............................................. 475/216; 477/41
(58) Field of Search .................................. 475/208, 215, 475/216, 218; 477/41

(56) References Cited

U.S. PATENT DOCUMENTS

| | | | |
|---|---|---|---|
| 4,872,371 | * 10/1989 | Fellows | 475/216 |
| 5,090,951 | * 2/1992 | Greenwood | 475/216 |
| 5,213,011 | * 5/1993 | Mobumoto et al. | 475/216 |
| 5,707,311 | * 1/1998 | Kim | 475/216 |
| 5,820,510 | * 10/1998 | Ueda et al. | 475/216 |
| 5,888,160 | * 3/1999 | Miyata et al. | 475/216 |

FOREIGN PATENT DOCUMENTS

| | | |
|---|---|---|
| 0 271 343 A1 | 6/1988 | (EP) . |
| 12-16160 | 8/1989 | (JP) . |
| 42-19557 | 8/1992 | (JP) . |
| 61-01754 | 4/1994 | (JP) . |
| WO 94/04849 | 3/1994 | (WO) . |

OTHER PUBLICATIONS

European Search Report for Application No. EP 98909806.6 dated Apr. 1, 1999.

* cited by examiner

*Primary Examiner*—Sherry Estremsky
(74) *Attorney, Agent, or Firm*—Sidley & Sutin; Hugh A. Abrams

(57) ABSTRACT

The object of the present invention is to provide compact toroidal type continuously variable transmission for a front engine front wheel drive vehicle, which employs geared neutral starting system. The toroidal type continuously variable transmission according to the present invention comprises an input shaft 11 whose one end is coupled with an engine, a primary shaft 12 into which said input shaft is fittingly inserted with play, a secondary shaft 13 which is disposed parallel with said shafts and whose engine side end is coupled with a differential gear unit 5, toroidal type continuously variable transmission mechanisms 20, 30 which are disposed on said primary shaft 12, a planetary gear mechanism 50 which is disposed on said secondary shaft 13, a low mode gear train 80 for coupling the input shaft 11 with a carrier 51 of the planetary gear mechanism 50, and a high mode gear train 90 for coupling a sun gear 52 with an output disk 34 of the continuously variable transmission mechanisms 20, 30, wherein said low mode gear train 80 is disposed on an opposite side end, with respect to the engine, of the input shaft 11.

8 Claims, 31 Drawing Sheets

| | DOWNWARD STEEP ← INCLINE → MILD ANGLE | | | | | FLAT | UPWARD MILD ← INCLINE → STEEP ANGLE | | | | |
|---|---|---|---|---|---|---|---|---|---|---|---|
| k | k1 | k2 | k3 | k4 | k5 | k0 | k6 | k7 | k8 | k9 | k10 |
| Tcd | 0 | 0 | 0 | 0 | 0 | 0 | Tcd1 | Tcd2 | Tcd3 | Tcd4 | Tcd5 |
| Prf | 0 | 0 | 0 | 0 | 0 | 0 | Prf1 | Prf2 | Prf3 | Prf4 | Prf5 |
| Tcd1<Tcd2<Tcd3<Tcd4<Tcd5 Prf0>Prf1>Prf2>Prf3>Prf4>Prf5 | | | | | | | | | | | |

TOROIDAL CONTINUOUSLY VARIABLE TRANSMISSION

BACKGROUND OF THE INVENTION

The present invention relates to a toroidal type continuously variable transmission, in particular, to a structure of continuously variable transmission for a front engine front wheel drive vehicle employing a geared neutral starting system.

DESCRIPTION OF THE PRIOR ART

A toroidal type continuously variable transmission, which continuously changes a speed ratio of power transmission between an input disk and an output disk by interposing a roller for making the power transmission between both disks and by rotating this rotor with a variable inclination angle so as for contact points thereof with each of said both disks to be changed in a radial direction respectively, is now being introduced into practical use as a continuously variable transmission for automobile, and, as shown, for example, in the official gazette of Japanese Patent Un-examined Publication No. 6-101754, a geared neutral starting system has been proposed to use in this type continuously variable transmission.

In this system, the continuously variable transmission mechanism having the structure described above is disposed on a first shaft coupled with an engine, and a planetary gear mechanism comprising three rotary elements, that is, a sun gear, an internal gear, and a pinion carrier for supporting a planetary pinion engaging with these both gears, is also disposed on a second shaft which is parallel with the first shaft, wherein a revolution of the engine is transmitted to the first rotary element directly, and to the second rotary element through the continuously variable transmission mechanism mentioned above and the third rotary element is made to be a power output element.

A neutral condition is realized by controlling the speed ratio of the continuously variable transmission mechanism so that a ratio of input rotation speeds between the first and the second rotary elements of the planetary gear mechanism is controlled so as to stop the third rotary element, and, starting form this condition, the third rotary element, which is the power output element, is rotated in the forward or the reverse direction by increasing or decreasing the speed ratio of the continuously variable transmission mechanism.

This system allows the vehicle to be started without using a clutch, a torque converter and the like, and this improves a response in starting and an efficiency of power transmission.

When above mentioned geared neutral system is employed, two power transmission paths are necessary, one of which transmits the power from the first shaft side to the planetary gear mechanism on the second shaft without interposing the continuously variable transmission mechanism therebetween, and the other of which transmit the power from the first shaft side to the planetary gear mechanism through the continuously variable transmission mechanism, and therefore, in the continuously variable transmission disclosed in the above official gazette, the latter power transmission path is provided in the middle of a tandem type transmission gear mechanism and the former power transmission path which builds up a gear train for a low mode reduction gear system is provided in the engine side of the continuously variable transmission mechanism.

In this type of structure, however, especially in the transmission for the front engine front wheel drive vehicle, there occurs problems as below.

That is, in the transmission for the front engine front wheel drive vehicle, as shown in FIG. 3 of the above gazette, a differential gear unit is generally connected to an engine side end of the second shaft (, which is an output shaft of a transmission unit) on which the planetary gear mechanism is disposed, so that, in this case, the gear train for directly transmitting the power from the first shaft side to the planetary gear mechanism on the second shaft must be disposed near by the differential gear unit having a large diameter. Accordingly, in order to avoid an interference between the gear train and the differential gear unit, they must be placed with some distance therebetween with respect to the shaft direction, which increases the size of the transmission along the shaft direction. Especially in the front engine front wheel drive vehicle which has a shaft line of the engine and the transmission disposed laterally with respect to the vehicle center line, the increased size in this shaft line direction makes a mounting operation to a vehicle body as well as a layout design of the engine and the transmission difficult.

Accordingly, the object of the present invention is to increase an allowance for the layout and the mounting operation to the vehicle body of the toroidal type continuously variable transmission of the front engine front wheel drive vehicle employing the geared neutral starting system by controlling the increase of the size in the shaft direction.

SUMMARY OF THE INVENTION

In order to solve the problem mentioned above, the present invention is characterized by the constitution described below.

In an invention claimed in claim 1 of the present invention (hereafter referred to as the first invention), a first shaft engaged with an engine on one end thereof and a second shaft disposed parallel with said first shaft and engaged, on an engine side end thereof, with a differential gear unit for driving a left and a right driven wheel are provided, and on said first shaft is disposed a toroidal type continuously variable transmission mechanism comprising an input disk coupled with said first shaft, an output disk disposed in the engine side of said input disk and rotatably supported by the first shaft, a roller interposed between these disks for transmitting a power between both disks, and a contact point control member for changing a speed ratio between both disks by inclinably and rotatably supporting said roller and thereby changing the contact point between said roller and each of the input and the output disks, and on said second shaft is disposed a planetary gear mechanism comprising three rotary elements, that is, a sun gear, an internal gear and a pinion carrier, wherein, among these rotary elements, the first element is coupled with the output disk of the continuously variable transmission mechanism so as to rotate together with it and the second element is coupled with the second shaft.

Above described system is characterized in that a gear train comprising a first gear disposed on the opposite side with respect to the engine of the continuously variable transmission mechanism mounted on the first shaft so as to rotate together with said first shaft, a second gear rotatably supported on the opposite side with respect to the engine of the planetary gear mechanism mounted on the second shaft, and an idle gear which is engaged with these gears to transmit a power between both gears is further provided, and furthermore a first clutch mechanism for engaging or disengaging the second gear of this gear train with the third element of the planetary gear mechanism, a second clutch mechanism for engaging or disengaging the output disk of the continuously variable transmission mechanism with the second shaft, and a control means for controlling operations of said first and said second shaft, and a control means for controlling operations of said first and said second clutch mechanism and the contact point control member are provided.

Preferably, a vehicle speed detecting means is further provided, and said control means is characterized in that it controls said first clutch so as to engage said second gear with said third element and at the same time controls said second clutch so as to intercept said power transmission path while the vehicle speed being lower than a predetermined vehicle speed, and controls the first clutch so as to intercept the engagement between the second gear and the third element and at the same time controls the second clutch so as to engage the power transmission path while the vehicle speed being higher than said predetermined vehicle speed.

In addition, an engine load detector is preferably provided so that said predetermined speed is increased as the engine load increases.

In another aspect of the invention, adding to a first continuously variable transmission mechanism comprising the input disk coupled with the first shaft, the output disk disposed in the engine side of said input disk and rotatably supported by the first shaft, the roller interposed between these disks, and the contact point control member for changing the contact point between said roller and the respective disks, the toroidal type continuously variable transmission mechanism further comprises a second continuously variable transmission mechanism comprising a second output disk disposed on the engine side of the output disk of the first continuously variable transmission mechanism and rotatably supported by the first shaft, a second input disk disposed on the engine side of said output disk and coupled with the first shaft, a second roller interposed between these disks, and a second contact point control member for changing the contact point between said roller and the respective disks.

The toroidal type continuously variable transmission mechanism described above is characterized in that the output disk of the first continuously variable transmission mechanism and the output disk of the second continuously variable transmission mechanism are integrated into one unit and a gear is formed on an outer surface of said integrated output disk unit for interlocking and rotating said integrated output disk and the first element of the planetary gear mechanism with each other.

In further aspect of the invention, same as the second invention described above, adding to said first continuously variable transmission mechanism comprising the input disk coupled with the first shaft, the output disk disposed in the engine side of said input disk and rotatably supported by the first shaft, the roller interposed between these disks, and the contact point control member for changing the contact point between said roller and the respective disks, the toroidal type continuously variable transmission mechanism further comprises the second continuously variable transmission mechanism comprising the second output disk disposed on the engine side of the output disk of the first continuously variable transmission mechanism and rotatably supported by the first shaft together with said output disk integrally, the second input disk disposed on the engine side of said output disk and coupled with the first shaft, the second roller interposed between these disks, and the second contact point control member for changing the contact point between said roller and the respective disks.

The toroidal type continuously variable transmission mechanism described above is characterized in that said first shaft is inserted into a through-hole formed in a third shaft to dispose each of the input side disks and the output side disks of said first and said second continuously variable transmission mechanisms on said third shaft, wherein one end of said third shaft is supported by a transmission case through a bearing and onto the other end thereof is fitted into a first gear of a gear train, said first gear being supported by the transmission case through a bearing, and further a spring member is interposed in the fitting portion between said third shaft and the first gear to absorb relative displacement therebetween in the shaft line direction.

In still further aspect of the invention, same as the third invention described above, adding to said first continuously variable transmission mechanism comprising the input disk coupled with the first shaft, the output disk disposed in the engine side of said input disk and rotatably supported by the first shaft, the roller interposed between these disks, and the contact point control member for changing the contact point between said roller and the respective disks, the toroidal type continuously variable transmission mechanism further comprises the second continuously variable transmission mechanism comprising the second output disk disposed on the engine side of the output disk of the first continuously variable transmission mechanism and rotatably supported by the first shaft, the second input disk disposed on the engine side of said output disk and coupled with the first shaft, the second roller interposed between these disks, and the second contact point control member for changing the contact point between said roller and the respective disks.

The toroidal type continuously variable transmission mechanism described above is characterized in that said first shaft is inserted into a through-hole formed in a third shaft to rotatably support both output disks of the first and the second continuously variable transmission mechanisms integrally with each other on the middle of said third shaft, and, on an opposite side, with respect to the engine, and on the engine side of said both disks, input disks of the first and the second continuously variable transmission mechanisms are disposed on and are engaged with said third shaft respectively, wherein a loading mechanism for pressing the roller by and between the input and the output disks in the first and the second continuously variable transmission mechanisms is provided between the input disk of the first continuously variable transmission mechanism and the first gear of the gear train disposed on the opposite side thereof with respect to the engine.

In yet further aspect of the invention, the toroidal type continuously variable transmission mechanism is characterized in that the loading mechanism comprises a pair of disks whose surfaces facing with each other are formed into cam surfaces having circumferential concave and convex and a roller which is interposed between both disks to generate axial force between them by the relative rotation therebetween, and a pin member is interposed between the first gear of the gear train and the disk located in said first gear side to integrally rotate them, wherein said pin member is disposed in a portion where a thickness of the disk located in said first gear side is rather thicker due to the concave and convex figures thereof.

Further, in the first invention described above, two oil channels for supplying the first clutch mechanism and the second clutch mechanism with a coupling fluid respectively are provided in the second shaft, wherein said both oil channels may be led from a side portion where a hydraulic pressure source is provided.

According to the structure described above, following operations may be achieved.

First, when the first clutch mechanism is engaged, that is, the second gear of the gear train is engaged with the third element of the planetary gear mechanism, and the second clutch mechanism is disengaged, that is, the output disk of the continuously variable transmission mechanism is disengaged from the second shaft, the revolution inputted from the engine into the first shaft is inputted from said first shaft through the gear train and the first clutch mechanism into the third element of the planetary gear mechanism disposed on the second shaft and is also transmitted from the input disk through the roller to the output disk in the continuously variable transmission mechanism on the first shaft and then is inputted form said output disk into the first element of said planetary gear mechanism.

At that time, if the speed ratio of the continuously variable transmission mechanism is appropriately controlled by the control means through the contact point control member so that the rotation speed ratio between the first and the third elements of said planetary gear mechanism is set so as for the rotation speed of the second element thereof to be zero, the rotation of the second shaft, which is the output shaft of this transmission, can be stopped while the engine revolution being inputted and the first clutch mechanism being engage, that is, the geared neutral condition can be achieved.

When, staring from this condition, the speed ratio of this continuously variable transmission is changed so that the rotation speed of the first element of the planetary gear mechanism is increased or decreased, the second shaft is rotated in the forward or the backward running direction under a low mode condition, in which the speed ratio as a whole transmission is large, that is, the vehicle will start.

When the first clutch mechanism is disengaged, that is, the second gear of the gear train is disengaged from the third element of the planetary gear mechanism, and the second clutch mechanism is engaged, that is, the output disk of the continuously variable transmission mechanism is engaged with the second shaft, the revolution inputted from the engine into the first shaft is transmitted from the continuously variable transmission mechanism through only the second clutch mechanism into the second shaft. At that time, since the planetary gear mechanism does not change a speed ratio, the speed ratio as a whole transmission corresponds to that of the continuously variable transmission mechanism, and this means that the speed ratio is controlled under so-called high mode, where the speed ratio is small, by the continuously variable transmission mechanism without any steps but continuously.

Since the gear train which transmits the rotating motion from the first shaft to the planetary gear mechanism under the geared neutral condition or the low mode condition is disposed on the opposite side, with respect to the engine, of the continuously variable transmission mechanism on the first shaft and the planetary gear mechanism on the second shaft, this gear train is prevented from interfering with the differential gear unit which is engaged with the second shaft on its end of engine side, and this allows the length of the transmission unit along the shaft line direction to be shortened.

Further, in the case where the first and the second continuously variable transmission mechanisms are provided as a toroidal type continuously variable transmission mechanism comprising a pair of input and output disks, a roller interposed between both disks and the like, since the output disks of the first and the second continuously variable transmission mechanisms are integrated into one unit and the gear is formed on the outer surface thereof for engaging and rotating said integrated output disk together with the first element of the planetary gear mechanism, the length along the shaft line direction is made shorter and the gear may be supported more stably, which prevents the backlash of the gear along the shaft line direction, comparing with the case where two output disks are provided independently and said gear is disposed between said both disks.

Furthermore, same as the case described above, in the case where the first and the second continuously variable transmission mechanisms are provided as a toroidal type continuously variable transmission mechanisms and the first shaft is inserted into the through-hole formed in the third shaft to dispose each of the input side and the output side disks of said first and said second continuously variable transmission mechanisms on said third shaft, since the one end of said third shaft is supported by the transmission case through the bearing and onto the other end thereof is fitted into the first gear of the gear train, said first gear being supported by the transmission case through a bearing, and further a spring member is interposed in the fitting portion between said third shaft and the first gear to absorb relative displacement therebetween in the shaft line direction, the expansion and contraction of the third shaft can be absorbed by said spring member even if the third shaft is expanded or contracted due to the thermal expansion and the like.

Therefore, an axial force applied to the bearings one of which supports one end of the third shaft and the other of which supports the other end of the third shaft through the first gear is maintained properly and the axial backlash of the first gear is also controlled, so that the first gear can be maintained in good condition. On the other hand, since, in the case where the first and the second continuously variable transmission mechanisms are provided as a toroidal type continuously variable transmission mechanism and the first shaft is inserted into the through-hole formed in the third shaft on the middle of which are rotatably supported the output disks of the first and the second continuously variable transmission mechanisms and, on the opposite side with respect to the engine and on the engine side thereof, the input and the output disks of the first and the second continuously variable transmission mechanisms are disposed and are engaged with the third shaft respectively, since the loading mechanism for respectively applying pressure onto the rollers by and between the input and the output disks in the first and the second continuously variable transmission mechanisms is disposed between the input disk of the first continuously variable transmission mechanism and the first gear of the gear train disposed on the opposite side thereof with respect to the engine, a torque flow from the engine under the geared neutral or the low mode conditions where the first clutch mechanism is engaged and the second clutch mechanism is disengaged can be appropriately carried out.

Under this condition, the torque from the engine is inputted into the first shaft, then is transmitted from the opposite side end with respect to the engine of the first shaft through the tear train to the second shaft side, and then is inputted through the first clutch mechanism into the third element of the planetary gear mechanism. At that time, in this planetary gear mechanism, the torque is outputted from the second element through the second shaft to the differential gear unit side and simultaneously a reaction force against the torque input into the third element is applied to the first element, and then this reaction force is circulated back to the output disks of the first and the second continuously variable transmission mechanisms and thereby the so-called circulating torque is generated.

As for this circulating torque, some part thereof transmitted to the input disk of the first continuously variable transmission mechanism is transmitted through the loading mechanism to the first gear of the gear train, and the other part thereof transmitted to the input disk of the second continuously variable transmission mechanism is transmitted through the third shaft from the loading mechanism, in the same manner, to the first gear of the gear train respectively. Accordingly, either circulating torque does not pass through the first shaft, so that the first shaft is required to make only the engine torque pass through. Further, since, in the case where the loading mechanism comprises a pair of disks whose surfaces facing with each other are formed into the cam surfaces having circumferential concave and convex and a roller which is interposed between both disks, and the disk of the first gear side of the loading mechanism and the first gear are jointed by the pin member, said pin member is disposed in the portion of the disk of the first gear side where the thickness of the disk is rather thicker due to the concave and convex figures thereof, the first gear can be coupled with the disk without increasing the thickness of the disk, that is, the length along the shaft line direction, as a whole, without decreasing the strength of the disk.

Furthermore, since, when two oil channels for supplying the first and the second clutch mechanisms with the coupling fluid respectively are provided in the second shaft on which both clutch mechanisms are disposed, both oil channels are led from the side portion where the hydraulic pressure source is disposed, the length of the oil channels to both clutch mechanisms is made short and thereby the hydraulic pressure may be supplied to these clutch mechanism quickly, which makes improved response of engagement and disengagement control.

DESCRIPTION OF THE PREFERRED EMBODIMENTS

There will now be described a mechanical structure, a structure of the hydraulic pressure control circuit, and a concrete operation of the shift control of the continuously variable transmission according to the present invention.

Mechanical Structure

Figure 1:
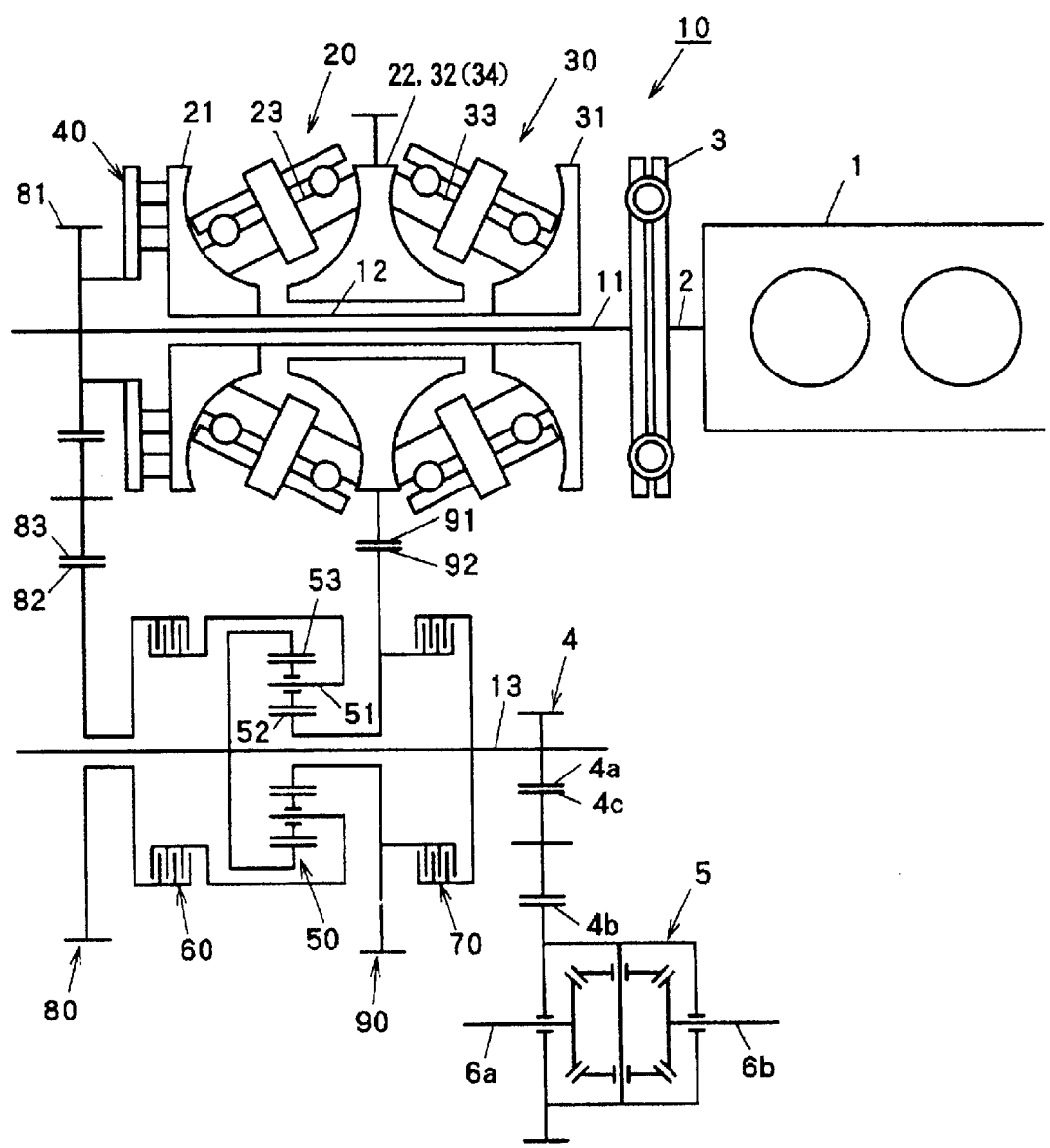
FIG. 1 is a schematic skeleton illustrating a mechanical structure of the toroidal type continuously variable transmission of the preferred embodiment according to the present invention.

FIG. 1 is a schematic skeleton illustrating a mechanical structure of the toroidal type continuously variable transmission of the preferred embodiment according to the present invention, in which the transmission 10 comprises an input shaft (the first shaft) 11 coupled with an output shaft 2 of an engine 1 through a torsional damper 3, a primary shaft (the third shaft) 12 having a through-hole inside thereof into which said shaft 11 is inserted, and a secondary shaft (the second shaft) 13 disposed parallel with said shafts 11 and 12, wherein all of said shafts 11 to 13 are disposed so as to extend in the lateral direction of the vehicle.

Further, in this transmission 10, a toroidal type first continuously variable transmission mechanisms 20, a toroidal type second continuously variable transmission mechanisms 30, and a loading cam 40 are disposed on a shaft line of said input shaft 11 and said primary shaft 12, and a planetary gear mechanism 50, a low mode clutch (the first clutch mechanism) 60, and a high mode clutch (the second clutch mechanism) 70 are disposed on a shaft line of said secondary shaft 13. A low mode gear train 80 and a high mode gear train 90 are interposed between the shaft line of the input shaft 11 and the primary shaft 12 and the shaft line of the secondary shaft 13.

The first and the second continuously variable transmission mechanisms 20, 30 have similar structure with each other, in which each of them has an input disk 21, 31 and an output disk 22, 32, each having facing surface formed into toroidal surface respectively, and two pieces of rollers 23, 33 are respectively interposed between said respective both disks 21, 22 and 31, 32 to transmit a driving force between them respectively.

In the first continuously variable transmission mechanism 20 disposed in the distal side from the engine, the input disk 21 is disposed in the distal side from the engine and the output disk 22 is disposed in the proximal side from the engine, and in the second continuously variable transmission mechanism 30 disposed in the proximal side from the engine, the input disk 31 is disposed in the proximal side from the engine and the output disk 32 is disposed in the distal side from the engine, and further, the input disks 21, 31 of respective continuously variable transmission mechanisms 20, 30 are coupled with respective ends of the primary shaft 12, and the output disks 22, 32 thereof are formed into one unit and are rotatably supported on the middle of said primary shaft 12.

A first gear 81 included in the low mode gear train 80 is coupled with a distal end, from the engine, of the input shaft 11, and a loading cam 40 is interposed between said first gear 81 and the input disk 21 of the first continuously variable transmission mechanism 20, and further, a first gear 91 included in the high mode gear train 90 is provided on an outer surface of the integrated output disks 22, 32 (hereafter referred to as a "integrated output disk 34") of the first and the second continuously variable transmission mechanisms 20, 30.

On the other hand, a second gear 82 included in the low mode gear train 80 is rotatably supported on a distal end from the engine of the secondary shaft 13 and is engaged with the first gear 81 through an idle gear 83, and further, the planetary gear mechanism 50 is disposed on the middle of the secondary shaft 13. Between a pinion carrier (the third rotary element) 51 of the planetary gear mechanism 50 and the second gear 82 of the low mode gear train 80 is disposed a low mode clutch 60 for engaging or disengaging them with each other.

A second gear 92 engaged with the first gear 91 of the high mode gear train 90, which is provided on the outer surface of the integrated output disk 34 of the first and the second continuously variable transmission mechanisms 20, 30, is rotatably supported on the engine side of the planetary gear mechanism 50, and further, said second gear 92 is coupled with a sun gear (the first rotary element) 52 of the planetary gear mechanism 50 and an internal gear (the second rotary element) 53 of the planetary gear mechanism 50 is connected to the secondary shaft 13, and a high mode clutch 70 for engaging or disengaging the second gear 92 of the high mode gear train 90 with the secondary shaft 13 is disposed on the engine side of the planetary gear mechanism 50.

A differential gear unit 5 is coupled with the engine side end of the secondary shaft 13 through an output gear train 4 comprising a first and a second gears 4a, 4b and an idle gear 4c, and a driving force is transmitted to the left and the driven wheels (not shown) through drive shaft 6a, 6b extending from the differential gear unit 5 to the left and the right sides.

Then will now be described a detailed description of each component of the transmission 10 with reference to the drawings, FIG. 2 and the followings. As for the first and the second continuously variable transmission mechanisms 20, 30 these first and the second continuously variable transmission mechanisms 20, 30 have similar structure with each other, in which, as described above, each of them has the input disk 21, 31 and the output disk 22, 32 (integrated output disk 34), each having facing surface formed into toroidal surface respectively, and two pieces of rollers 23, 33 are respectively interposed between said respective input and output disks 21, 22 and 31, 32 to transmit a driving force between them respectively.

Figure 3:
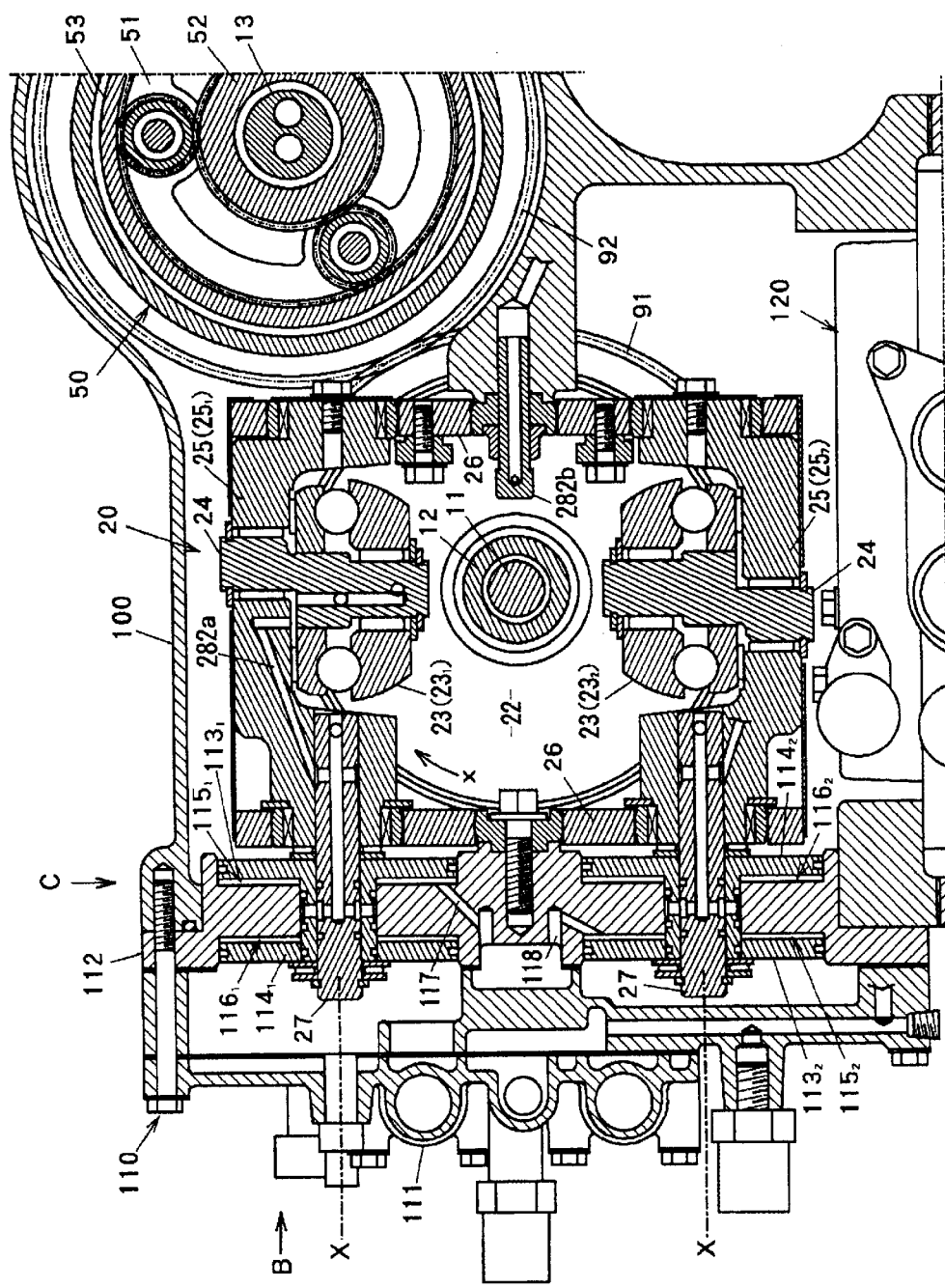
FIG. 3 is a cross sectional view taken on line A—A of FIG. 2.

To make a detailed description, for example, of the first continuously variable transmission mechanism 20 with reference to FIG. 3, a pair of rollers 23, 23 is supported by trunnions 25, 25 through shafts 24, 24 extending approximately in the radial direction of the input and the output disks 21, 22, and respective rollers are disposed on the toroidal surfaces of the input and the output disks 21, 22, which are facing with each other, at opposite side thereof by 180 degree with approximately horizontal attitude and parallel with each other, and are respectively brought into contact with the toroidal surfaces of said both disks 21, 22 at two portions located in the opposite side with each other by 180 degree.

Said trunnions 25, 25 are supported by and between left and right support members 26, 26 which are attached to a transmission case 100, and are allowed to rotate around the horizontal axial center line X, X which is of a tangential direction of both disks 21, 22 and normal to the shaft 24, 24 of the roller 23, 23 and are also allowed to linearly move reciprocating along said axial center line X, X direction. A rod 27, 27 extending toward one side along said axial center line X, X is coupled with the trunnion 25, 25, and a shift control unit 110 which includes the roller 23, 23 through the rod 27, 27 and the trunnion 25, 25 is attached on the side of the transmission case 100.

The shift control unit 110 comprises a hydraulic control section 111 and a trunnion control section 112, wherein a piston for increasing speed 1131 and that for decreasing speed 1141, which are attached to the rod 27 of a first trunnion 251 located upper side, and a piston for increasing speed 1132 and that for decreasing speed 1142, which are attached to the rod 27 of a second trunnion 252 located lower side, are disposed in said trunnion control section 112, and a hydraulic pressure chamber for increasing speed 1151 and that for decreasing speed 1161 are provided on the facing sides of the upper pistons 1131 and 1141 respectively and also a hydraulic pressure chamber for increasing speed 1152 and that for decreasing speed 1162 are provided on the facing sides of the lower pistons 1132 and 1142 respectively.

As for the first trunnion 251 located upper side, the hydraulic pressure chamber for increasing speed 1151 and that for decreasing speed 1161 are provided on the roller 23 side and on the opposite side thereof respectively, and as to the second trunnion 252 located lower side, the hydraulic pressure chamber for decreasing speed 1161 and that for increasing speed 1152 are provided on the roller 23 side and on the opposite side thereof respectively.

Hydraulic pressure for increasing speed PH generated by the hydraulic pressure control section 111 is supplied through an oil channel 117, 118 to the hydraulic pressure chamber for increasing speed 1151 of the first trunnion 251 located upper side and the hydraulic pressure chamber for increasing speed 1152 of the second trunnion 252 located lower side, and also hydraulic pressure for decreasing speed PL generated by the hydraulic pressure control section 111 is supplied through a not-shown oil channel to the hydraulic pressure chamber for decreasing speed 1161 of the first trunnion 251 located in the upper side and the hydraulic pressure chamber for decreasing speed 1162 of the second trunnion 252 located in the lower side.

Then, the relation between a supply control of the hydraulic pressure for increasing speed PH as well as that for decreasing speed PL and a shift operation of the continuously variable transmission mechanism 20 will be briefly described by taking the first continuously variable transmission mechanism 20 as an example.

First, when the hydraulic pressure for increasing speed PH supplied to the hydraulic pressure chambers for increasing speed 1151, 1152 of the first and the second trunnions 251, 252 becomes relatively higher than the predetermined neutral condition comparing with the hydraulic pressure for decreasing speed PL supplied to the hydraulic pressure chambers for decreasing speed 1161, 1162 of the first and the second trunnions 251, 252 due to the operation of the hydraulic pressure control section 111 shown in FIG. 3, the first trunnion 251 in the upper side horizontally moves to the right and the second trunnion 252 in the lower side horizontally moves to the left on the drawing.

At that time, assuming that the shown output disk 22 is rotating in the x-direction, a downward force is applied to the upper first roller 231, due to the movement to the right, by the output disk 22 and an upward force is applied thereto by the input disk 21 which is located this side of the paper and is rotating in the opposite of x-direction. To the lower second roller 232, due to the movement to the left, an upward force is applied by the output disk 22 and a downward force is applied by the input disk 21. As a result, both of the upper and the lower rollers 231, 232 incline so that the contact points with the input disk 21 move to the outer side in the radial direction and that with the output disk 22 moves to the inner side in the radial direction, and consequently the speed ratio of the continuously variable transmission mechanism 20 becomes smaller (increase of speed). On the contrary, when the hydraulic pressure for decreasing speed PL supplied to the hydraulic pressure chambers for decreasing speed 1161, 1162 of the first and the second trunnions 251, 252 becomes relatively higher than the predetermined neutral condition comparing with the hydraulic pressure for increasing speed PH supplied to the hydraulic pressure chambers for increasing speed 1151, 1152 of the first and the second trunnions 251, 251, the first trunnion 251 in the upper side horizontally moves to the left and the second trunnion 252 in the lower side horizontally moves to the right on the drawing.

At that time, to the upper first roller 231, an upward force is applied by the output disk 22 and a downward force is applied by the input disk 21, and, to the lower second roller 232, a downward force is applied by the output disk 22 and an upward force is applied by the input disk 21. As a result, both of the upper and the lower rollers 231, 232 incline so that the contact points with the input disk 21 move to the inner side in the radial direction and that with the output disk 22 moves to the outer side in the radial direction, and consequently the speed ratio of the continuously variable transmission mechanism 20 becomes larger (decrease of speed). The supply operation of the hydraulic pressure for increasing and decreasing speed, PH, PL by the hydraulic pressure control section 111 will be described in detail later in the description for the hydraulic pressure control circuit.

The structure and the operation of the first continuously variable transmission mechanism 20 described above may be also applied to the second continuously variable transmission mechanism 30.

Figure 2:
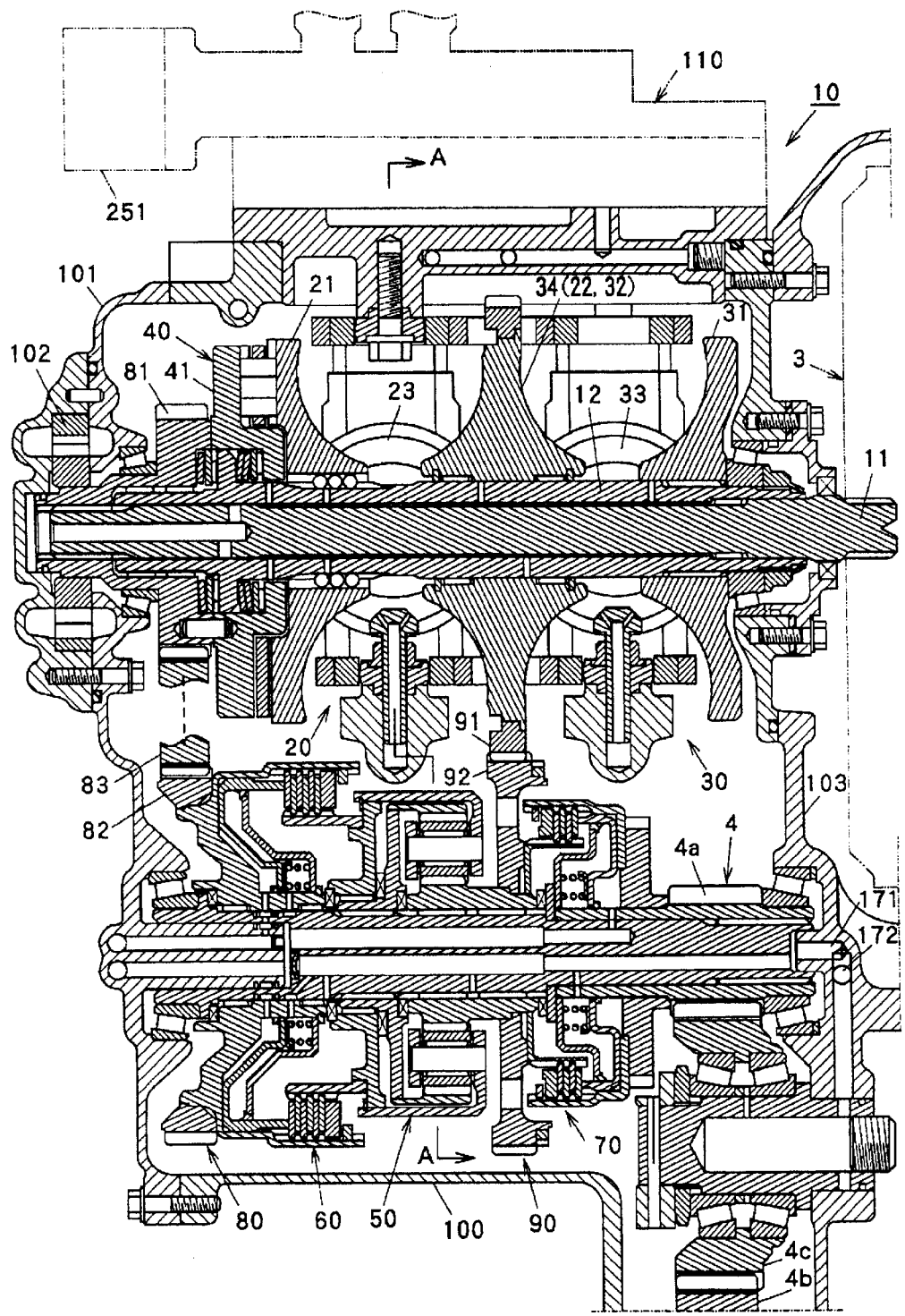
FIG. 2 is a development illustrating the concrete structure of the main part of said transmission.

As shown in FIG. 2, the input disks 21, 31 of the first and the second continuously variable transmission mechanisms 20, 30 are respectively spline-fitted to respective end portions of the primary shaft 12 having a through-hole inside into which the input shaft 11 is inserted with a play so that the input disks 21 and 31 always rotate with the same speed, and since the output disks 22, 23 of the first and the second continuously variable transmission mechanisms 20, 30 are integrated into one unit as described previously, the rotation speeds of the output sides of the first and the second continuously variable transmission mechanisms 20, 30 are also kept always to be identical. To keep in step with these matters, the speed ratio control of the first and the second continuously variable transmission mechanisms 20, 30 by the inclination control of the rollers 23, 23 is implemented so that said speed ratio may be always kept to be identical.

Figure 4:
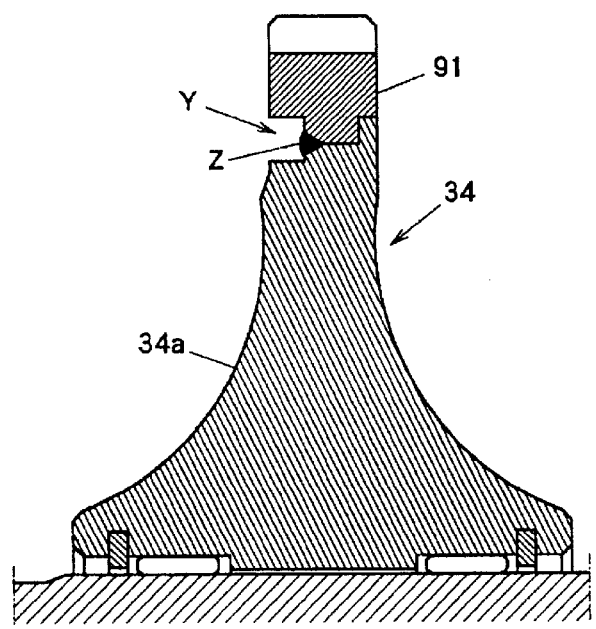
FIG. 4 is a cross sectional view illustrating an assembling aspect of the gear constructing the high mode gear train.

As shown in the enlarged view of FIG. 4, the first gear 91, formed into ring shape, of the high mode gear train 90 is fitted onto the outer surface of the integrated output disk 34 and is fixed thereto by welding, wherein, on the one side surface of the integrated output disk 34, a circular groove Y is formed between the outer surface of said disk 34 and the inner surface of the first gear 91, and the disk 34 and the gear 91 are weld-jointed in this groove Y.

Therefore, even if the weld metal Z stands up from the welding surface, this does not interfere with the toroidal surface 34a formed on said one side surface, so that the roller can be inclined and rotated in wide range. Further, since the first gear 91 is fixed onto the outer surface of the integrated output disk 34 by welding, an axial play of the first gear 91 can be controlled and the support thereof is stabilized. On the other hand, as shown in FIGS. 5 and 6, the loading cam 40 has a cam disk 41 interposed between the first gear 81 of the low mode gear 80 and the input disk 21 of the first continuously variable transmission mechanism 20, wherein the surfaces of the cam disk 41 and the input disk 21 which are facing with each other are respectively formed into cam surfaces having convex and concave section continuously repeating in the circumferential direction and a plurality of rollers held by a retainer disk 42 is interposed between these cam surfaces.

Figure 6:
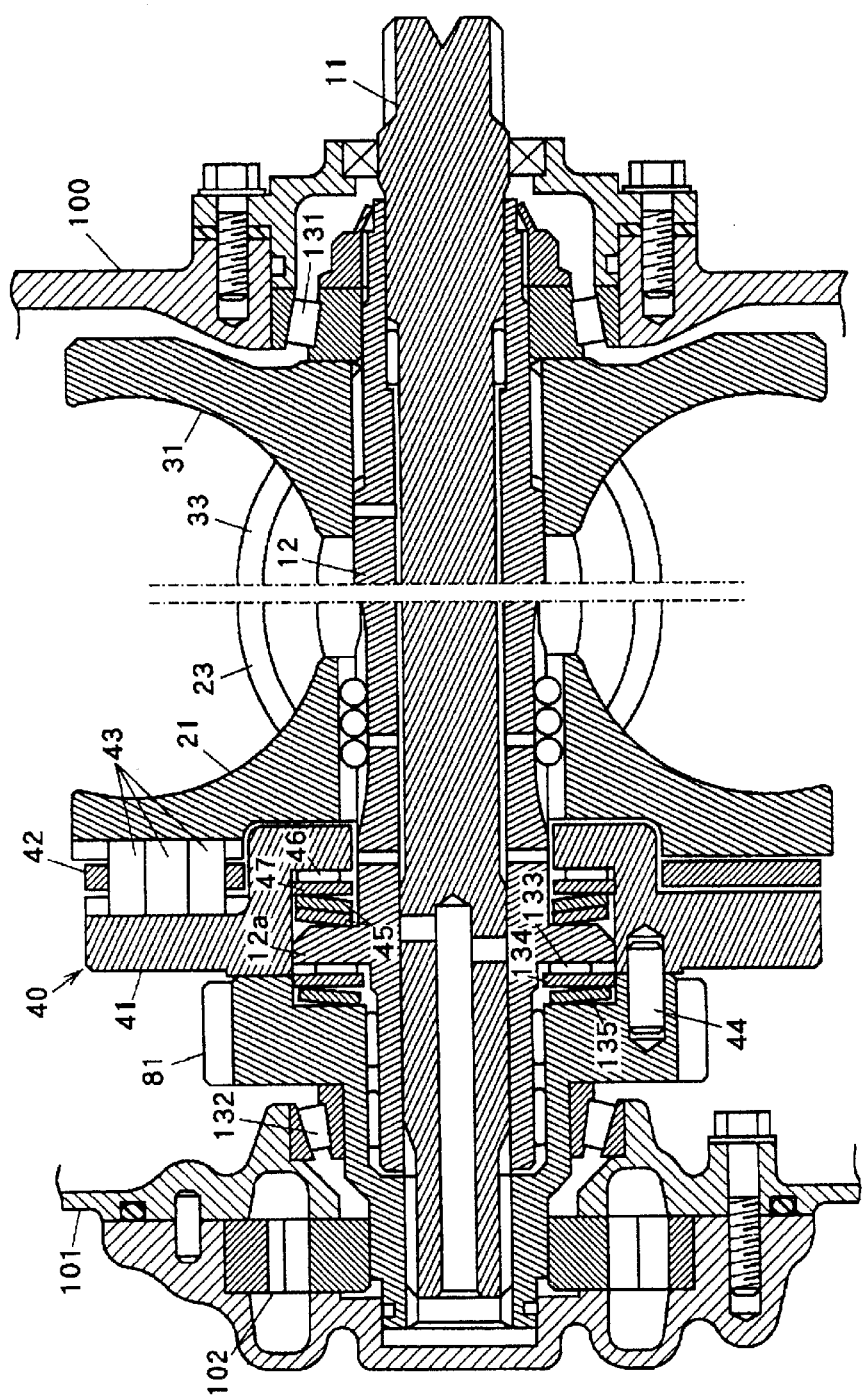
FIG. 6 is an enlarged cross sectional view illustrating a structure on the input shaft.

The cam disk 41 is connected to the first gear 81 of the low mode gear train 80, which is spline-fitted onto the input shaft 11 at the end thereof located on the opposite side with respect to the engine, by the plurality of pin members 44 disposed parallel to the shaft line direction so as to be rotated together with it, and, as shown in FIG. 6, coned disk springs 45, 45, a needle thrust bearing 46 and a bearing race 47 thereof are interposed between the cam disk 41 and a flange 12a formed on the primary shaft 12, so that the cam disk 41 is pressed onto the input disk 21 side by the spring force of the coned disk springs 45, 45.

Thereby, the rollers 43, 43 are held between concaved portions 21a, 41a on the cam surfaces of the disks 21, 41, and transmit the torque, which is inputted from the input shaft 11 through the first gear 81 of the low mode gear train 80 into the cam disk 41, to the input disk 21 of the first continuously variable transmission mechanism 20, and further transmit it through the primary shaft 12 to the input disk 31 of the second continuously variable transmission mechanism 30.

Figure 5:
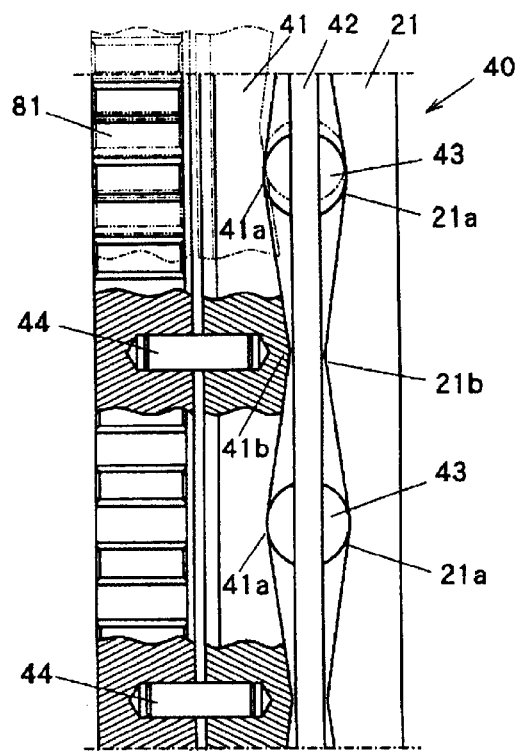
FIG. 5 is a partially sectional view illustrating an assembling relation of the loading cam, the gear constructing the low mode gear train, and the input disk.

As especially shown by the chain line in FIG. 5, the rollers 43, 43 roll from the concaved portions 21a, 41a toward the convex portions 21b, 41b on the cam surfaces of the disks 21, 41 in response to the magnitude of the input torque and are stuck between both cam surfaces, and thereby the input disk 21 of the first continuously variable transmission mechanism 20, the roller 23, the integrated output disk 34, and the roller 33 of the second continuously variable transmission mechanism 30 are pressed in this order toward and onto the input disk 31 of the second continuously variable transmission mechanism 30. Accordingly, the holding pressure applied onto the roller 23, 33 of the first and the second continuously variable transmission mechanisms 20, 30 are automatically adjusted in response to the magnitude of the input torque.

Further, in the loading cam 40, the pin members 44, ..., 44 which connect cam disk 41 and the first gear 81 of the low mode gear train 80 are disposed in the convex portions 41b, ..., 41b of the cam disk 41 where the thickness thereof is rather thicker. Accordingly, an axial length of the cam disk 41 need not be increased improperly by making overall thickness thereof thicker, and the strength of the cam disk 41 is prevented from being weakened by disposing insert holes of the pin members 44, ..., 44 close to the concaved portions 41a, ..., 41a formed on the cam surface.

To explain a support structure of the primary shaft 12 into which the input shaft 11 is fittingly inserted with play with reference to FIG. 6, the engine side end of the primary shaft 12 is supported by the transmission case 100 through a bearing 131, and onto the other end thereof is spline-fitted the first gear 81 of the low mode gear train 80, and said gear 81 is supported through a bearing 132 by a cover 101 located on the opposite side, with respect to the engine, of the transmission case 100.

A coned disk spring 135 which applies force to the primary shaft 12 and the first gear 81 in the direction to separate them with each other through a needle thrust bearing 133 and a bearing race 134 is disposed between the first gear 81 and the flange 12a which supports the coned disk spring 45, 45 of the loading cam 40 on the primary shaft 12.

Accordingly, since, when the primary shaft 12 is expanded or contracted due to the thermal expansion and the like, the engine side end of the shaft 12 is not allowed to move in the axial direction, the other end thereof which is spline-fitted into the first gear 81 makes displacement in the axial direction, and, at that time, said displacement is absorbed by the coned disk spring 135 and the first gear 81 is always pressed onto the bearing 132 side by an appropriate force in response to the spring force of the coned disk spring 135. Thereby, the condition where the first gear 81 is strongly pressed onto the bearing 132 side due to the expansion of the primary shaft 12 or the first gear 81 has an axial play due to the contraction of the primary shaft 12 can be avoided.

An appropriate force is always applied to the engine side and the opposite side bearings 131, 132 to which the spring force of the coned disk spring 135 is applied through the primary shaft 12 and the first gear 81, and thereby, even if the bearings 131, 132 are tapered-roller thrust bearings as shown in the drawing, an axial pre-load can be maintain properly so that the rattling or the increased rotation resistance problems caused by too small or too much pre-load can be avoided.

An oil pump 102 is mounted on the cover 101 located on the opposite side with respect to the engine, and is driven by the first gear 81 of the low mode gear train 80 which rotates integrally with the input shaft 11.

Figure 7:
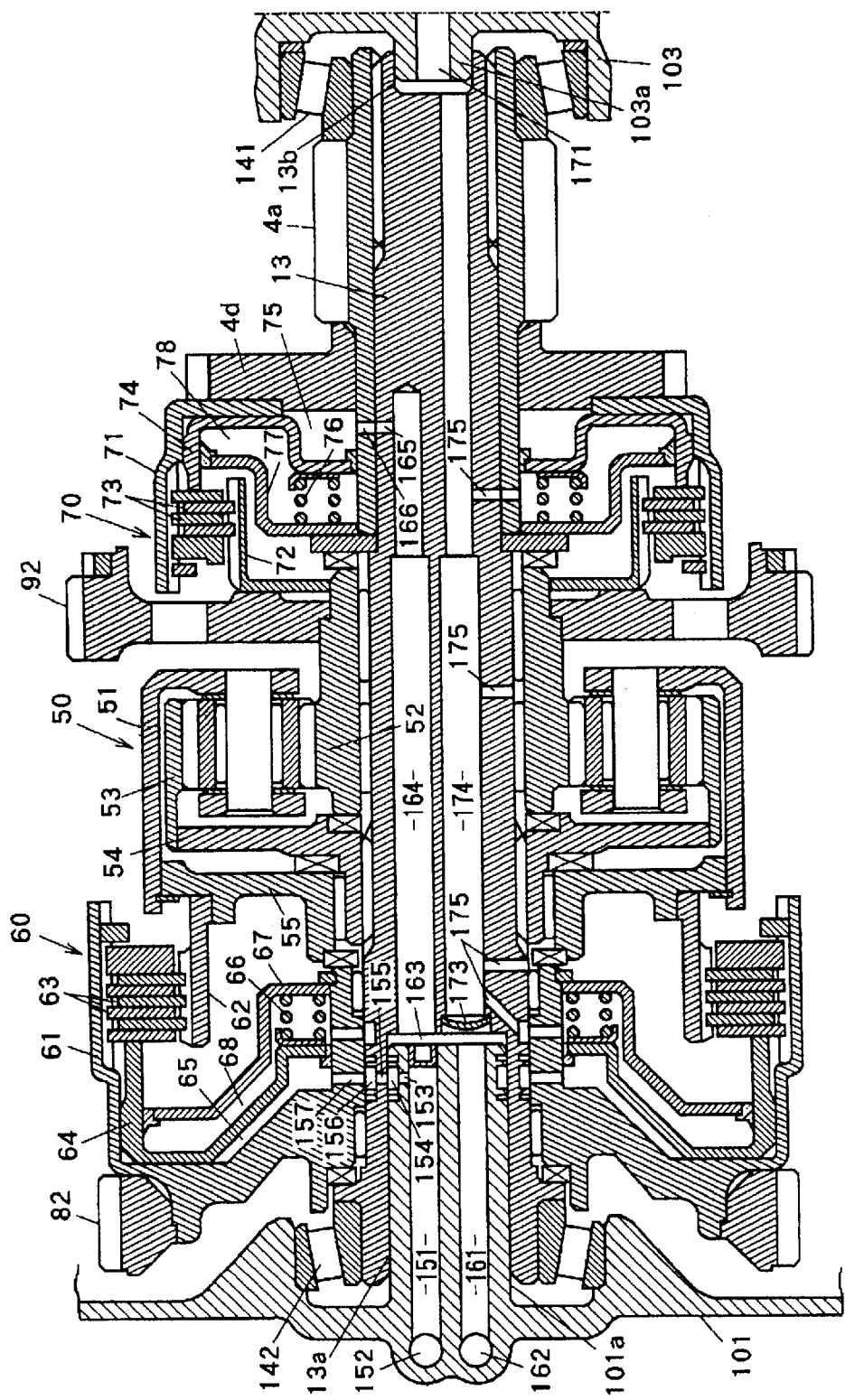
FIG. 7 is an enlarged cross sectional view illustrating a structure on the secondary shaft.

Then the structure of the secondary shaft 13, and the planetary gear mechanism 50, the low mode clutch 60, and the high mode clutch 70, each being mounted on the secondary shaft 13, will be described with reference to FIG. 7.

The secondary shaft 13 is rotatably supported at one end by a cover 103 located in the engine side of the transmission case 100 and at the other end by the cover 101 located in the opposite side thereof through bearings 141, 142 respectively. The second gear 92 included in the high mode gear train 90 is disposed on the middle of the secondary shaft 13 and the planetary gear mechanism 50 is disposed adjacent to the back side (this means the distal side with respect to the engine and will be used below in the same meaning) of the second gear 92, wherein the second gear 92 is coupled with the sun gear 52 of the planetary gear mechanism 50. In the back side thereof, a flange member 54 connected to the internal gear 53 of the planetary gear mechanism 50 is spline-fitted onto the secondary shaft 13. Further, the low mode clutch 60 is disposed in the back side of the planetary gear mechanism 50. The clutch 60 is rotatably supported on the secondary shaft 13 and comprises a drum member 61 to which the secondary gear 82 of the low mode gear train 80 is fixed, a hub member 62 which is disposed within the drum 61 in the radial direction and is connected to the pinion carrier 51 of the planetary gear mechanism 50 through the flange member 55, a plurality clutch plates 63, ..., 63 each of which is alternately spline-fitted to each of said members 61, 62, and a piston 64 disposed in the drum member 61.

A hydraulic pressure chamber 65 is formed between the piston 64 and the drum member 61 located in the back side thereof, and, when the hydraulic pressure for coupling generated by the clutch control unit 120 shown in FIG. 3 is introduced into the pressure chamber 65, the piston 64 is moved to the fore side (this means the proximal side with respect to the engine and will be used below in the same meaning) while compressing a spring 66, and the clutch plates 63, ..., 63 are engaged, and thereby the second gear 82 of the low mode gear train 80 is coupled with the pinion carrier 51 of the planetary gear mechanism 50 through the clutch 60.

A balance piston 67 is disposed on the fore side of the piston 64, and the pressure applied to the piston 64 by the centrifugal force applied to the operating fluid in the hydraulic pressure chamber 65 is offset by introducing lubricating oil into a balance chamber 68 formed between both pistons 64, 67.

The high mode clutch 70 is disposed on the fore side of the second gear 92 of the high mode gear train 90. The clutch 70 comprises a drum member 71 which is connected through a gear 4d for a parking mechanism to a first gear 4a of the output gear train 4 which is spline-fitted onto the secondary shaft 13, a hub member 72 which is disposed within said drum member 71 in the radial direction and is connected to the second gear 92, a plurality of clutch plates 73, . . . , 73 each of which is alternately spline-fitted to each of said members 71, 72, and a piston 74 disposed in the drum member 71.

When the hydraulic pressure for coupling generated by the clutch control unit 120 is introduced into a pressure chamber 75 formed on the back side of the piston 74, the piston 74 is moved to the back side while compressing a spring 76 and the clutch plates 73, . . . , 73 are engaged, and thereby the second gear 92 of the high mode gear train 90 is coupled through the clutch 70 with the secondary shaft 13 and the first gear 4a of the output gear train 4 spline-fitted to said shaft 13. A balance piston 77 is also disposed on the back side of the piston 74, and the pressure applied to the piston 74 by the centrifugal force applied to the operating fluid in the hydraulic pressure chamber 75 is offset by introducing the lubricating oil into a balance chamber 78 formed between both pistons 74, 77. Further, on the back side end of the secondary shaft 13, a recessed portion 13a extending toward fore side from the end surface thereof is formed, and a boss 101a which is formed on and extruded from the back side cover 101 is rotatably inserted into said recessed portion 13a. A boss 103a extruding toward back side is also formed on the fore side cover 103 and is rotatably inserted into a recessed portion 13b formed in the fore end of the secondary shaft 13.

Two oil channels 151, 161 for controlling the low mode and the high mode clutches 60, 70 are formed in the boss 101a of the back side cover 101 parallel to the axial line thereof, and oil channels 152, 162 which run upward from the clutch control unit 120 through the back side cover 101 are connected to the oil channels 151, 161 respectively. Among these oil channels, the oil channel 151 for the low mode clutch 60 communicates with the hydraulic pressure chamber 65 of said clutch 60 through a radial hole 153 formed in the boss 101a of the back side cover 101, a circumferential channel 154 formed on the outer surface of the boss 101a, a radial hole 155 formed in a circumferential wall of a recessed portion 13a of the secondary shaft 13 into which the boss 101a is inserted, a circumferential channel 156 formed on the outer surface of the shaft 13, and the through-hole 157 formed in a boss of the drum member 61 of the low mode clutch 60. Thereby, the hydraulic pressure for controlling the low mode clutch generated by the clutch control unit 120 is introduced into the hydraulic pressure chamber 65 of the clutch 60. The oil channel 161 for the high mode clutch 70 is open at the front end of the boss 101a and communicates with a space 163 between the front end surface of said boss and the inner end surface of the recessed portion 13a of the secondary shaft 13. Further, this oil channel communicates with an oil channel 164 which is formed by drilling on the secondary shaft 13 along the axial direction thereof and whose back side end is open to the inner end surface of the recessed portion 13a, and further communicates with the hydraulic pressure chamber 75 of the high mode clutch 70 through radial holes 165, 166 formed in the secondary shaft 13 and in the first gear 4a of the output gear train 4 respectively. Thereby, the hydraulic pressure for controlling the high mode clutch generated by the clutch control unit 120 is introduced into the hydraulic pressure chamber 75 of the clutch 70.

Thus, since either of the oil channels 161, 161 for controlling the low mode and the high mode clutches 60, 70 is introduced from the back side cover 101 where the oil pump 102 is installed and respectively communications with the hydraulic pressure chambers 65, 75 of the clutches 60, 70 that the secondary shaft 13, the hydraulic pressure can be supplied more promptly to the hydraulic pressure chambers 65, 75 comparing with, for example, the case where one of the oil channels is introduced from the fore side cover 103, so that the coupling control response of the clutches 60, 70 can be improved.

An oil channel 171 is formed in the boss 103a of the fore side cover 103 and is connected to an oil channel 172 (see FIG. 2) which runs from the clutch control unit 120 upward through the cover 103. Further, an oil channel 174 for the lubricating oil is drill-formed extending from the recessed portion 13b formed in the fore end of the secondary shaft 13, into which the boss 103a is inserted, along the axial direction and is closed by a plug 173 at a back side end thereof, and a plurality of radial through-holes 175, . . . , 175 which communications with the oil channel 174 is formed in predetermined positions of the secondary shaft 13. Thereby, the lubricating oil supplied from the clutch control unit 120 can be supplied to the balance chambers 68, 78 of the low mode and the high clutches 60, 70, and other lubrication points.

As shown in FIG. 3, the shift control unit 110 and the clutch control unit 120 for controlling the low mode and the high mode clutches 60, 70 are respectively mounted on the lateral side and on the bottom side of the transmission case 100, so that, by employing this structure where the control unit is divided into two units and one is mounted on the lateral side and the other is mounted on the bottom side of the transmission case 100, the downward overhung length from the transmission case can be made shorter comparing with the case where both control units are integrated into one unit and mounted on the bottom of the transmission case. Accordingly, this provides an advantage in keeping a minimum road clearance.

As described above, since the shift control unit 110 is disposed on one side (the left side in FIG. 3) of the transmission case 100, and the trunnions 25, 25 are respectively attached to the upper and the lower rods 27, 27 which extends horizontally toward inside of the transmission case 100 from the trunnion control section 112 of said unit 110 to move the trunnions 25, 25 along the horizontal shaft center lines X, X, a wide space is not required in the width direction, which is necessary in the case where the trunnion is moved in the vertical direction and thereby the trunnion driving section is disposed on the top of the transmission case.

Accordingly, when the secondary shaft 13 on which the planetary gear mechanism 50, the low mode and the high mode clutches 60, 70 are mounted is designed, the shaft center thereof can be placed near to the shaft centers of the input shaft 11 and the primary shaft 12, so that the transmission 10 can be made compact as a whole.

Supply control of the hydraulic pressure fluid for controlling the low mode and the high mode clutches 60, 70 by the clutch control unit 120 will be described in detail later in the item for the hydraulic pressure control circuit.

Then, the mechanical operation of the continuously variable transmission 10 having a structure described above will be explained.

When a vehicle is at a stop, in FIGS. 1 and 2, the transmission 10 is in the low mode where the low mode clutch 60 is engaged and the high mode clutch 70 is disengaged, and the revolution from the engine 1 is transmitted from the back side end of the input shaft 11 through the low mode gear train 80 composed of the first gear 81, the idle gear 83, and the second gear 82 to the secondary shaft 13, and, at the same time, is inputted through the low mode clutch 60 into the pinion carrier 51 of the planetary gear mechanism 50.

The revolution inputted from the engine 1 into the input shaft 11 is further inputted from the first gear 81 of the low mode gear train 80 through the loading cam 40 located adjacent thereto into the input disk 21 of the first continuously variable transmission mechanism 20, and then is transmitted through the rollers 23, 23 to the integrated output disk 34, and, at the same time, is also inputted from the input disk 21 through the primary shaft 12 into the input disk 31 of the second continuously variable transmission mechanism 30 disposed on the fore side end of said shaft 12, and then, same as the first continuously variable transmission mechanism 20 does, is transmitted through the rollers 33, 33 to the integrated output disk 34. At that time, the inclination angle of the roller 23, 33 of the first and the second continuously variable transmission mechanisms 20, 30, that is, the speed ratios of both continuously variable transmission mechanisms 20, 30, are kept to an identical predetermined value by the shift control unit 110 shown in FIG. 3 through the control of the hydraulic pressure for increasing speed PH and that for decreasing speed PL.

The rotation of the integrated output disk 34 of the first and the second continuously variable transmission mechanisms 20, 30 is transmitted through the high mode gear train 90 composed of the first gear 91 formed on the outer surface of the integrated output disk 34 and the second gear 92 on the secondary shaft 13 into the sun gear 52 of the planetary gear mechanism 50.

Thus, the rotation is inputted into the planetary gear mechanism 50 through the pinion carrier 51 and also through the sun gear 52, and, at that time, by setting the rotation speed ratio between the pinion carrier 51 and the sun gear 52 to a predetermined ratio by the speed ratio control of the first and the second continuously variable transmission mechanisms 20, 30, the rotation of the internal gear 53 of the planetary gear mechanism 50, that is, the rotation inputted from the secondary shaft 13 through the output gear train 4 into the differential gear unit 6 is set to zero to make the geared neutral condition of the transmission 10.

Starting from this condition, when the ratio of the input rotation speeds of the pinion carrier 51 and the sun gear 52 is changed by changing the speed ratio of the first and the second continuously variable transmission mechanisms 20, 30, the internal gear 53 or the secondary shaft 13 is rotated in the forward or the reverse direction under a condition where the speed ratio as a whole transmission 10 (hereafter referred to as "final speed ratio") is rather high, that is, under low mode condition, and the vehicle starts to move.

After the vehicle starts to move forward, when the low mode clutch 60 is disengaged and the high mode clutch 70 is engaged at a predetermined timing, the revolution inputted from the engine 1 into the input shaft 11 is transmitted, same as the low mode does, from the loading cam 40 to the input disks 21, 31 of the first and the second continuously variable transmission mechanisms 20, 30, and is further transmitted through respective roller 23, 33 to the integrated output disk 34, and, at the same time, is transmitted through the high mode gear train 90 and the high mode clutch 70 to the second shaft 13.

At that time, the planetary gear mechanism 50 is in a racing condition and the final speed ratio is determined only by the speed ratios of the first and the second continuously variable transmission mechanisms 20, 30 so that the final speed ratio is continuously controlled under high mode condition where the final speed ratio is small.

According to this transmission 10, since the low mode gear train 80 which transmits the rotation from the input shaft 11 to the planetary gear mechanism 50 on the secondary shaft 13 under the geared neutral or the low mode condition is disposed on the back side of the input shaft 11 and the secondary shaft 13, the gear train 80 does not interfere with the differential gear unit 5 which is disposed on the fore side end of the secondary shaft 13 and the output gear train 4 which transmits the power to the differential gear unit 5, and thereby the axial length elongation of the transmission 10, which may occur when the gear train is offset in the axial direction to prevent this interference, can be avoided.

When, as shown in this transmission 10, the first and the second continuously variable transmission mechanisms 20, 30 are employed as the toroidal type continuously variable transmission mechanism, and the input disks 21, 31 thereof are coupled with both ends of the primary shaft 12 respectively, and the output disks 22, 32 are disposed on the middle of the primary shaft 12, and the low mode gear train 80 which transmits the rotation to the secondary shaft 13 side is disposed on the back side end of the input shaft 11, the arrangement of the loading cam 40 which is interposed between the input shaft 11 and the input portion to the first and the second continuously variable transmission mechanisms 20, 30, that is, where the loading cam 40 shall be placed, should be carefully examined.

Figure 8:
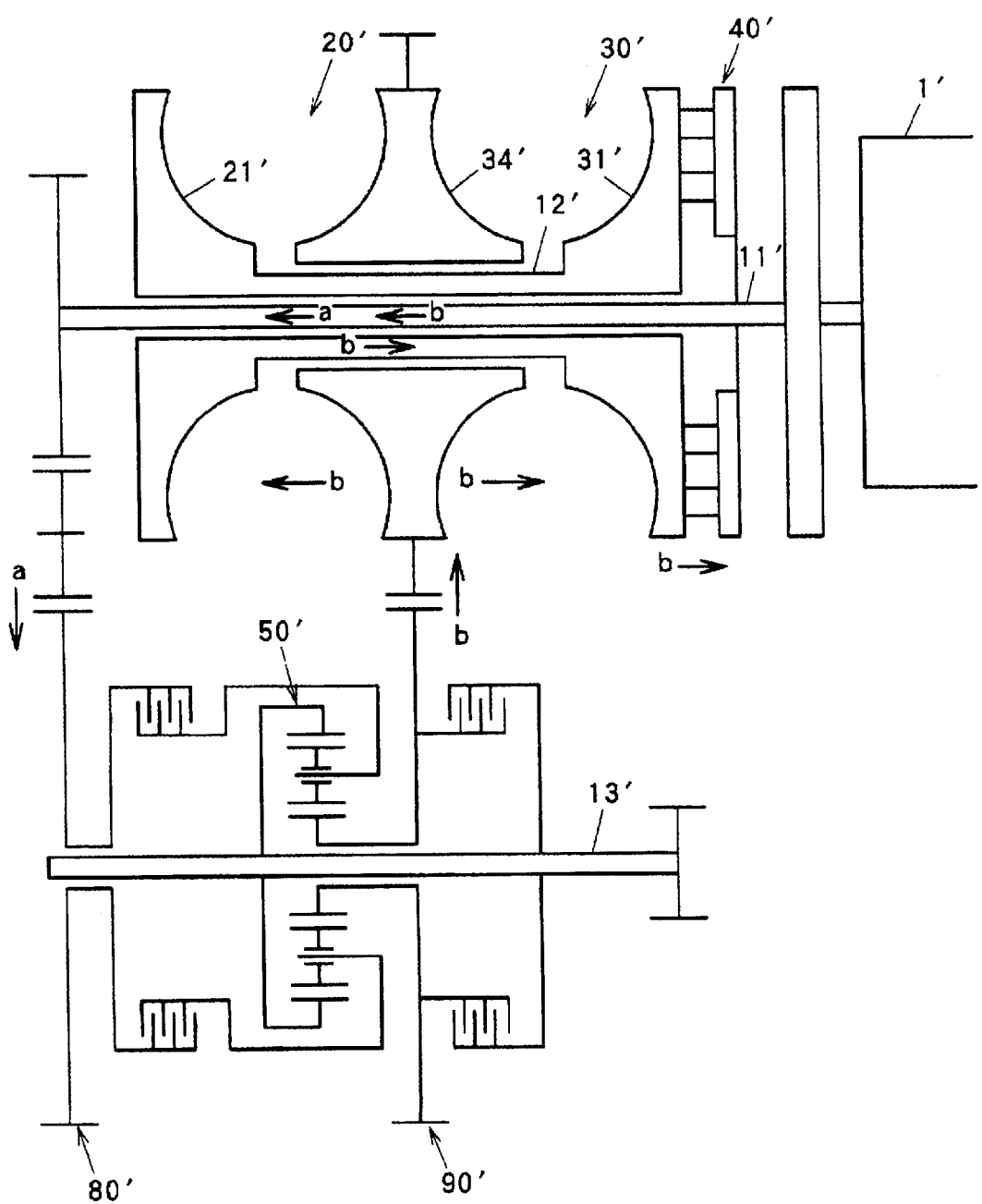
FIG. 8 is a schematic diagram for explaining the problem due to the circulating torque.

When, as shown in FIG. 8, the loading cam 40' is placed between the input shaft 11' and the input disk 31' of the continuously variable mechanism 30' located in the engine 1' side, in the low mode, the torque from the engine 1' is transmitted, as shown by an arrow "a", from the back side end of the input shaft 11' through the gear train 80' into the secondary shaft 13' side, and, at the same time, a reaction torque generated in the planetary gear mechanism 60' on the secondary shaft 13' is circulated back, as shown by an arrow "b", to the output disk 34' of the continuously variable mechanisms 20', 30' through the gear train 90' to make a circulating torque, and after being transmitted to the input disks 21', 31' of the continuously variable mechanisms 20', 30', this circulating torque is inputted from the input disk 31' of the continuously variable mechanism 30' in the engine side through the loading cam 40' into the input shaft 11' again and is transmitted further to the back side gear train 80' again.

Thus, the torque from the engine 1' (arrow "a") and the circulating torque (arrow "b") are parallelly applied to the input shaft 11', so that the shaft 11' should be reinforced by, for example, increasing the diameter thereof. As a result, the total weight of the transmission 10 is increased and, since the rigidly of the input shaft 11' is increased and thereby the vibration of the engine 1' likely to be transmitted to the output side, the vibration and the noise of the vehicle is increased.

On the contrary, according to the continuously variable transmission 10 of the preferred embodiment, since the low mode gear train 80 which transmits the rotation to the secondary shaft 13 side is disposed on the back side end of the input shaft 11 and the loading cam 40 which is interposed between the input shaft 11 and the continuously variable transmission mechanisms 20, 30 is also disposed on the back side end of the input shaft 11, the strength and rigidity problem of the input shaft 11 described above can be avoided.

Figure 9:
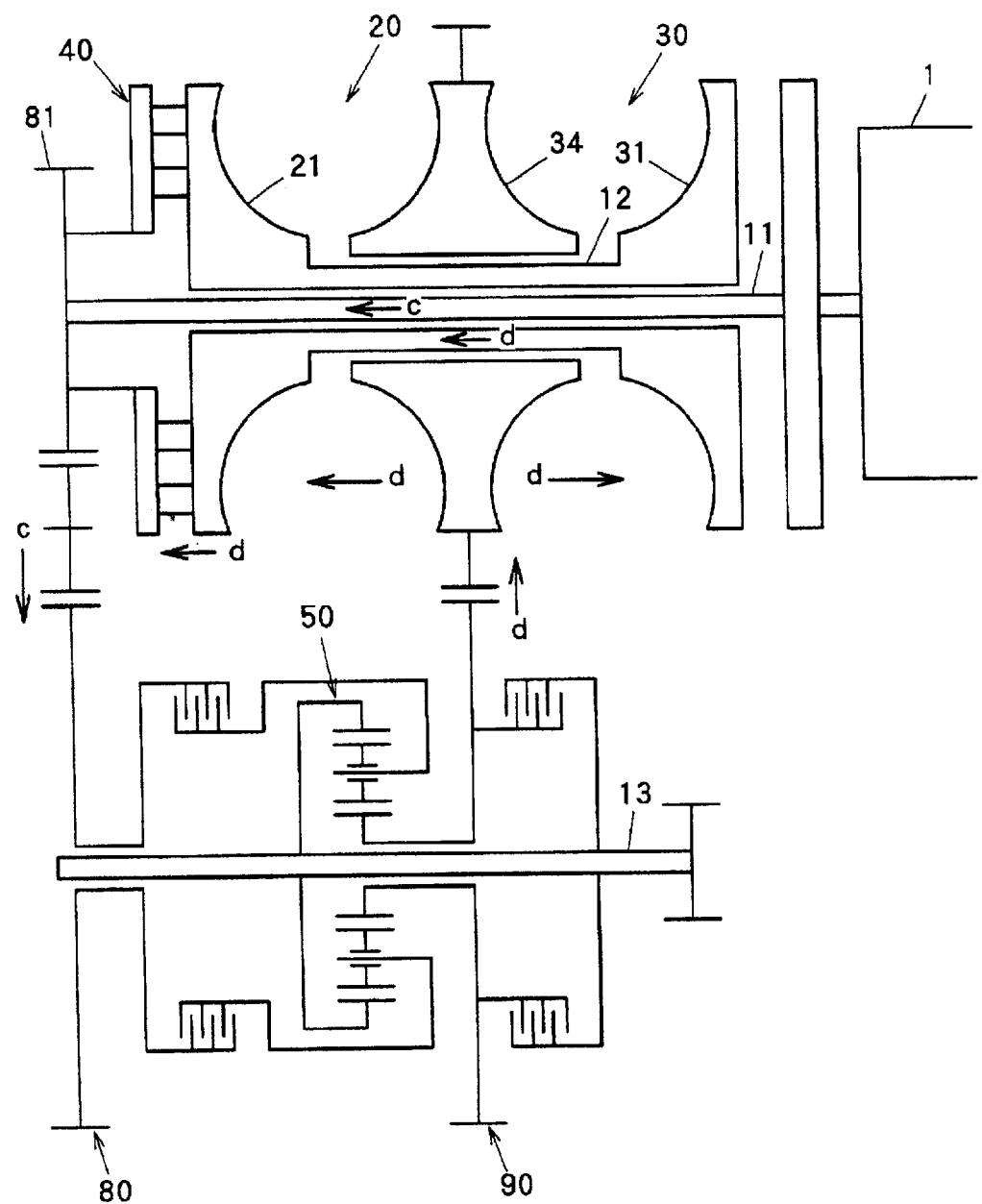
FIG. 9 is a schematic diagram for explaining the flow of the circulating torque in the transmission of the preferred embodiment according to the present invention.

In this case, as shown in FIG. 9, while the torque from the engine 1 is transmitted, as shown by an arrow "c", from the back side end of the input shaft 11 through the low mode gear train 80 to the secondary shaft 13 side, the circulating torque from the planetary gear mechanism 50 on the secondary shaft 13 is transmitted, as shown by an arrow "d", through the high mode gear train 90, back to the output disk 34 of the continuously variable transmission mechanisms 20, 30, and then this circulating torque is respectively transmitted, in the first continuously variable transmission mechanism 20, from the input disk 21 through the loading cam 40 to the first gear 81 of the low mode gear 80 directly and, in the second continuously variable transmission mechanism 30, from the input disk 31 through the primary shaft 12 and the same loading cam 40 to the first gear 81 of the low mode gear 80. Thus, each circulating torque transmitted back to the first and the second continuously variable transmission mechanisms 20, 30 does not pass through the input shaft 11, so that the input shaft 11 is allowed to transmit only the torque from the engine 1. As a result, the input shaft 11 may have small diameter and the transmission 10 may have light weight, and, at the same time, decreased rigidity of the input shaft 11 allows to effectively absorb the vibration of the engine 1 and thereby the vibration and noise of the vehicle is made lower.

Hydraulic Pressure Control Circuit

There will not be describe the hydraulic pressure control circuit of the continuously variable transmission 10 comprising the shift control unit 110 and the clutch control unit 120.

Figure 10:
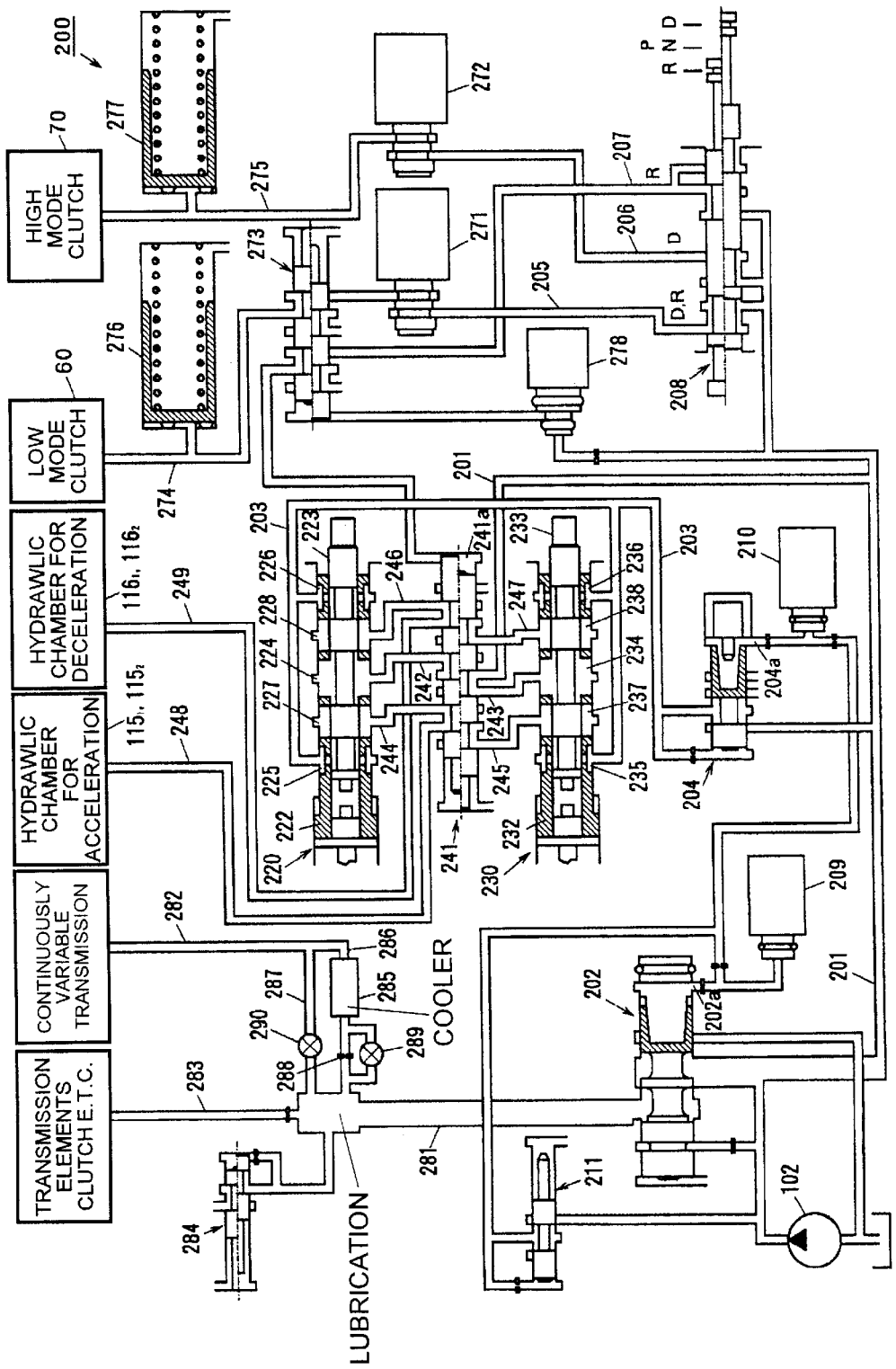
FIG. 10 is a circuit diagram for the hydraulic pressure control of said transmission.

As shown in FIG. 10, a hydraulic pressure control circuit 200 comprises a regulator valve 202 which regulates a pressure of an operating fluid discharged from an oil pump 102 into a predetermined line pressure and outputs to a main line 201, a relief valve 204 which generates a predetermined relief pressure taking the line pressure supplied through the main line 201 as a source pressure and outputs said relief pressure to a relief line 203, and a manual valve 208 which is operated by the range shifting operation of the vehicle driver, and makes the main line 201 communicates with a first and a second output lines 205, 206 in the D-range and with the first and a third output lines 205, 207 in the R-range, and intercepts the line pressure in the N-range and the P-range. The regulator valve 202 and the relief valve 204 are equipped with a linear solenoid valve 209 for the line pressure and a linear solenoid valve 210 for the relief pressure respectively, and further a reducing valve 211 which makes a constant pressure taking the line pressure as a source pressure is provided, wherein the linear solenoid valves 209, 210 make control pressures respectively base on the constant pressure generated by the reducing valve 211. By supplying the control pressures to the control ports 202a, 204a of the regulator valve 202 and the relief valve 204, pressure regulation values of the line pressure and the relief pressure are controlled by respective linear solenoid valves 209, 210.

The hydraulic pressure control circuit 200 further comprises a three-layers valve for forward running 220 and a three-layers valve for backward running 230 which respectively generate the hydraulic pressure for increasing speed PH and the hydraulic pressure for decreasing speed PL for implementing shift control in forward and backward running based on the line pressure and the relief pressure, and a shift valve 241 which selectively actuates these three-layers valves 220, 230.

The position of a spool of the shift valve 241 is determined by the line pressure supplied as a control pressure into a control port 241a formed on one end thereof, that is, when the line pressure is not supplied, the spool is in the right side so that the main line 201 communicates with a line pressure supply line 242 which leads to the three-layers valve for forward running 220, and, when the line pressure is supplied, the spool is in the left side so that the main line 201 communicates with a line pressure supply line 243 which leads to the three-layers valve for backward running 230. The three-layers valves for forward and backward running 220, 230 have the same structure, and each has a sleeve 222, 232 which is axial-movably fitted into a bore 221, 231 (see FIG. 11) formed in a valve body 111a of a hydraulic pressure control section 111 of the shift control unit 110 shown in FIG. 3 and a spool 223, 233 which is also axial-movably fitted into said sleeve 222, 232. A line pressure port 224, 234 to which is connected the line pressure supply line 242, 243 led from the shift valve 241 is provided on the middle portion thereof, and a first and a second relief pressure ports 225, 226, 235, 236 to which are connected lines branched from the relief pressure line 203 are provided on both end portions thereof respectively, and an acceleration pressure port 227, 237 is provided between the line pressure port 224, 234 and the first relief pressure port 225, 235, and a deceleration pressure port 228, 238 is provided between the line pressure port 224, 234 and the second relief pressure port 226, 236 respectively. The operation of this three-layers valves 220, 230 will be explained by taking the three-layers valves for forward running 220 as an example. When the relative position between the sleeve 222 and the spool 223 is changed from the neutral condition, which is shown in FIG. 10, to the position where the sleeve 222 is relatively moved to the right on the drawing, a communication level between the line pressure port 224 and the acceleration pressure port 227 as well as a communication level between the second relief pressure port 226 and the deceleration pressure port 228 are respectively increased, and, on the contrary, when the sleeve 222 is relatively moved to the left, a communication level between the line pressure port 224 and the deceleration pressure port 228 as well as a communication level between the first relief pressure port 225 and the acceleration pressure port 227 are respectively increased.

A line 244, 245 respectively led from the acceleration pressure port 227, 237 of the three-layers valve for forward or backward running 220, 230 and a line 246, 247 respectively led from the deceleration pressure port 228, 238 of the three-layers valve for forward or backward running 220, 230 are connected to the shift valve 241.

When the spool of the shift valve 241 is in the right, the lines 244, 246 led from the acceleration pressure port 227 and the deceleration pressure port 228 of the three-layers valve for forward running 220 communicate respectively with the acceleration pressure line 248 and the deceleration pressure line 249 which respectively communicate with the hydraulic pressure chambers for increasing speed 1151, 1152 and the hydraulic pressure chambers for decreasing speed 1161, 1162 of the trunnion control section 112 of the shift control unit 110 shown in FIG. 3, and, on the contrary, when the spool of the shift valve 214 is in the left, the lines 245, 247 led from the acceleration pressure port 237 and the deceleration pressure port 238 of the three-layers valve for backward running 230 communicate respectively with the acceleration pressure line 248 and the deceleration pressure line 249 which respectively communicate with the hydraulic pressure chambers for increasing speed 1151, 1152 and the hydraulic pressure chambers for decreasing speed 1161, 1162.

Figure 11:
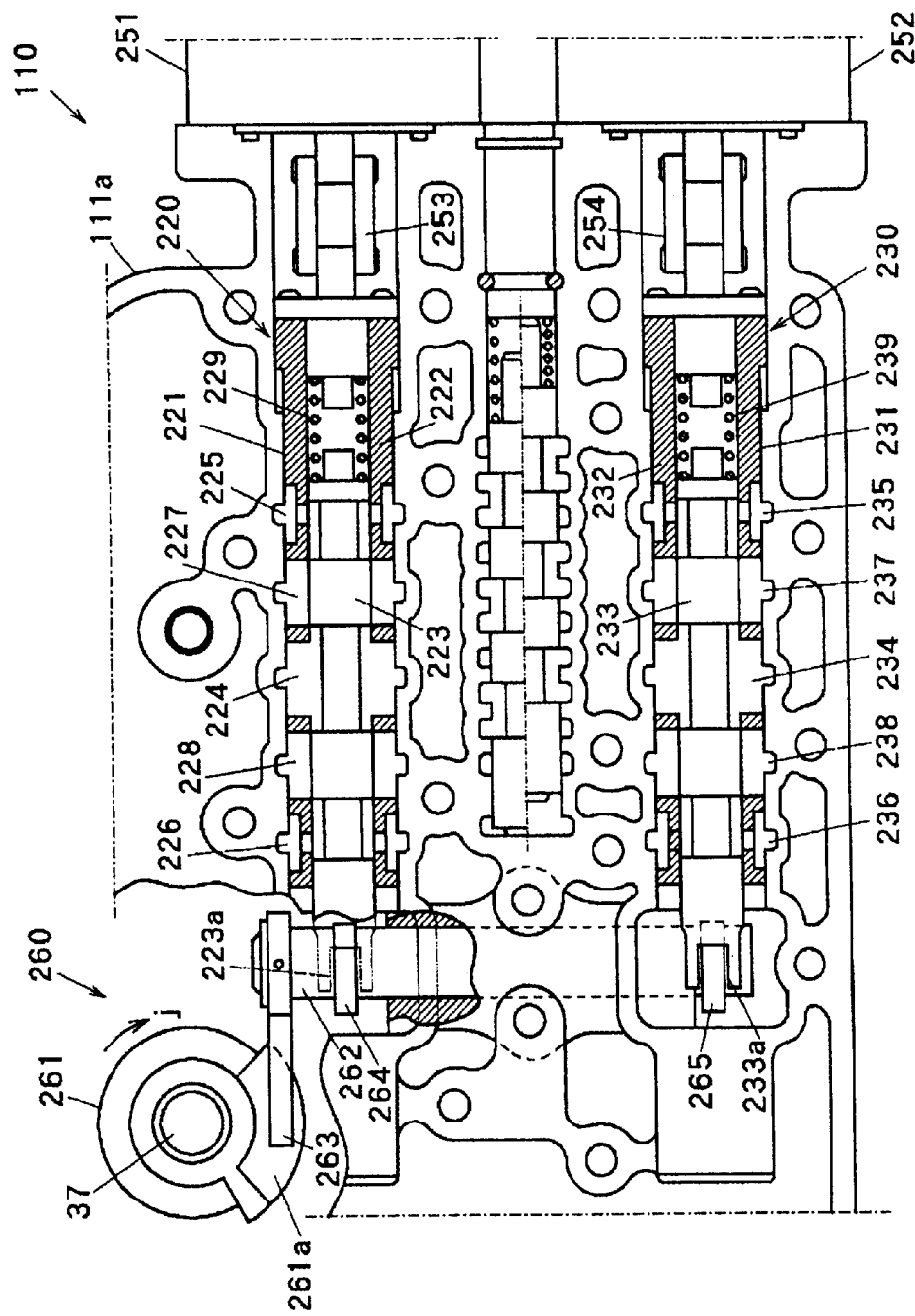
FIG. 11 is a partially sectional view taken in the direction of arrow B of FIG. 3 illustrating the three-layers valve for generating hydraulic pressure for shift control.

As shown in FIG. 11, the sleeve 222, 232 of the three-layers valve for forward or backward running 220, 230 is axially driven by a step motor 251, 251 respectively. Further, a cam mechanism 260 which moves the spool 223, 233 in an axial direction against spring force generated by a spring 229, 239 in response to the movement of the sleeve 222, 232 by the step motor 251, 251 is provided.

Figure 12:
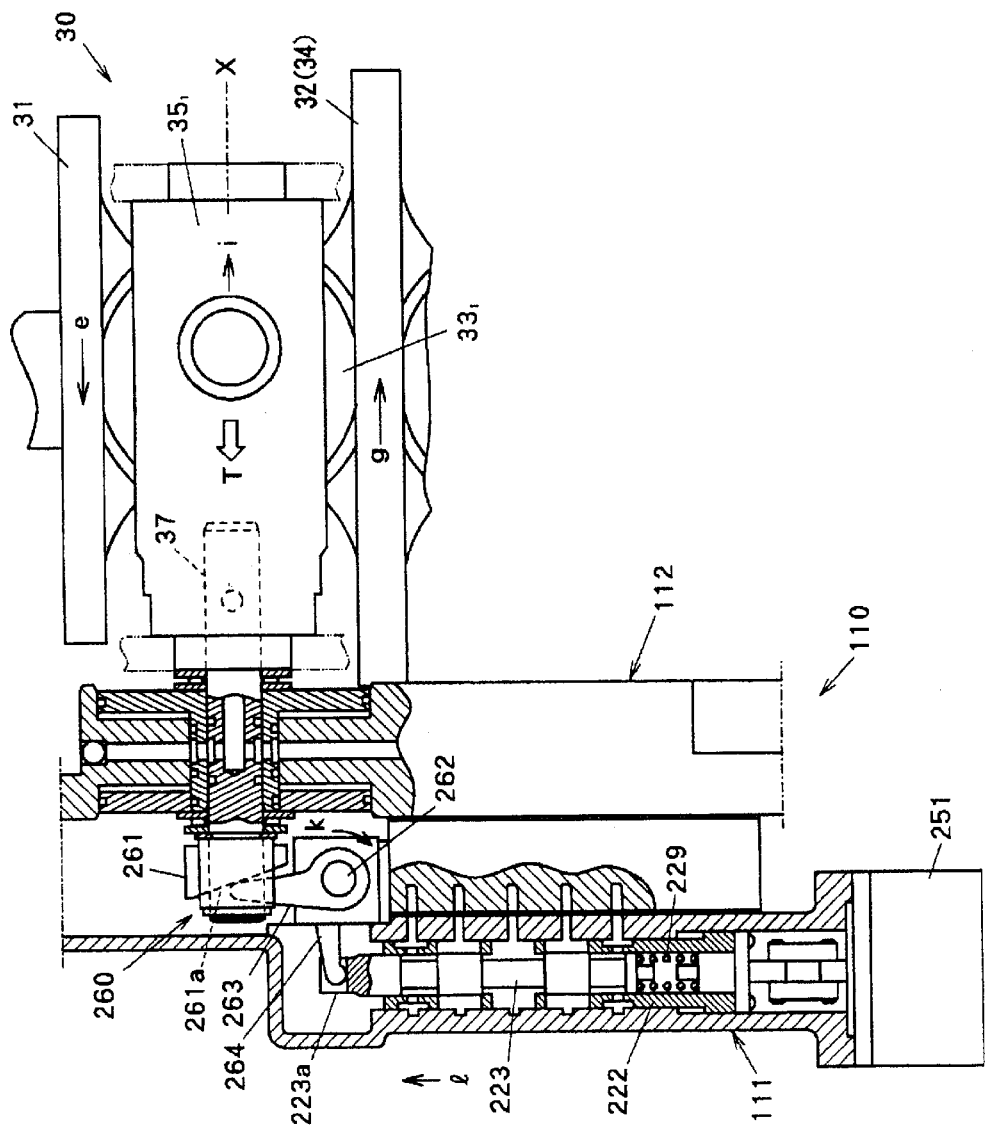
FIG. 12 is a partially sectional view taken in the direction of arrow C of FIG. 3 illustrating the cam mechanism.

As shown in FIGS. 11 and 12, the cam mechanism 260 comprises a precession cam 261 which has a cam surface 261a formed into a helical surface on one end and is attached to a predetermined trunnion, more particularly, to an end of a rod 37 of a first trunnion 351 located on the upper portion of the second continuously variable transmission mechanism 30, a shaft 262 which is disposed on one end of the spool 223, 233 of the three-layers valve for forward or backward running 220, 230 in the direction normal thereto and is rotatably supported by the valve body 111a of the hydraulic pressure control section 111, a driven lever 263 which is attached to one end of the shaft 262 and is brought into contact with the cam surface 261a on a free end thereof, and drive levers for forward or backward running 264, 265 which are also attached to the shaft 262 and whose free ends are engaged with slits 223a, 233a formed on ends of the spools 223, 233 of the three-layers valve for forward or backward running 220, 230 respectively.

When the first trunnion 351 and the rod 37 is integrally rotated around the shaft center line X by the inclination of the first roller 331 of the second continuously variable transmission mechanism 30, the precession cam 261 is also rotated together with them and the driven lever 263 whose free end if brought into contact with the cam surface 261a of the precession cam 261 is swung by a predetermined angle and, through the shaft 262, the drive levers for forward or backward running 264, 265 are also swung by the same angle, and thereby the spools 223, 233 of the three-layers valve for forward or backward running 220, 230 are axially moved respectively by a stroke corresponding to the swing angle of the drive levers 264, 265.

Accordingly, the position of the spools 223, 233 always corresponds to the inclination angle of the roller 33 of the second continuously variable transmission mechanism 30 (and the roller 23 of the first continuously variable transmission mechanism 20), in other words, to the speed ratio of these continuously variable transmission mechanisms 20, 30.

According to the cam mechanism 260, since the spools 223, 233 of the three-layers valve for forward or backward running 220, 230 are driven by the single precession cam 261 and the driven lever 263 as described above, the structure of the cam mechanism is simplified comparing with the case having respective precession cams for the spools 223, 233.

Since the step motor 251, 252 is directly attached to the side surface of the valve body 111a of the hydraulic pressure control unit 111 of the shift control unit 110, in which the three-layers valves for forward and backward running 220, 230 are built, with an axial center line in common with the corresponding three-layers valve 220, 230 and is directly coupled with the sleeve 222, 232 of the three-layers valve 220, 230 respectively, the mechanism for driving the sleeve 222, 232 of the three-layers valve 220, 230 by the step motor 251, 252 is considerably simplified comparing with the case where the step motor is disposed independently from the three-layers valve, for example, on the cover member of the transmission case, the oil pan and the like, and both are connected with each other through some coupling mechanism, and, in addition, the position of the sleeve 222, 232 can be accurately controlled.

Further, since, in this shift control unit 110, the shift valve 241 is disposed between both three-layers valves for forward or backward running 220, 230, oil channels between the shift valve 241 and both three-layers valves 220, 230, in concretely, lines 242–247 in the hydraulic pressure control circuit shown in FIG. 10 can be made shorter, and thereby the control response using these three-layers valves 220, 230 can be improved. On the other hand, the hydraulic pressure control circuit 200 is provided with a first and a second solenoid valves 271, 272 for controlling the clutch, and the first and the second output lines 205, 206 led from the manual valve 208 are connected to the first and the second solenoid valves 271, 272 respectively.

When the first solenoid valve 271 is opened, a clutch engaging pressure based on the line pressure from the first output line 205 is supplied through a fall safe valve 273 and a low mode clutch line 274 to the hydraulic pressure chamber 65 of the low mode clutch 60 to make engagement of the clutch 60, and when the second solenoid valve 272 is opened, the clutch engaging pressure base on the line pressure from the second output line 206 is supplied through a high mode clutch line 275 to the hydraulic pressure chamber 75 of the high mode clutch 70 to make engagement of the clutch 70.

The low mode and the high mode clutch lines 274, 275 are provided with accumulators 276, 277 respectively to gently supply the engaging pressure to the low mode and the high mode clutches 60, 70 and thereby to eliminate the shock during engagement.

The third output line 207 led out from the manual valve 208 is connected through the fail safe valve 273 to the control port 241a of the shift valve 241, and, when the manual valve 208 is shifted to the position of R-range, the line pressure is supplied to the control port 241a of the shift valve 241 to move the spool of the shift valve 241 to the left, that is, to the position for backward running.

Further, a fail safe solenoid valve 278 is provided for actuating the fail safe valve 273, and when the spool of the fail safe valve 273 is shifted to the right by the control pressure from the solenoid valve 278, the first output line 205 is made to communicate with the low mode clutch line 274.

All of the first and the second solenoid valves 271, 272 and the fail safe solenoid valve 278 are of three-way valves, and, when the line is intercepted by the valve into the upstream and the downstream sides, the downstream line is drained.

Figure 13:
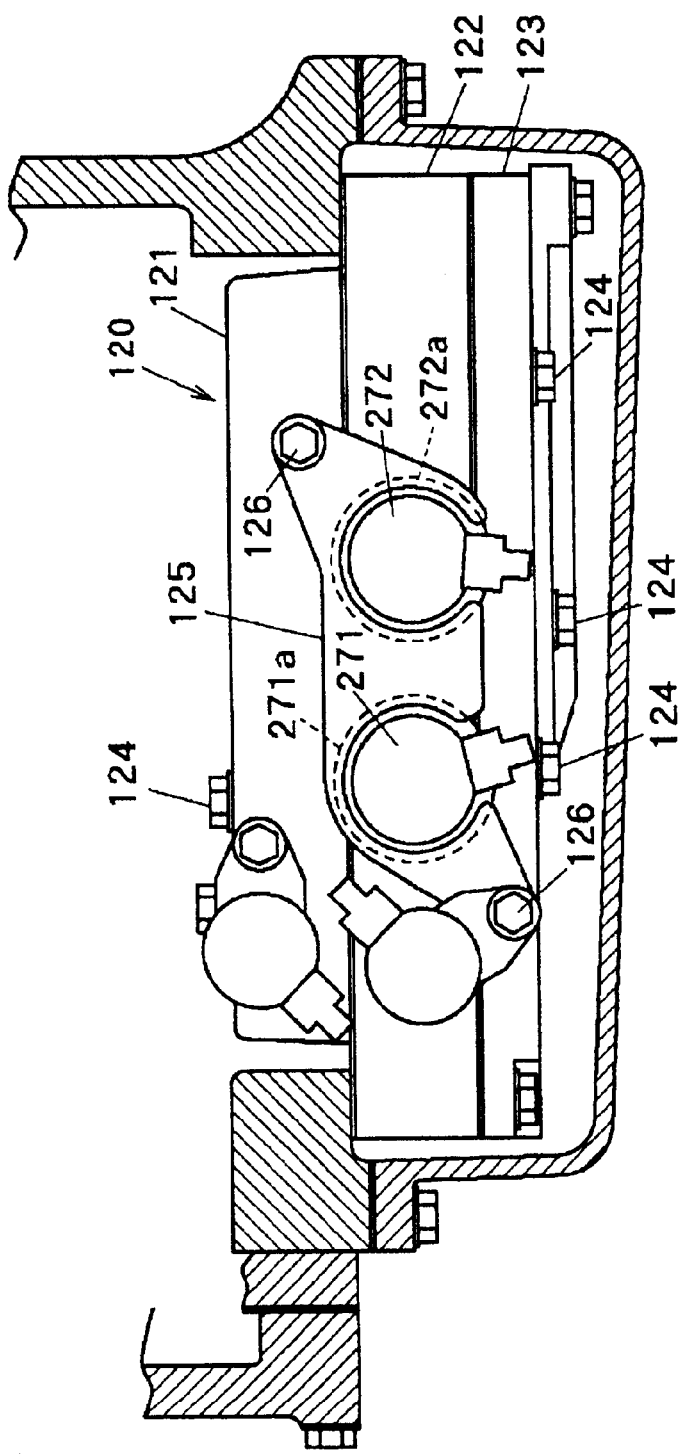
FIG. 13 is a cross sectional view illustrating the lower structure of the transmission case.

The clutch control unit 120, in which the first and the second solenoid valves 271, 272 and the like are disposed, comprises, as shown in FIG. 13, an upper member 121, a middle member 122, and a lower member 123 connected into one unit by a plurality of bolts 124, . . . , 124, and the first and the second solenoid valves 271, 272 are attached onto a side surface of the middle member 122 by a fixing plate 125.

At that time, the solenoid valves 271, 272 are fixed by placing flanges 271a, 272a formed on the outer surfaces of main bodies of the solenoid valves 271, 272 between the fixing plate 125 and the side surface of the middle member 122, and the fixing plate 125 is fastened to the upper and the lower members 121, 123 by bolts 126, 126, that means, the upper member 121 and the lower member 123 are connected with each other through the fixing plate 125, and thereby the rigidity of the clutch control unit 120 constructed as a three-layers structure is improved as a whole.

Adding to the structure described above, the hydraulic pressure control unit 200 shown in FIG. 10 is provided with a lubrication line 281. The lubrication line 281 is led from the drain port of the regulator valve 202 and is branched into a line 282 for supplying the lubricating oil to each lubrication point in the first and the second continuously variable transmission mechanism 20, 30 of the transmission 10, and a line 283 for supplying the lubricating oil to the portions other than the continuously variable transmission mechanisms 20, 30 such as the planetary gear mechanism 50, balance chambers 68, 78 of the low mode and the high mode clutches 60, 70, and the like, and a relief valve 284 for controlling a pressure of the lubricating oil to be a predetermined value is connected to the line 281.

An upstream portion of the line 282 communicating with the continuously variable transmission mechanisms 20, 30 is branched into a cooling line 286 on which a cooler 285 for cooling the lubrication oil is provided and a bypass line 287 for bypassing the cooler 285, and an orifice 288 and a first switching valve 289 are parallelly disposed on the cooling line 286 at the upper stream side of the cooler 285, and a second switching valve 290 for opening or closing the bypass line 287 is disposed on said line 287.

A supply control of the lubricating oil to the continuously variable transmission mechanisms 20, 30 by the first and the second switching valve 289, 290 will be described below.

First, the second switching valve 290 is opened by a signal from a control unit 300 (see FIG. 14), which will be described later, when the temperature of the operating fluid is lower than the predetermined value or when the hydraulic pressure of the operating fluid is higher than the predetermined value, and the lubricating oil is supplied to the continuously variable transmission mechanisms 20, 30 without passing through the cooler 285. This is because the lubricating oil need not be cooled by the cooler 285 when the oil temperature is lower and shall be supplied effectively through the bypass line 287 having smaller resistance, and because the damage and the deterioration in durability on the cooler 285 which might be caused when the high pressure oil passes through the cooler 285 shall be avoided.

In the case other than that described above, the second switching valve 290 is closed and the lubricating oil is supplied to the continuously variable transmission mechanisms 20, 30 after being cooled by the cooler 285, and thereby the oil film of the lubricating oil on the toroidal surfaces of the output disks 21, 22, 31, 32 is maintained to be proper condition and the durability of the toroidal surface and the surface of the rollers 23, 33 contacting therewith can be secured. The first switching valve 289 is controlled to be closed by the signal from the control unit 300 when the second switching valve 290 is closed and the revolution speed of the engine 1 is lower than the predetermined value or the vehicle speed is lower than the predetermined speed. This is because the clutches 60, 70 require a certain amount of lubricating oil, while the continuously variable transmission mechanisms 20, 30 require smaller amount thereof during low speed or low revolution driving, so that lubricating oil supply to the continuously variable transmission mechanisms 20, 30 shall be limited to secure that for the clutches 60, 70 under these conditions where the lubricating oil is not supplied sufficiently in the volume.

The lubricating oil supplied to the continuously variable transmission mechanisms 20, 30 through the line 282 is supplied to the bearings of the rollers 23, 33 through the oil channel 282a as shown in FIG. 3 and in injected also onto the toroidal surface of the output disks 21, 22, 31, 32 by a nozzle 282b.

(1) Basic operation of control

The continuously variable transmission 10 according to this embodiment has a mechanical structure and the hydraulic pressure control circuit 200 as described above, and also has a control unit 300 which implements the shift control of the transmission 10 as a whole by making a speed ration control of the first and the second continuously variable transmission mechanisms 20, 30 and an engage and disengage control of the clutches 60, 70 by the use of the hydraulic pressure control circuit 200.

Figure 14:
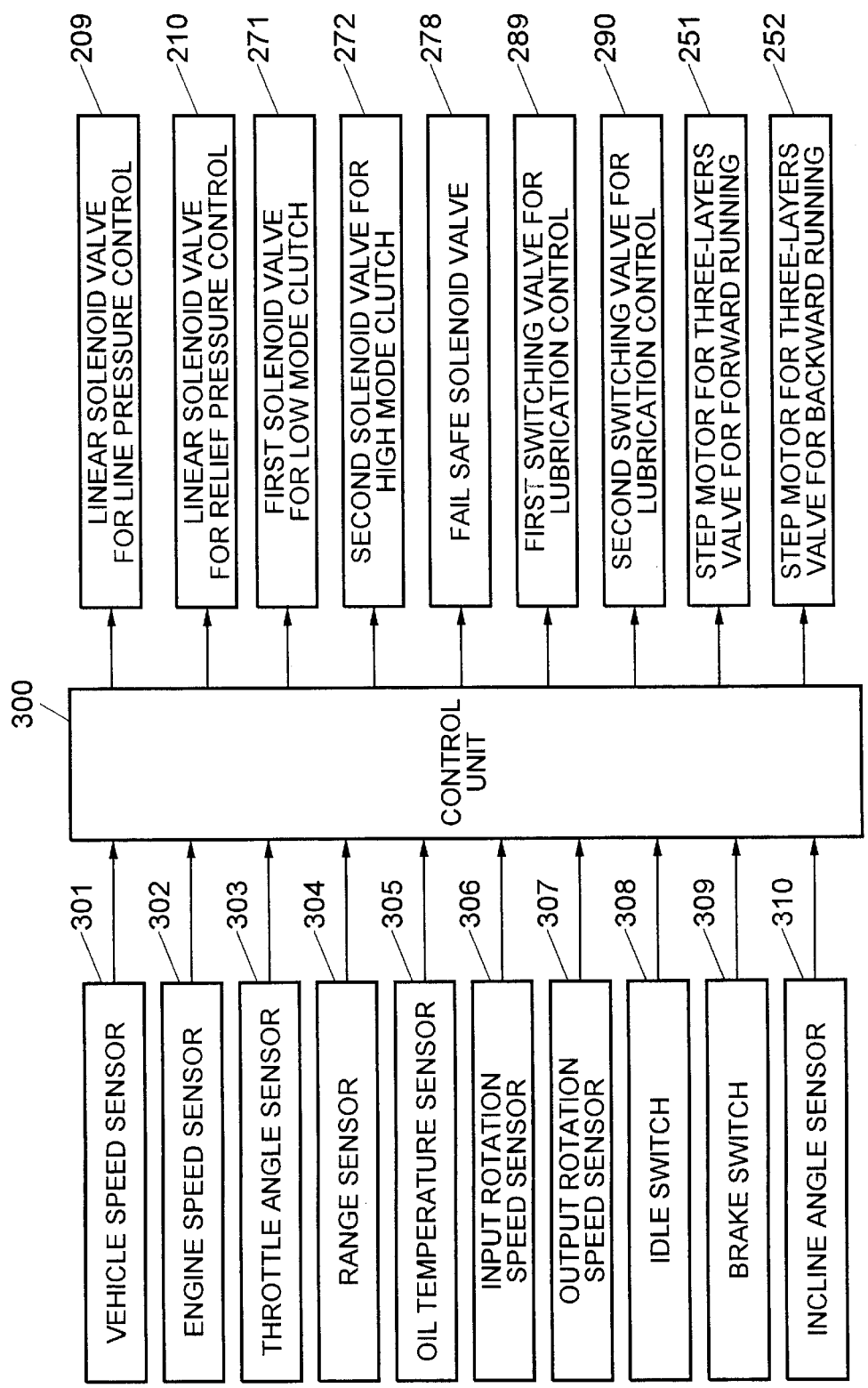
FIG. 14 is a control system diagram of the transmission of the preferred embodiment according to the present invention.

To the control unit 300 are inputted signals, as shown in FIG. 14, from a vehicle speed sensor 301 for sensing a vehicle speed, an engine speed sensor 302 for sensing an engine 1 speed, a throttle angle sensor 303 for sensing a throttle angle of the engine 1, a range sensor 304 for detecting a range selected by the driver, and further, for various control, from an oil temperature sensor 305 for sensing a temperature of the operating fluid, an input and an output rotation speed sensors, 306, 307 for respectively sensing the input and the output rotation speeds of the continuously variable transmission mechanisms 20, 30, and idle switch 308 for detecting a release of an accelerator pedal, a brake switch 309 for detecting a depressing on a brake pedal, an incline angle sensor 310 for sensing an incline angle of the road surface, and the like.

The control signal is outputted to the linear solenoid valves 209, 210, for controlling the line and the relief pressures, the first and the second solenoid valves 271, 272 for the low mode and the high mode clutches 60, 70, the fail safe solenoid valve 278, the first and the second switching valves 289, 290 for the lubrication control, the step motors 251, 252 for the three-layers valves for forward and backward running 220, 230 and the like, in response to the driving condition of the engine and the vehicle indicated by these sensors and the switches.

Then, the basic operation of the shift control by the hydraulic pressure control circuit 200 and the control unit 300 will be described. In the description below, if not specified otherwise, the manual valve 208 shown in FIG. 10 is in the D-range position and thereby the spool of the shift valve 241 is in the forward running position, which corresponds the right position on the drawing, and, as to the continuously variable transmission mechanism, the first roller 231 and the first trunnion 251 located upper side of the first continuously variable transmission mechanism 20 will be taken as an example for the explanation.

As for the speed ration control of the continuously variable transmission mechanisms 20, 30 by the hydraulic pressure control circuit 200, the linear solenoid valves 209, 210 for the regulator or the relief valves in the hydraulic pressure control circuit 200 are actuated to generate the control pressures for the line pressure control and the relief pressure control respectively based on the signal from the control unit 300, and these control pressures are respectively supplied to the control ports 202a, 204a of the regulator and the relief valves 202, 204 to generate the predetermined line pressure and the predetermined relief pressure respectively.

Among these hydraulic pressure, the line pressure is supplied from the main line 201 through the shift valves 241, and the line 242 to the line pressure port 224 of the three-layers valve for forward running 220 (hereafter referred to as "three-layers valve"). The relief pressure is supplied through the line 203 to the first and the second relief pressure ports 225, 226 of the three-layers valve 220.

A pressure difference ΔP (=PH−PL) between the hydraulic pressure for increasing speed PH and the hydraulic pressure for decreasing speed PL which are respectively supplied to the hydraulic pressure chamber for increasing speed 115 (this means 1151, 1152, and will be used below in the same meaning) and the hydraulic pressure chamber for decreasing speed 116 of the shift control unit 110 by the three-layers valve 220 is controlled based on the line pressure and the relief pressure. The object of the pressure difference control is to hold the trunnion 25 or the roller 23 in the predetermined neutral position against the traction force T applied to the trunnion 25 of the continuously variable transmission mechanism 20, and to change the speed ratio of the continuously variable transmission mechanism 20 by moving the trunnion 25 and the roller 23 from the neutral position along the axial center line X and thereby inclining the roller 23.

Figure 15:
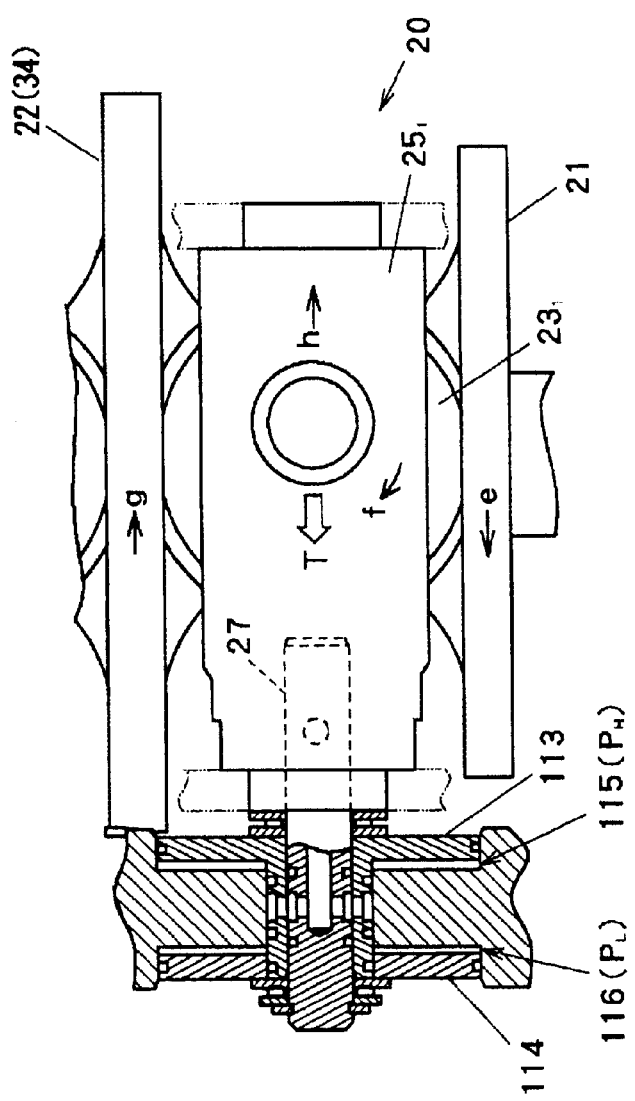
FIG. 15 is an explanatory drawing for the traction force as a precondition of the shift control.

As for the traction force T, as shown in FIG. 15, in the continuously variable transmission mechanism 20, when the roller 23 is driven by the rotation of the input disk 21 in "e" direction, to the roller 23 and the trunnion 25 supporting said roller is applied the force for dragging then in the same direction as the rotating direction "e" of the input disk 21. When the output disk 22 is driven into "g" direction ("x" direction in FIG. 3) by the rotation of the roller 23 in "f" direction, the force in the direction opposite to that of the rotation "g" of the output disk 22 is applied to the roller 23 and the trunnion 25 as a reaction force. As a result, the traction force T with the direction shown in the drawing is applied to the roller 23 and the trunnion 25.

Accordingly, in order to hold the roller 23 in the neutral position against the traction force T, the hydraulic pressures for increasing and for decreasing speed PH, PL are respectively supplied to the hydraulic pressure chambers for increasing and decreasing speed 115, 116 which are formed by the pistons 113, 114 attached to the trunnion 25 through the rod 27 so that the pressure difference ΔP balances with the traction force T.

When, for example, in order to decrease the speed ration of the continuously variable transmission mechanism 20 from this condition (acceleration), the sleeve 222 of the three-layers valve 220 is moved to the left in FIG. 11 (to the right in FIG. 10), the communication level between the line pressure port 224 and the acceleration pressure port 227 and that between the second relief pressure port 226 and the deceleration pressure port 228 of the three-layers valve 220 rise up.

Thereby, the hydraulic pressure for increasing speed PH supplied from the acceleration pressure line 248 shown in FIG. 10 to the hydraulic pressure chambers for increasing speed 115 is intensified by the relatively higher line pressure, and the hydraulic pressure for decreasing speed PL supplied from the deceleration pressure line 249 to the hydraulic pressure chamber for decreasing speed 116 is reduced by the relatively lower relief pressure, and consequently the pressure difference ΔP rise up, and, as a result, the pressure difference ΔP overcomes the traction force T and the trunnion 25 and the roller 23 are moved to "h" direction shown in FIG. 15. This movement makes the roller 23 inclined into the direction where the contact point with the input disk 21 moves radially outside and that with the output disk 22 moves radially inside, and thereby the speed ration of the continuously variable transmission mechanism 20 is shifted to the acceleration side.

The inclination of the roller 23 occurs in the same manner in the second continuously variable transmission mechanism 30 shown in FIG. 12, and a movement of the trunnion 35 in "i" direction caused by the pressure difference ΔP superior to the traction force T makes the roller 33 inclined into the direction where the contact point with the input disk 31 moves radially outside and that with the output disk 32 moves radially inside, and the precession cam 261 of the cam mechanism 260 rotates integrally with the inclination motion in the same direction ("j" direction in FIG. 11) by the same angle, and thereby all of the driven lever 263, the shaft 262 and the drive lever 264 of the cam mechanism 260 are rotated in "k" direction in FIG. 12.

As a result, the spool 223 of the three-layers valve 220 moves to "i" direction, to the left in FIG. 11, by the spring force of the spring 229, and since this direction corresponds to that of the sleeve 222 moved by the step motor 251, the communication level between the line pressure port 224 and the acceleration pressure port 227 and that between the second relief pressure port 226 and the deceleration pressure port 228, which has been once risen up, is restored to an initial neutral condition.

Thereby, the pressure difference ΔP is made to balance with the traction force again and the shift operation is completed, wherein the speed ration of the continuously variable transmission mechanism 20 (and 30) is fix to new value with a certain amount of change.

At that time, this shift actuation finishes when the spool 223 moves to the predetermined neutral position relative to the sleeve 222, and, since this position corresponds to that of the sleeve 222 moved by the step motor 251 and also that determined by the incline angle of the roller 23 and the trunnion 25 through the cam mechanism 260, the position of the sleeve 222 corresponds to the incline angle of the roller 23 and the trunnion 25. As a result, a controlled amount by the step motor 251 corresponds to the speed ratio of the continuously variable transmission mechanism 20 is controlled by the pulse control of the step motor 251 (and this can be applied also to the continuously variable transmission mechanism 30).

Above actuation is implemented in the same manner when the sleeve 222 of the three-layers valve 220 is moved by the step motor 251 to the opposite direction, and, at that time, the speed ratio of the continuously variable transmission mechanism 20 is made larger (,where the car is decelerated). The characteristic of the change in the speed ratio of the continuously variable transmission mechanisms 20, 30 with respect to the number of the pulse of the control signal inputted into the step motors 251, 252 is, for example, shown in FIG. 16, wherein the speed ration becomes smaller (that is, the car is accelerated) as the number of the pulse increases.

Then, the control of the speed ration of the whole transmission 10 (final speed ratio), which employs the speed ration control of the continuously variable transmission mechanisms 20, 30 described above, will be explained.

As described above, the speed ratio of the continuously variable transmission mechanisms 20, 30 is controlled through the step control of the step motors 251, 252, wherein different final speed ratio is brought depending on whether transmission 10 is in the low mode or in the high mode, that is, which one of the low mode clutch 60 and the high mode clutch 70 is engaged.

Figure 16:
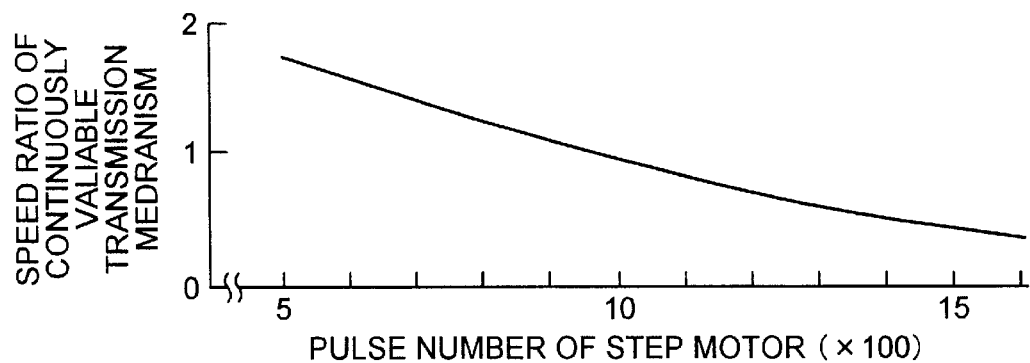
FIG. 16 is a characteristic drawing illustrating a relation between the number of the pulse of the step motor and the toroidal speed ratio.
Figure 17:
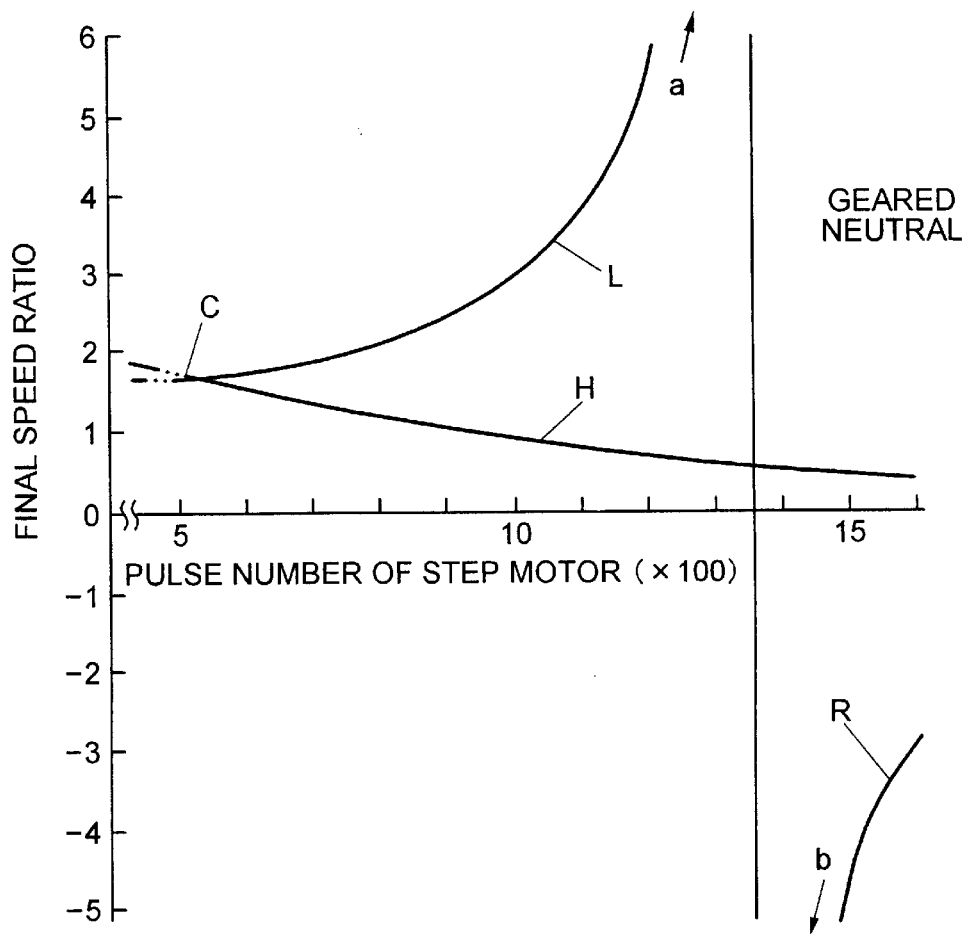
FIG. 17 is a characteristic drawing illustrating a relation between the number of the pulse of the step motor and the final speed ratio.

In high mode, since to output rotation of the continuously variable transmission mechanisms 20, 30 is directly transmitted to the secondary shaft 13 through the high mode gear train 90 and the high mode clutch 70, not through the planetary gear mechanism 50, as described above, the characteristic H of the final speed ratio with respect to the pulse number is, as shown in FIG. 17, similar to that of the speed ratio of the continuously variable transmission mechanisms 20, 30 shown in FIG. 16. It is needless to say that the speed ratio values may differ with each other depending on the difference in the diameter or the tooth number of the first gear 91 and the second gear 92 of the high mode gear train 90.

On the other hand, in the low mode, the revolution of the engine 1 is inputted from the input shaft 11 through the low mode gear train 80 and the low mode clutch 60 into the pinion carrier 51 of the planetary gear mechanism 50, and, at the same time, the output rotation of the continuously variable transmission mechanisms 20, 30 is inputted through the high mode gear train 90 into the sun gear 52 of the planetary gear mechanism 50. At that time, when the ratio between the rotation speed inputted into the pinion carrier 51 and that inputted into the sun gear 52 is set to a certain predetermined value by controlling the speed ratio of the continuously variable transmission mechanisms 20, 30, the rotation speed of the internal gear 53, which is an output element of the planetary gear mechanism 50, may become zero, that is, the geared neutral condition may be obtained.

Under this condition, the final speed ratio becomes infinite as shown in FIG. 17 by the symbols "a", "b", and, when the speed ratio of the continuously variable transmission mechanisms 20, 30 is changed to the larger side (deceleration side) to lower the input rotation speed into the sun gear 52 by decreasing the pulse number of the control signal for the step motors 251, 252 starting from this condition, the internal gear 53 of the planetary gear mechanism 50 begins to rotate in the forward running direction and the characteristic L in which the final speed ration becomes smaller as the pulse number decreases is obtained, that is, the low mode of the D-range is obtained. The curves of the low mode characteristic L and the high mode characteristic H crosses with each other at a predetermined pulse number (approximately 500 pulse in the drawing) or at a predetermined speed ratio of the continuously variable transmission mechanisms 20, 30 ( approximately 1.8 in the drawing), which is shown by "c" in the drawing. Therefore, when the low mode clutch 60 and the high mode clutch 70 are switched in this cross point "c", the modes can be switched with continuously changing final speed ratio.

When the speed ratio of the continuously variable transmission mechanisms 20, 30 is changed to the smaller side (acceleration side) to raise the input rotation speed into the sun gear 52 by increasing the pulse number of the control signal for the step motors 251, 252 staring from the geared neutral condition, the internal gear 53 of the planetary gear mechanism 50 begins to rotate in the backward running direction and the characteristic R of the R-range in which the final speed ratio becomes larger as the pulse number increases is obtained.

Based on the control characteristics described above, the control unit 300 controls the final speed ratio in response to the driving condition of the vehicle.

Figure 18:
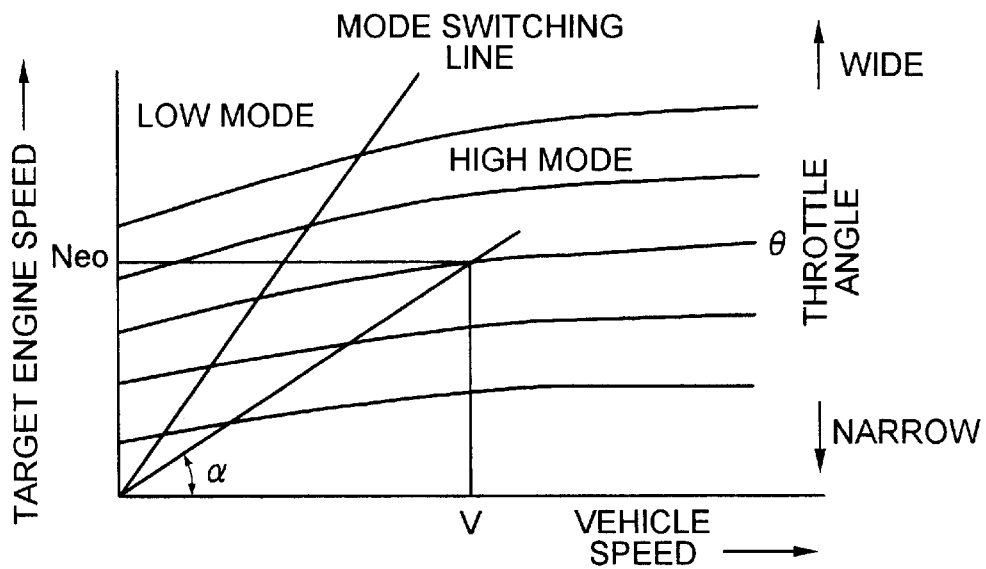
FIG. 18 is a characteristic diagram used in the shift control.

The control unit 300 finds a current vehicle speed V and a throttle angle θ based on the signals from the vehicle speed sensor 301 and the throttle angle sensor 303 and sets a target engine speed Neo by the use of these values and a predetermined map shown in FIG. 18. Then, in order to obtain the corresponding final speed ratio to the target engine speed Neo (the value which corresponds to the angle α in FIG. 18), the control unit 300 implements, based on the control characteristic shown in FIG. 17, the pulse control for the step motors 251, 252 and the engagement control of the low mode and the high mode clutches 60, 70 through the control of the first and the second solenoid valves.

Adding to the speed ratio control of the continuously variable transmission mechanisms 20, 30 by the pulse control of the step motors 251, 252 (hereafter, referred to as "three-layers valve control"), the control unit 300 of the transmission 10 also implements the speed ratio control of the continuously variable transmission mechanisms 20, 30 by directly generating the predetermined pressure difference ΔP by controlling the relief pressure with the linear solenoid valve 210 (hereafter, referred to as "direct control"). The reason thereof is as follows.

Figure 19:
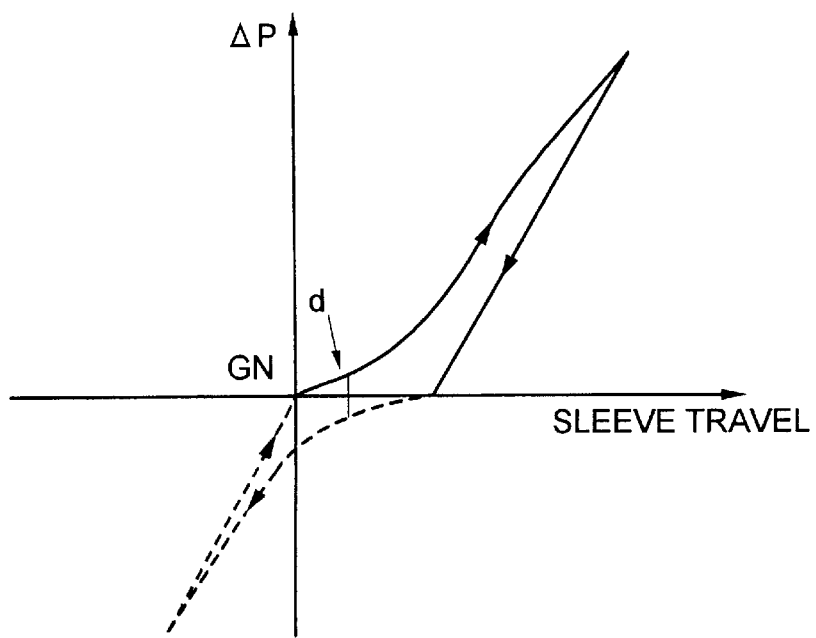
FIG. 19 is an explanatory drawing for the problem in the shift control by the three-layers valve.

Though the three-layers valve control is implemented on condition that there is a certain relation between the pulse number of the step motors 251, 261 or the travel of the sleeves 222, 223 and the pressure difference ΔP generated thereby, there might occur a hysteresis in this relation, for example, by the friction applied to the sleeves 222, 232 during travelling as shown in FIG. 19, which shows different paths of the relation between the travelling of the sleeve in the increasing direction of the pressure difference ΔP and that in the decreasing direction. Thereby, there might occur an inversion of the pressure difference ΔP placing a geared neutral position therebetween in a point shown by "d" near the geared neutral (GN) due to the hysteresis, and, as a result, the driving direction might be inverted between the forward and the backward running.

To cope with this problem, the pressure difference ΔP may be directly generated to supply to the hydraulic pressure chambers for increasing or decreasing speed 115, 116, and the line pressure may be controlled therefor, but the line pressure has a rather wider control range such as 4–16 kg, so that it has a disadvantage in making a minute control of the pressure difference ΔP and also has another disadvantage that the hydraulic line pressure must be raised to make the predetermined pressure difference ΔP resulting in a high pressure in the whole circuit and thereby an increase of the oil pump loss.

Therefore, when the pressure difference ΔP is generated, the relief pressure which is lower than that of the line pressure has an advantage in making the pressure difference ΔP by lowering itself, and, because of the narrower control range of the relief pressure such as 0–4 kg, it can be preferably used in minute control of the pressure difference ΔP.

In the direct control, the line pressure and the relief pressure are supplied without being regulated by the three-layers valve 220 as the hydraulic pressures for increasing or decreasing speed PH, PL which are supplied to the hydraulic pressure chambers for increasing or decreasing speed 115, 116. When the sleeve 222 and the spool 223 of the three-layers valve 220 are actuated from the neutral position shown in FIG. 10 to make the speed ration of the continuously variable transmission mechanism 20 lower (acceleration), the sleeve 222 is, at first, moved to the right in the drawing by a predetermined stroke to make the communication level between the line pressure port 224 and the acceleration pressure port 227 and that between the second relief pressure port 226 and the deceleration pressure port 228 are raised up so that the line pressure is supplied from the acceleration pressure line 248 to the hydraulic pressure chamber for increasing speed 115 and the relief pressure is supplied from the deceleration pressure line 249 to the hydraulic pressure chamber for decreasing speed 116.

As a result, the trunnion 25 or the roller 23 are moved by the pressure difference ΔP between the line pressure as a hydraulic pressure for increasing speed PH and the relief pressure as a hydraulic pressure for decreasing speed PL to the acceleration direction to incline the roller 23, and the spool 223 is moved by the cam mechanism 260 to the same direction with the sleeve 222 in response to the incline angle of the roller 23, and at that time, the incline angle of the roller 23 and the travel of the spool 223 are determined by the pressure difference ΔP, not by the initial travel of the sleeve 222, so that, when the travel of the sleeve 222 is set so as for the communication relation between said ports to be kept even after the roller 23 is inclined and the spool 223 is moved, or when the sleeve 222 is moved in the predetermined direction after an initial travel thereof so as for the communication relation between said ports to be kept, the direct shift control by the pressure difference ΔP is enabled even after the roller 23 is inclined and the spool 223 is moved.

In this transmission 10, the direct control is always implemented near the geared neutral condition where the influence of the hysteresis is likely to appear in the three-layers valve control, in other words, is implemented during low vehicle speed. In addition, the control unit 300 of the transmission 10 is made to implement the control which dare not make the geared neutral condition in order to generate a creep force (hereafter, referred to as "creep control") as an automatic transmission having a torque converter when the vehicle speed is in the low speed range, where the direct control is implemented, and the idle switch 308 is on. The reason thereof will be described below.

The geared neutral means to keep the internal gear 53 of the planetary gear mechanism 50 stationary by setting the ratio between the rotation speed inputted into the sun gear 52 of the planetary gear mechanism 50 through the high mode gear train 90 and that inputted into the pinion carrier 51 of the planetary gear mechanism 50 through the low mode gear train 80 to the predetermined value, and therefor the toroidal speed ratio is controlled by the three-layers valve control or the direct control described above, and there is only one rotation speed ratio between the sun gear 52 and the pinion carrier 51 to actualize the geared neutral and therefore there is only one toroidal speed ratio. As a result, extremely minute toroidal speed ratio control is required and it is shifted frequently to the forward or the backward running direction.

When the vehicle starts to move from the temporary stop condition, the geared neutral does not allow the vehicle to start only be releasing the brake pedal but requires to depress the accelerator pedal. Accordingly, to secure a good startability by always applying a certain degree of driving force to the vehicle as the automatic transmission with a torque converter does, the toroidal speed ratio must be controlled with some offset from the geared neutral position, for example, so as to slightly apply a forward driving force in the forward running range such as D-range, and so as to slightly apply a backward driving force in the backward running range of the R-range. This kind of creep control does not require such a minute control, so that this brings some advantage in braking actuation. As described above, in this transmission 10, since the creep control is implemented when the vehicle speed is in low speed range, where the direct control is implemented, and the idle switch 308 is on, the three-layers valve control is switched into the direct control and at the same time into the creep control when, for example, the vehicle speed is lowered while the driver releases the accelerator pedal, and, on the contrary, when the vehicle speed is lowered with the accelerator pedal depressed on the up-hill etc., normal shift control is implemented based on the shift map under the direct control and then the creep control begins when the accelerator pedal is released for depressing the brake pedal.

While the vehicle is at a stop, the creep force is made as small as possible to save the fuel consumption, and when starting, the creep control is applied from the beginning, and then is replaced by the normal direct control as the accelerator pedal is depressed, and, when the vehicle speed exceeds a certain level, the three-layers valve control is applied.

(2) Concrete actuation in respective controls

Figure 20:
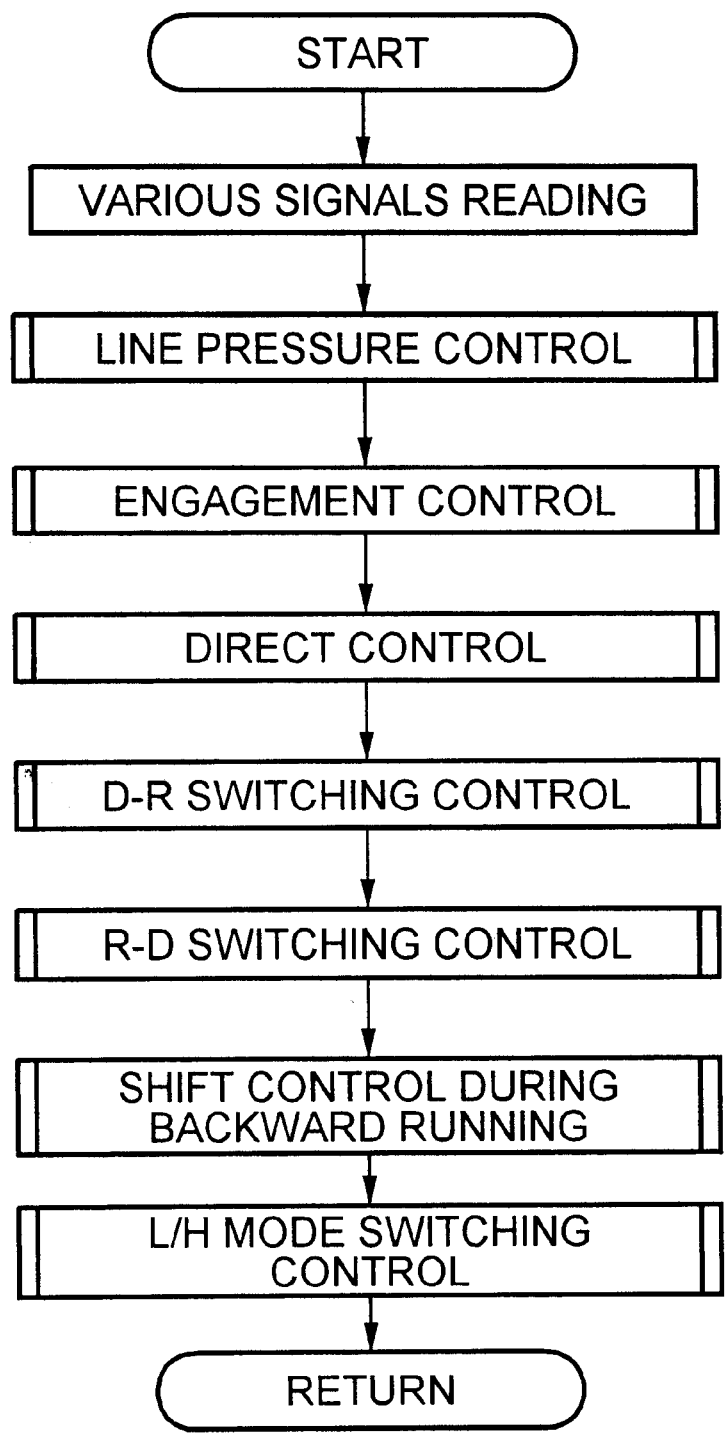
FIG. 20 shows the main flow chart implemented by the control unit.

As shown in FIG. 20, various control programs are stored in the control unit 300 to cope with various kinds of conditions based on the shift actuation described above, and the interruption by each control is executed when required independently or associated with other controls.

(2-1) Line pressure control

As described above, the pressure of the operating fluid discharged from the oil pump 102 is supplied to the main line 201 through the regulator valve 202 after being regulated by the linear solenoid valve 209 into predetermined line pressure, but, in the shift control, this line pressure is led to the three-layers valve 220, 230 together with the relief pressure which is supplied to the relief pressure line 203 through the relief valve 204 after being regulated by the linear solenoid valve 210 into a pressure lower than the line pressure, and is used as an important pressure to generate the pressure difference ΔP for the shift control in which, while the roller 23, 33 or the trunnion 25, 35 of the continuously variable transmission mechanism 20, 30 being held in the neutral position against the traction force T, the trunnion 25, 35 is moved in the predetermined direction to incline the roller 23, 33.

Accordingly, the pressure difference ΔP is controlled so as to hold the trunnion 25, 35 in the neutral position in response to the increase or decrease of the traction force T, and, for example, when the relief pressure is constant, the pressure difference ΔP can be expanded by increasing the line pressure to counteract the larger traction force T, and, when the line pressure is constant, the pressure difference ΔP can be expanded by decreasing the relief pressure to counteract the larger traction force T.

Figure 21:
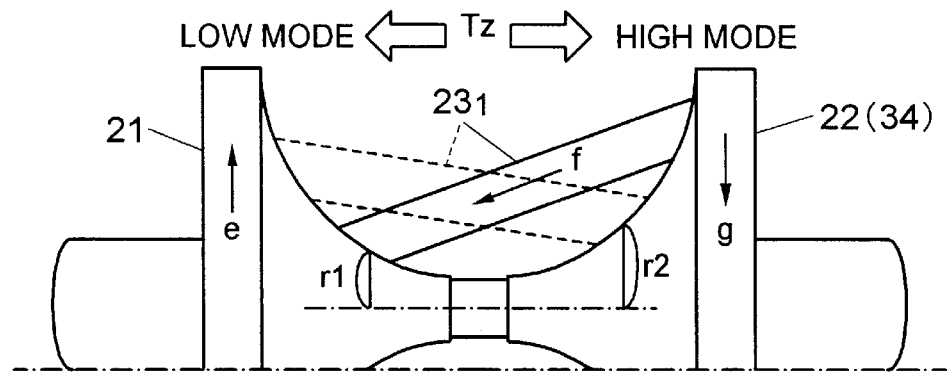
FIG. 21 is an explanatory drawing illustrating the feature of the line pressure control implemented by said control unit.

The traction force T is varied not only by the engine torque but also by the incline angle of the roller 23, 33. As shown in FIG. 21 by an example of the first roller 231 of the first continuously variable transmission mechanism 20, when the roller 231 is inclined into the deceleration side as a result of the shift control, as shown in the drawing by a solid line, a radius r1 of the contact point between the roller 231 and the input disk 21 becomes smaller comparing with the case where the roller 231 is inclined into the acceleration side as shown by a chain line in the drawing, and, therefore, even if the torque Tz transmitted from the input disk 21 to the roller 231 is constant, the drag force applied to the roller 231 at the contact point becomes larger and the reaction force at the contact point of the roller 231 with the output disk 22 also becomes larger. Thus, as the roller 231 inclines into the deceleration side, the traction force T increases as a whole.

The torque Tz is transmitted in the direction described above in the high mode (H-mode) where the low mode clutch is disengaged and the high mode clutch is engaged, and, in this high mode, as the speed ratio of the continuously variable transmission mechanism 20, 30 (hereafter, also referred to as "toroidal speed ratio") becomes larger, the line pressure is controlled to be increased when the relief pressure is constant, or the relief pressure is controlled to be decreased when the line pressure is constant so as for the pressure difference ΔP for counteracting the traction force T to be expanded.

On the other hand, in the low mode (L-mode), the torque is transmitted in the opposite direction of that of the high mode due to the circulating torque circulated back to the continuously variable transmission mechanism 20, 30 as a reaction force from the planetary gear mechanism 50 (see FIG. 9). Accordingly, in the low mode, when the roller 231 is inclined into the acceleration side as shown by a chain line in FIG. 21, a radius r2 of the contact point between the roller 231 and the output disk 22 becomes smaller and thereby the traction force T becomes larger, and, therefore, as the toroidal speed ratio becomes smaller, the line pressure is controlled to be increased when the relief pressure is constant, or the relief pressure is controlled to be decreased when the line pressure is constant so as for the pressure difference ΔP for counteracting the traction force T to be expanded.

Figure 22:
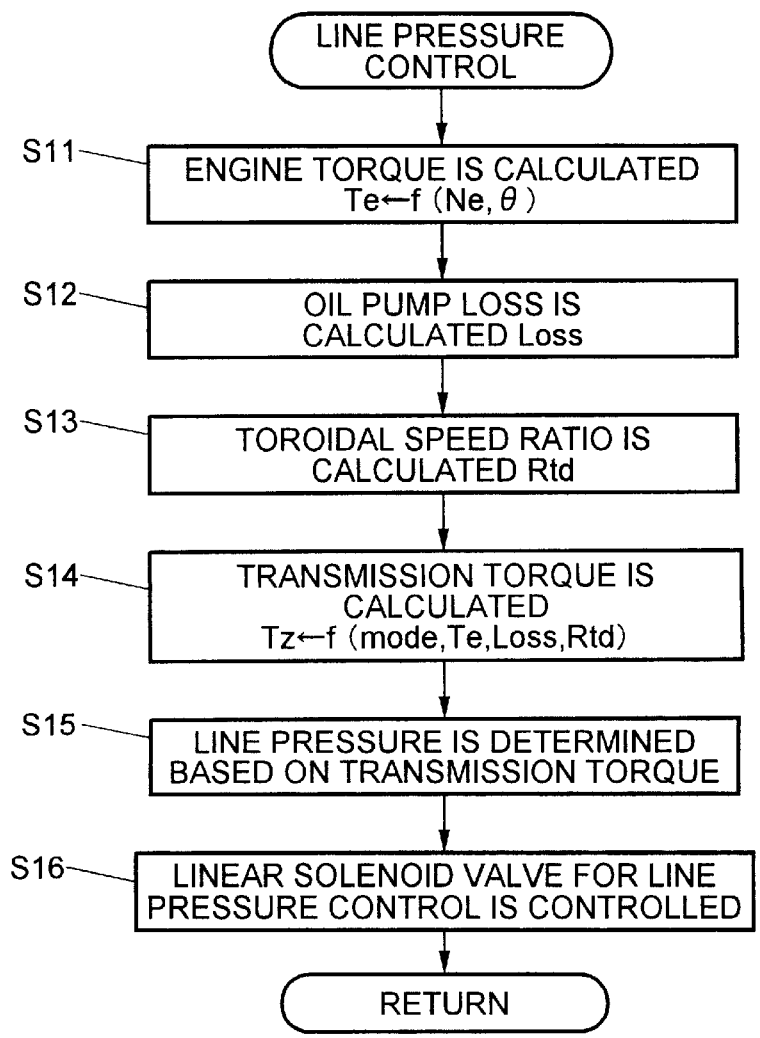
FIG. 22 is a flow chart of said line pressure control.
Figure 23:
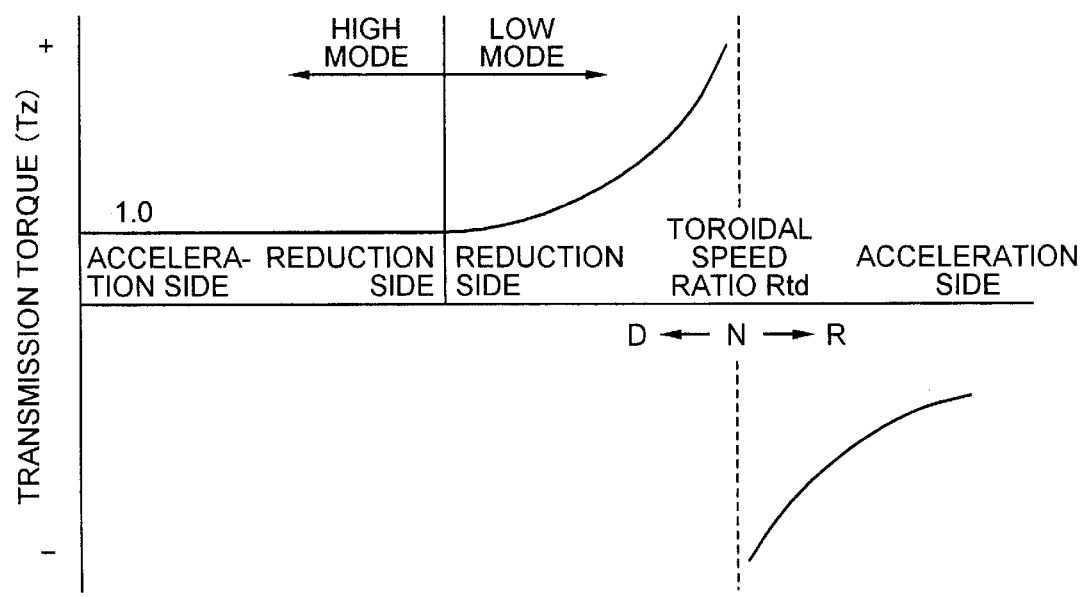
FIG. 23 is a characteristic diagram of said line pressure control.

The concrete actuation of the line pressure control by the control unit 300 is shown, for example, in FIG. 22, wherein the engine torque Te is calculated from the engine speed Ne and the throttle angle θ in step S11, the oil pump loss "Loss" is calculated in step S12, and the toroidal speed ratio Rtd is calculated from the input and the output rotation speeds of the continuously variable transmission mechanisms 20, 30 in step S13 respectively, and then the transmission torque Tz value is determined in step S14 from the map shown, for example, in FIG. 23 by the use of above calculated values and modes as parameters. As shown in the map, in the low mode D-range, the transmission torque Tz increases as the toroidal speed ratio Rtd moves to the acceleration side, and the transmission torque Tz is fixed to 1.0 in the high mode.

Figure 24:
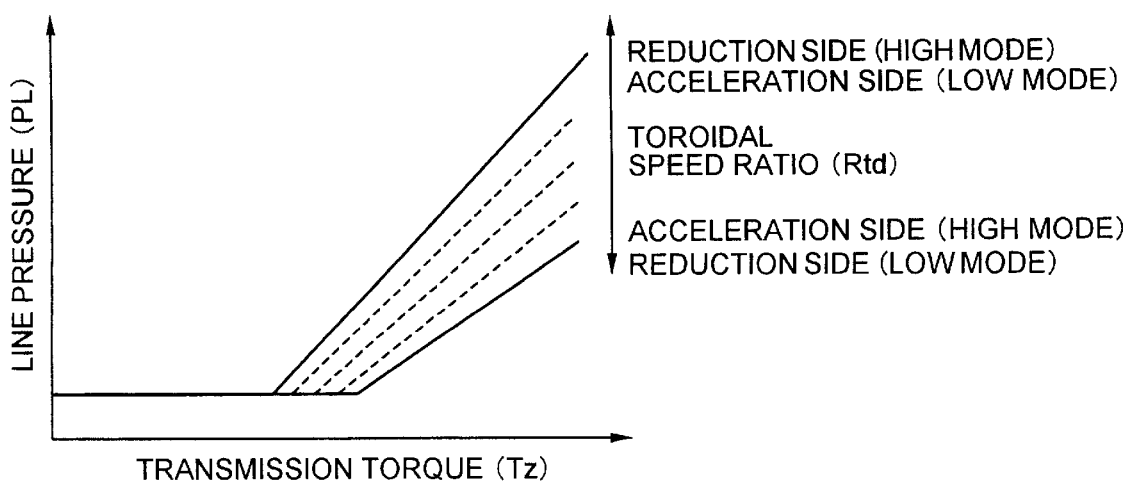
FIG. 24 is another characteristic diagram of said line pressure control.
Figure 25:
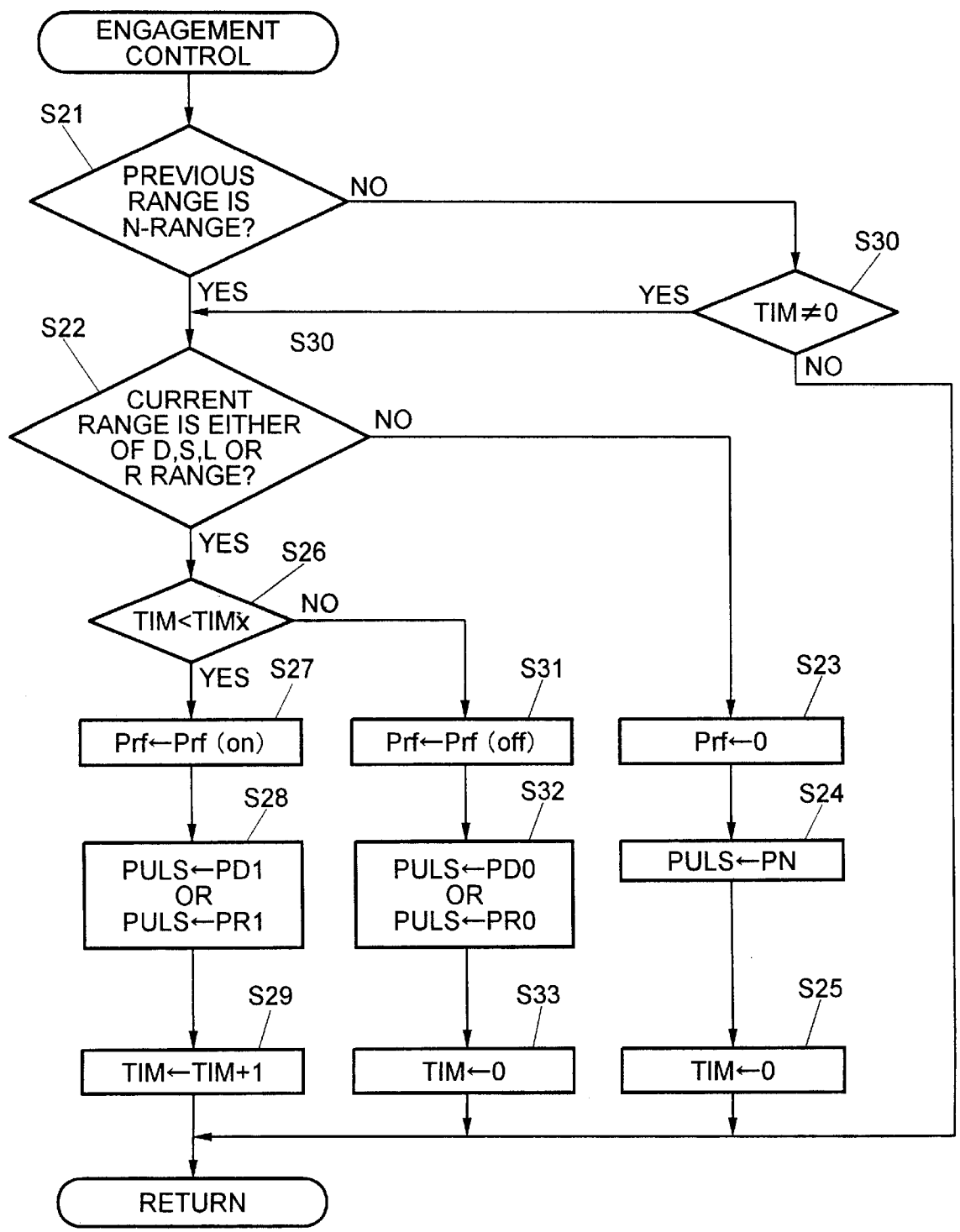
FIG. 25 is a flow chart of the engage control implemented by said control unit.

Then, in step S15, the line pressure PL is determined based on the transmission torque Tz from the map shown, for example, in FIG. 24, and, in step S16, the linear solenoid valve 209 is controlled so as for the line pressure PL to be obtained. In this map, the line pressure is raised up in the range where the transmission torque Tz exceed a predetermined value in order to counteract the traction force T, wherein, as described above, the line pressure is set to become larger as the toroidal speed ratio Rtd moves to the acceleration side in the low mode, and the line pressure is set to become larger as the toroidal speed ratio Rtd moves to the deceleration side in the high mode. The line pressure is fixed to a constant value in the range where the transmission torque Tz is less than the predetermined value, and, in this range, the pressure difference ΔP is controlled by increasing or decreasing the relief pressure. That is, in the low mode, the relief pressure is decreased as the toroidal speed ratio Rtd moves to the acceleration side, and, in the high mode, the relief pressure is decreased as the toroidal speed ratio Rtd moves to the deceleration side.

(2-2) Engage control

As described above, since, in the N-range, the main line 201 for supplying the line pressure is intercepted from the first to the third output lines 205–207 by the manual valve 208, both of the low mode and the high mode clutches 60, 70 are in the disengaged condition. When the driver shifts the range from this condition to the forward running range such as D-range, S-range and L-range, or to the backward running range of R-range, the low mode clutch 60 is engaged to make the low mode. At that time, if the toroidal speed ratio is controlled to make that of the geared neutral, the pinion carrier 51 of the planetary gear mechanism 50 and the secondary hear 82 of the low mode gear train 80 are synchronized in rotations with each other, so that if the low mode clutch 60 for connecting or disconnecting them is engaged, the engagement shock scarcely occurs.

However, since the N-range is generally selected at a stop with idling condition or in low vehicle speed, the engage actuation of N-D range or N-R range is implemented during the creep control. Thus, since the geared neutral condition is not employed in the creep control, the engagement shock is generated by the creep torque when the low mode clutch 60 is engaged.

Figure 26:
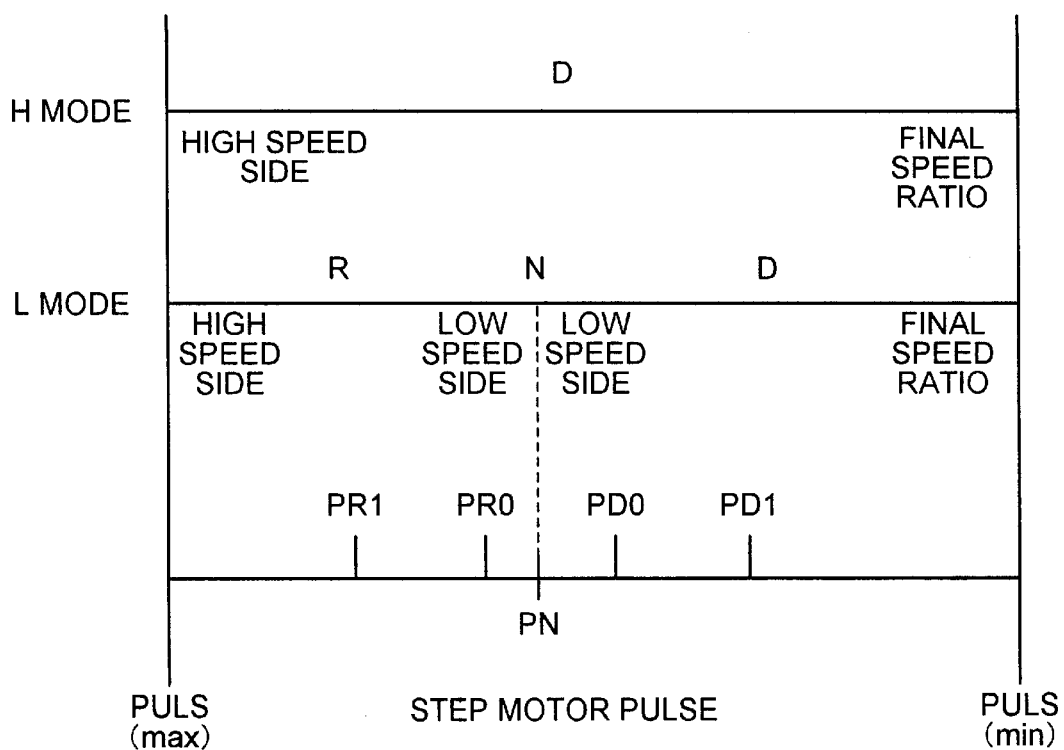
FIG. 26 is a characteristic diagram of said engage control.
Figure 27:
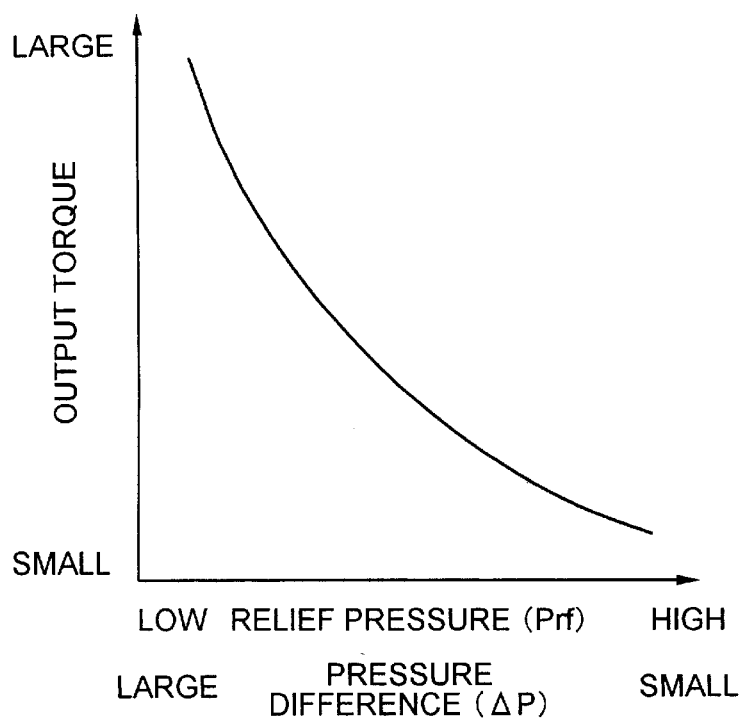
FIG. 27 is another characteristic diagram of said engage control.

The control unit 300 implements the engage control to suppress the engagement shock according to the flow chart shown in FIG. 26. Then the engage control will be described with reference to FIG. 26 which show the relation between the pulse number of the step motor 251 and the final speed ratio, FIG. 27 which shows the relation between the relief pressure and the output torque, and FIG. 31 which shows a time chart.

The control unit 300 judges, at first in step S21, if the range is in the N-range or not in the previous control cycle, and, in case of YES, judge if the current range is a running range such as D-, S-, R-ranges in step S22. In case of NO, which means N-range is continued, a relief pressure Prf is made to zero in step S23, and, in step S24, a pulse of the step motor 251 PLUS is set to PN which makes geared neutral condition and then a timer value TIME is set to zero in step S25.

The reason why the relief pressure Prf is set to zero when the N-range is continued is that it provide an advantage that unnecessary power is not consumed because the relief pressure Prf becomes zero when the linear solenoid valve 210 for relief pressure control is not actuated. The reason why the pulse PLUSE is set to PN which makes geared neutral condition is to make the sleeve 222 return to a set point as a preparation for generating a creep force by the direct control in the engage actuation expected thereafter, and therefore other point may be employed if it makes a relation between the sleeve 222 and the spool 223 of the three-layers valve 220 be in a predetermined neutral position and thereby communication between each port is intercepted.

On the other hand, when the current range is judged to be the running range such as D-, S-, L-, and R-ranges in step S22, the timer value TIM is judged in step S26, and when the timer value TIM is within a predetermined time TIMx which is required for engaging the low mode clutch 60, the relief pressure Prf is set to relatively high predetermined pressure Prf(on) in step 27, and in order to keep the communicating condition between each port in the three-layers value 220 to implement the direct control, in step S28, when the current shifted range is the forward running range such as D-range, the pulse PLUSE of the step motor 251 is shifted from PN to the PD1, where the final speed ratio is in the high speed side, and, when the current shifted range is the backward running range of R-range, the pulse PLUSE of the step motor 251 is shifted to the PR1, where the final speed ratio is in the high speed side, and then the timer value TIM is added by 1 in step S29.

That is, during the predetermined time TIMx required for engaging the low mode clutch 60, the relief pressure Prf is set to higher value, and thereby the pressure difference ΔP, the offset from the line pressure, is made smaller to close to the geared neutral condition, and the creep force (output force) is set lower. Therefore, the engagement shock in the engage actuation is suppressed.

When the timer value TIM exceeds the predetermined time TIMx required for engaging the low mode clutch 60 in step S26, the relief pressure Prf is set to relatively low predetermined pressure Prf(off) in step S31, and in order to keep the communicating condition between each port in the three-layers valve 220 to implement the direct control, in step S32, when the current shifted range is the forward running range such as D-range, the pulse PLUSE of the step motor 251 is shifted from PN to the PD0, where the final speed ratio is in the low speed side, and, when the current shifted range is the backward running range of R-range, the pulse PLUSE of the step motor 251 is also shifted to the PR0, where the final speed ratio is in the low speed side, and then the timer value TIM is set to zero in step S33.

That is, after the low mode clutch 60 is engaged, the relief pressure is set to lower value, and thereby the pressure difference ΔP, the difference from the line pressure, is made large to expand the offset from the geared neutral condition, and the creep force (output force) is set higher, Therefore, excellent startability may be secured.

(2-3) Direct control

Figure 28:
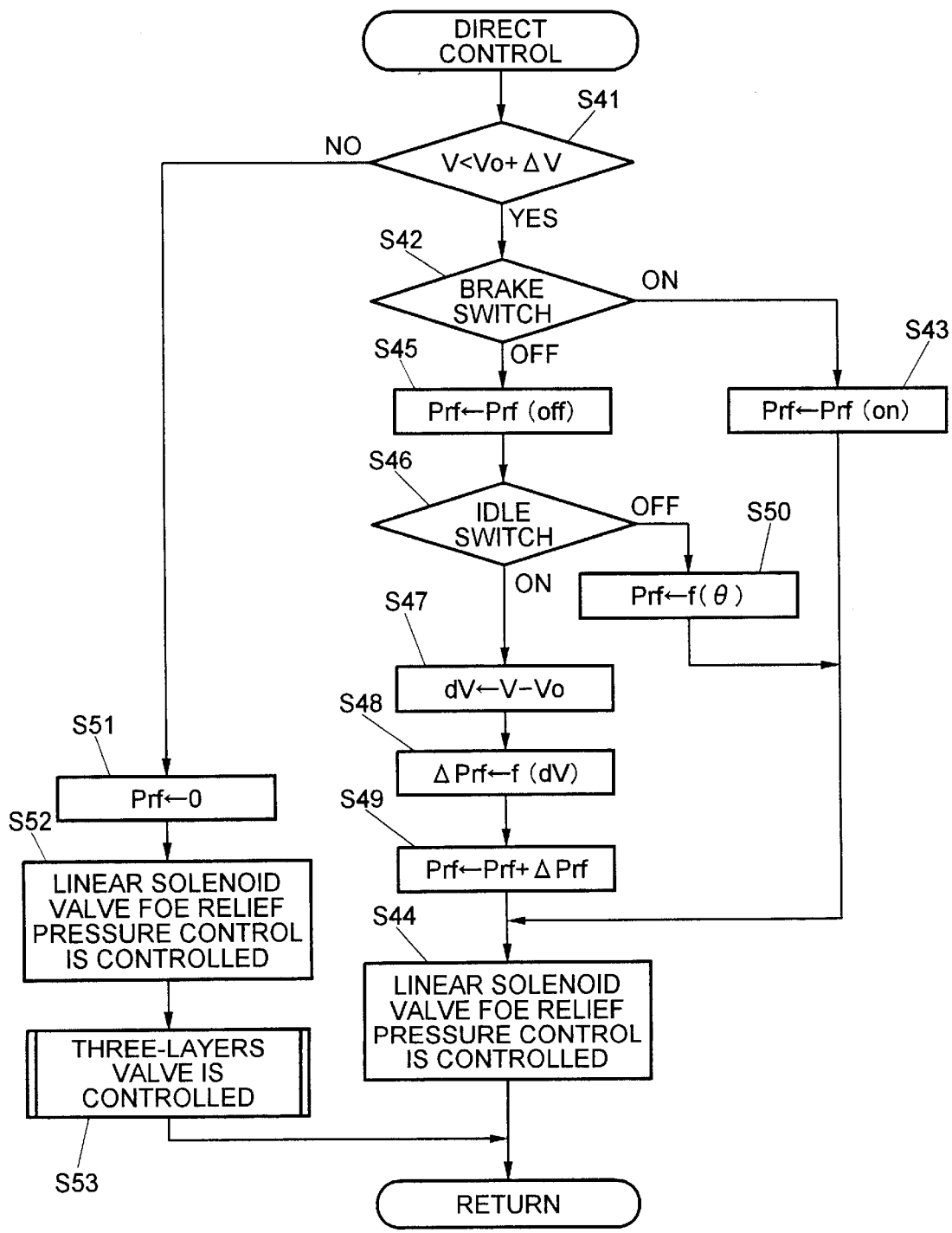
FIG. 28 is a flow chart of the direct control implemented by said control unit.

Adding to the basic actuation of the direct control itself described above, the control unit 300 of this transmission 10 implements some special control when the brake pedal is depressed or during creeping speed. The concrete control actuation in these cases is shown by the flow chart in FIG. 28, and this will be explained with reference to the time chart in FIG. 31. At first in step S41, the three-layers value control is replace be the direct control when the vehicle speed V falls below a certain speed which is higher than the target vehicle speed Vo in the creep control by a predetermined value ΔV, and, at that time, when the brake switch 309 is judged to be ON in step S43 (at that time, the idle switch 308 is in on and the creep control is begun), the relief pressure Prf is set to relatively higher predetermined pressure Prf(on) in step S43, and, in step S44, the linear solenoid valve 210 is controlled so as for this relief pressure Prf(on) to be obtained. That is, the relief pressure Prf is raised up to make the creep force smaller since an earlier deceleration is preferable when the brake pedal is depressed.

Figure 29:
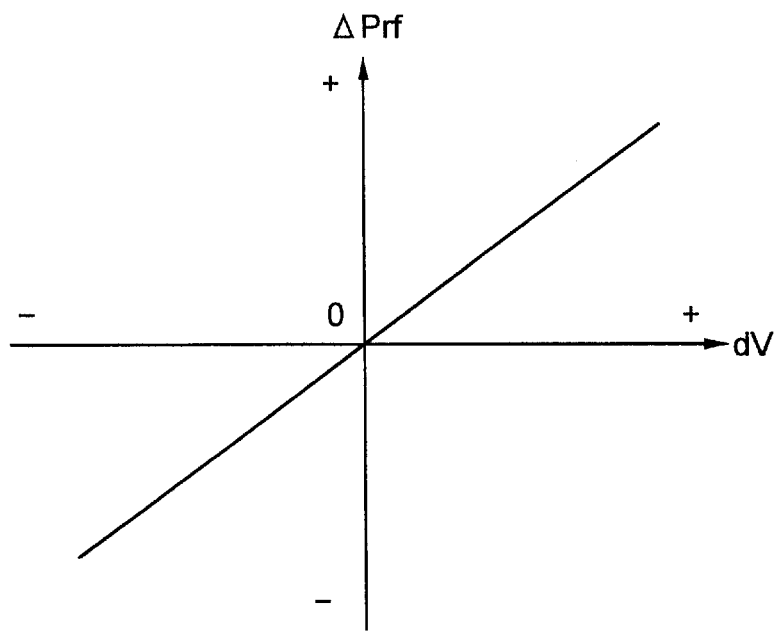
FIG. 29 is a characteristic diagram of said direct control.

On the other hand, when the brake switch 309 is in OFF in step S42, the relief pressure Prf is set to the relatively lower predetermined pressure Prf(off) in step S45. When the idle switch 308 is in ON in step S46, a deviation dV of the current vehicle speed V from the target vehicle speed Vo in the creep control is determined in step 47, and then a feedback pressure ΔPrf of the relief pressure Prf is derived from the map in FIG. 29 based on the deviation dV in step S48. The relief pressure Prf added by the feedback pressure ΔPrf is determined in step S49, and, in step S44, the linear solenoid valve 210 is controlled so as for this relief pressure Prf to be obtained. Thereby, the creep force is not decreased when the brake pedal is not depressed, so that the vehicle speed can be kept in the target vehicle speed Vo by the feedback control.

Figure 31:
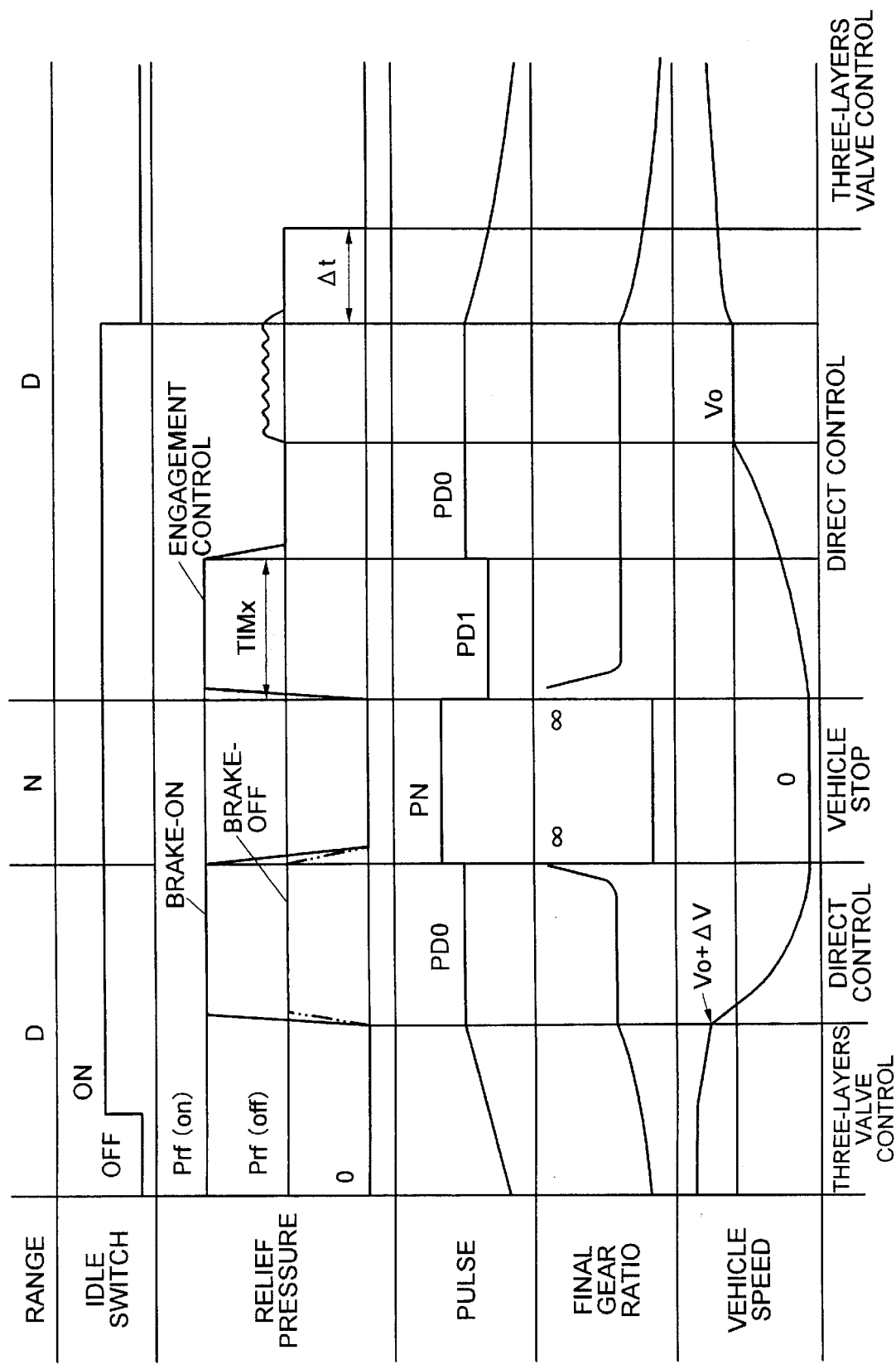
FIG. 31 is a time chart of said direct and engage controls.

The time charge of FIG. 31 shows the feedback control of the vehicle speed to the target vehicle speed Vo in a stop and during starting. The reason why the initiating condition of the direct control is set to the certain speed, which is higher than the target vehicle speed Vo by a predetermined value ΔV in step S41, is to prevent the direct control from being replaced by the three-layers valve control due to the overshoot during the feedback control of the vehicle speed V.

Figure 30:
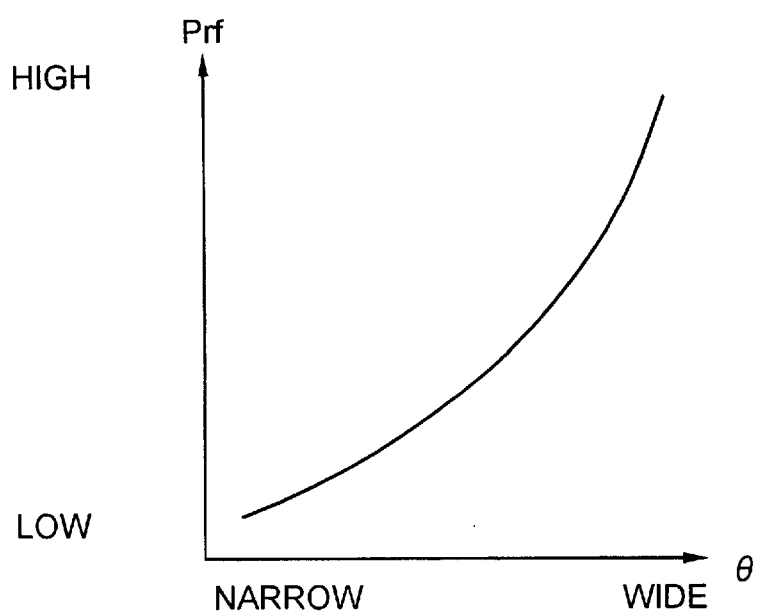
FIG. 30 is another characteristic diagram of said direct control.

When the idle switch 308 is in OFF, which means that the accelerator pedal is depressed, in step S46, the relief Prf is determined in response to the throttle angle θ in step S50, and, in step S44, the linear solenoid valve 210 is controlled so as for the relief pressure Prf to be obtained (during Δt period in the vehicle starting in FIG. 31). At that time, the relation between the relief pressure Prf and the throttle angle θ is set in a map, as shown in FIG. 30, so that the relief pressure Prf increases as the throttle angle θ increases. Thereby, the more the accelerator pedal is depressed, the more the creep force is lowered, that is, it moves close to the geared neutral condition and, as a result, the speed ratio becomes larger, the engine speed is raised, a better acceleration performance is achieved, and the switching to the three-layers valve control is performed smoothly.

When the vehicle speed V exceeds the speed of initiating condition of the direct control in step S41, the relief pressure Prf which generates the pressure difference ΔP associated with the line pressure in the three-layers valve control is set to zero in step 51, and, in step S52, the linear solenoid valve 210 is controlled so as for this relief pressure Prf is obtained and, in step S53, the control system moves to the three-layers valve control.

The pulse number of the step motor 251 in the point of switching between the three-layers valve control and the direct control does not necessarily coincide with each other, and, when the direct control starts, the sleeve 222 is moved from the position where the three-layers valve control ends to the corresponding position of the direct control (pulse number PD0), and, when the three-layers valve control starts, the sleeve 222 is moved from the position where the direct control ends (pulse number PD0) to the corresponding position of the three-layers valve control.

In the direct control, when the brake switch 309 is in ON in step S42, the relief pressure Prf is increased to make the creep force smaller, so that there exists some possibility of reverse direction running due to the decrease of the driving force when the creep force is immediately lowered upon switching ON of the brake switch 309 in the case where the vehicle is stopped on the slope, not on the flat road. To cope with this problem, a second direct control program is stored in the control unit 300 of this transmission 10.

Figure 32:
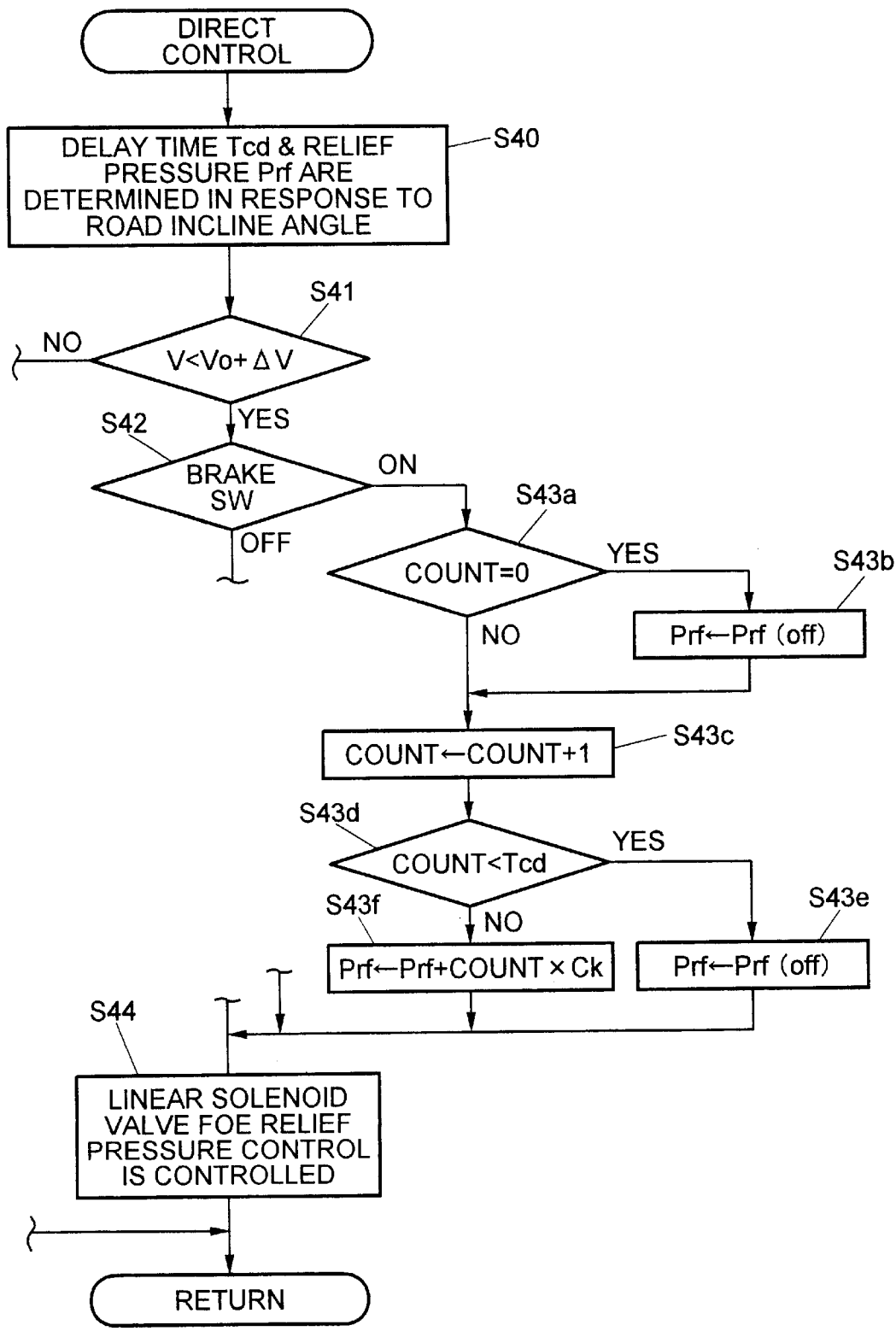
FIG. 32 is a flow chart of the second direct control including the inclination control.
Figure 35:
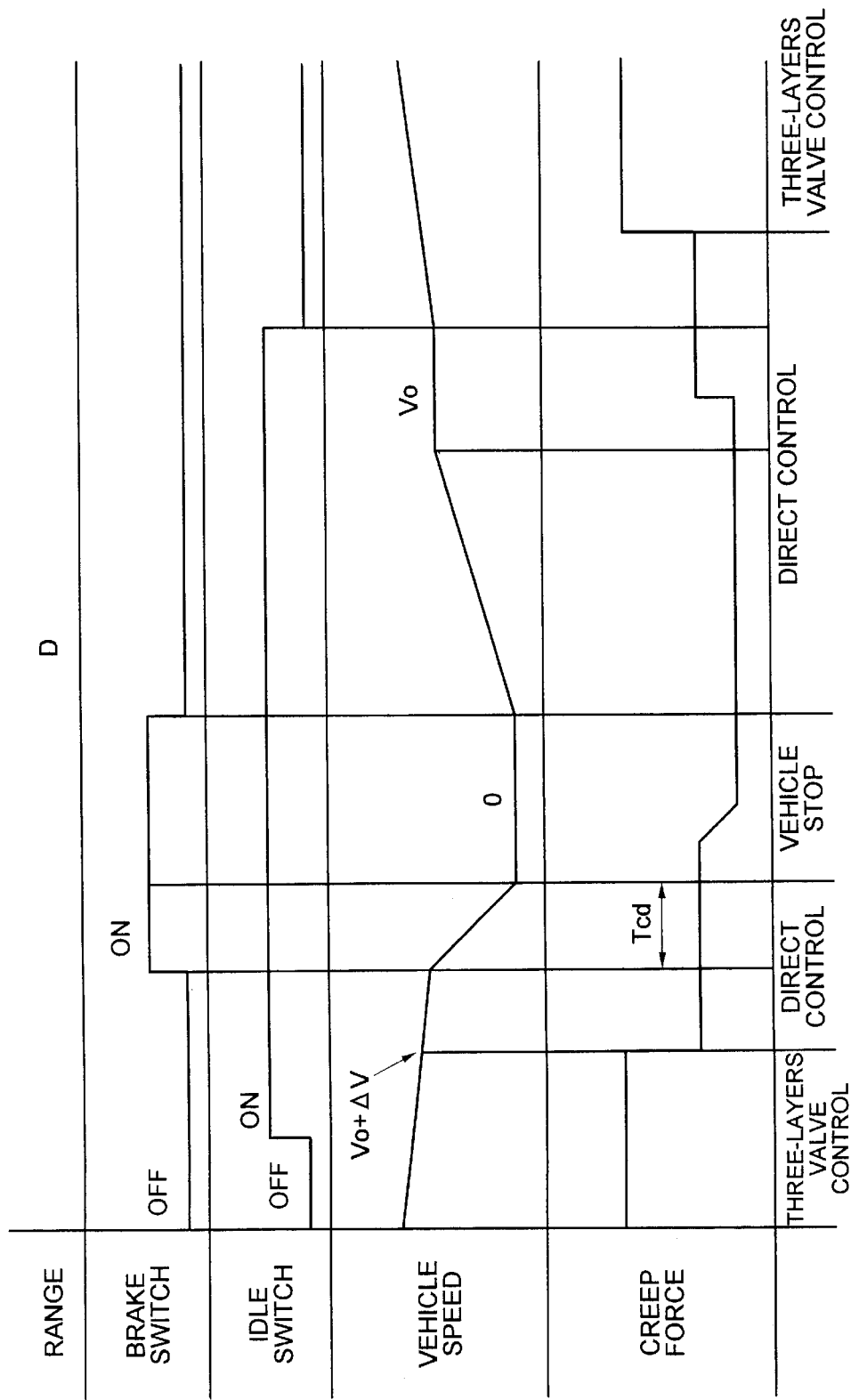
FIG. 35 is a time chart of said second direct control.

The second direct control including this incline angle control will be described with reference to the flow chart in FIG. 32 and the time chart in FIG. 35. The flow chart in FIG. 32 is the same with that in FIG. 28 with an exception that step S40 is added before step S41 and the step S43 is modified.

Figures 33, 34:
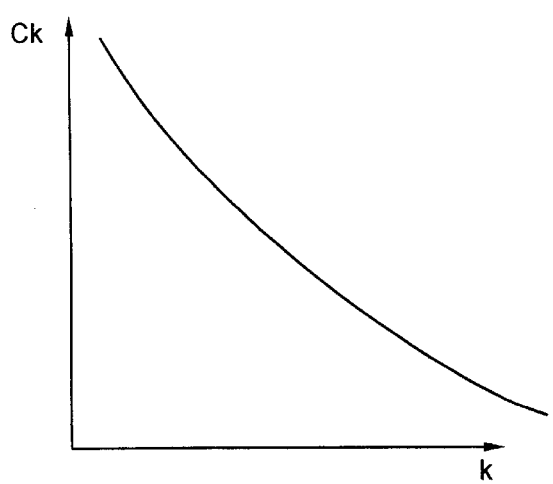
FIG. 33 is a characteristic table of said second direct control.
FIG. 34 is a characteristic diagram of said second direct control.

Prior to the judgement of the starting or the ending condition of the direct control in step S41, a delay time Tc and the relief pressure Prf are determined in response to the road incline angle "k" detected by the incline angle sensor 310 in step S40. At that time, as shown in FIG. 33, as an upward incline angle becomes steeper, the delay time Tc is set to be longer and the relief pressure Prf is set to be lower (so that the creep force becomes larger). The relief pressure Prf0 on the flat road is set to the value which makes normal creep force.

The direct control starts at step S41, and, when the brake switch 309 is in ON in step S42, a count number "count" is judged whether it is zero or not in step S43a, and when the judgement is YES, that is, when it's a first approach to the step S43a, the relief pressure Prf (, which is determined based on the incline angle,) is set to the relatively lower predetermined pressure Prf(off) in step S43b, as is done when the brake switch is in OFF, and then the count number is added by 1 in step S43c, and the count number is compared with the delay time Tcd determined based on the incline angle in step S43d.

When the count number is within the delay time Tcd, the above relatively lower predetermined pressure Prf(off) is kept in step S43e, and, when it exceeds delay time Tcd, the a calculation for increasing the relief pressure Prf in response to the count number is executed in step S43f. A correction coefficient Ck used in the calculation is set, as shown in FIG. 34, so that the steeper the incline angle is, the smaller the Ck is, that is, the more slowly the relief pressure Prf increases (namely, the more slowly the creep force decreases). The linear solenoid valve 210 is controlled so as to obtain the relief pressure Prf determined as described above.

According to this control, when the upward incline angle of the road surface is steeper, the creep force after the brake pedal being depressed is set to be larger and the delay time, which is a holding time thereof, is set to be longer, and, after the delay time having passed, the creep force is decreased more slowly when the upward incline angle is steeper, so that the vehicle can be prevented effectively from running into the reverse direction on the road with an incline angle.

(2-4) D-R switching control

During garage parking operation, for example, the shift range may be changed from D-range to R-range (D-R) for expected backward running while the vehicle still running forward, and also may be changed in opposite direction (R-D) while the vehicle still running backward. As regards the gear train of this transmission 10 at that time, though the manual valve 208 passes through the N-range position while moving between D-range and the R-range, the low mode clutch 60 is kept in the engagement condition because of its short time.

The toroidal speed ration changes under this condition crossing the geared neutral, that is, at that time, the toroidal speed ratio is controlled to change the rotation speed of the sun gear 52 so that the internal gear 53 and the secondary shaft 13 are rotated in the opposite direction to that of the current one. Since a large force is required to incline the roller 23, 33 of the continuously variable transmission mechanism 20, 30 with respect to the disk 21, 22, 31, 32 in such manner as described above, there exists, as a result, a possibility of making slip and damage on the roller 23, 33, disk 21, 22, 31, 32 and the like.

Figure 36:
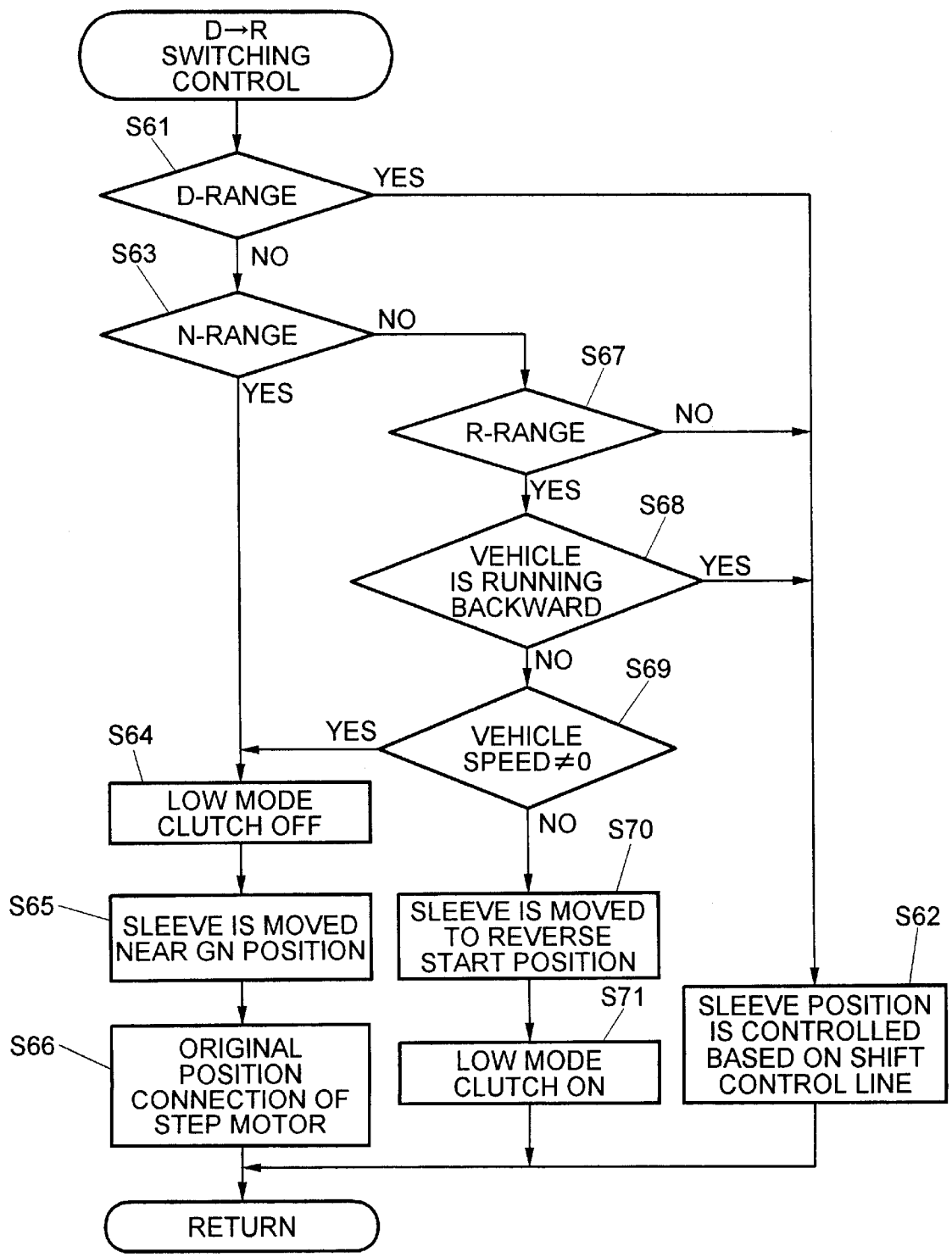
FIG. 36 is a flow chart of the switching control implemented by said control unit.

To cope with this problem, the control unit 300 implements a control according to the flow chart shown in FIG. 36 in order not to apply high load onto the continuously variable transmission mechanism 20, 30 during the switching control between the forward and the backward running.

When the range is judged to be in D-range in step S61, a normal three-layers valve control is applied by the sleeve movement based on the shift diagram (shift map), for example, shown in FIG. 18 in step S62, and, when the range is not in D-range in step S61 and is in N-range in step S63, the low mode clutch 60 is disengaged in step 64, and the sleeves 222 of the three-layers valve 220 is moved to the position close to the geared neutral in step S65, and then a original position correction of the step motor 251 is implemented in step S66. The reason why the sleeve 222 is not moved to the geared neutral position but to the position close to the geared neutral in step S65 is that it is difficult to move the sleeve 222 to the exact position of the geared neutral as described above, and it is needless to say that the sleeve may e moved to the geared neutral position (the position to which the sleeve 222 is moved in step 65 will be referred to as "reference position").

Thereby, in the N-range, the power transmission path is intercepted and the sleeve 222 is moved to the reference position, and, at that point, the original position correction of the step motor 251 is implemented again. The original position correction of the step motor 251 is implemented in the following procedure. At first, the toroidal speed ratio in the case where the sleeve 222 is in the reference position is calculated based on the detected values of the input rotation speed sensor 306 installed on the low mode clutch drum 61 and the output rotation speed sensor 307 installed on the second gear 92 of the high mode gear train 90. The pulse number when the sleeve 222 is moved to the reference position is set to the original position pulse number (for example, it is near 1360 in FIG. 17). The calculated actual speed ration of the toroidal is compared with the predetermined ideal speed ratio of the toroidal in the reference position, and the sleeve 222 is moved to the direction where the offset therebetween will be removed. The movement of the sleeve 222 is implemented under feed-forward control, and, after the sleeve 222 is moved by several pulses, the original position pulse number is replaced by this pulse number of the step motor 251.

Referring to FIG. 36 again, when the range is not in the D-range in step S61 and is not in N-range in step S63, it is judged whether it is in the R-range or not in step S67, and when it is NO, since it must be either of S-range or L-range, the step is progressed to step S62, and, when it is YES, it is judged whether the vehicle is running backward or not in Step 68. When the vehicle is running backward, the normal three-layers valve control is applied in step 62, and when it is NO, it is judged whether the vehicle speed is zero or not in step 69, and when YES, which means that the vehicle is running forward in a certain speed, each step of steps S64–66 which are implemented in the N-range is implemented. On the contrary, when it is NO in step S69, which means that the vehicle is at a stop with the R-range, the step is progressed to step 70, and the sleeve 222 of the three-layers valve 220 is moved to the reverse start position. More concretely, it is moved to a creep start position where the internal gear 53 and the secondary shaft 13 is rotated into the backward running direction. Then the low mode clutch 60 is engaged in step S71.

According to this control, when the switching to the R-range is operated during forward running condition, the step is progressed through the path of S61, S63, S67, S68, and S69, and, after the low mode clutch 60 is disengaged in step S64, the vehicle stop is confirmed in step S69, and then the sleeve is moved to the backward running direction in step 70, and the low mode clutch 60 is engaged in step S71, and thereby, the sun gear 52 of the planetary gear mechanism 50 rotates under light load while the low mode clutch 60 is disengaged, and, during this period, the roller 23 of the continuously variable transmission mechanism 20 is made to be inclined so as to change the rotation speed of the sun gear 52, so that the inclining motion can be implemented under low load, and thereby there exist no fear of causing the slip and damage on the roller 23, 33 and the disk 21, 22, 31, 32.

(2-5) R-D switching control

Figure 37:
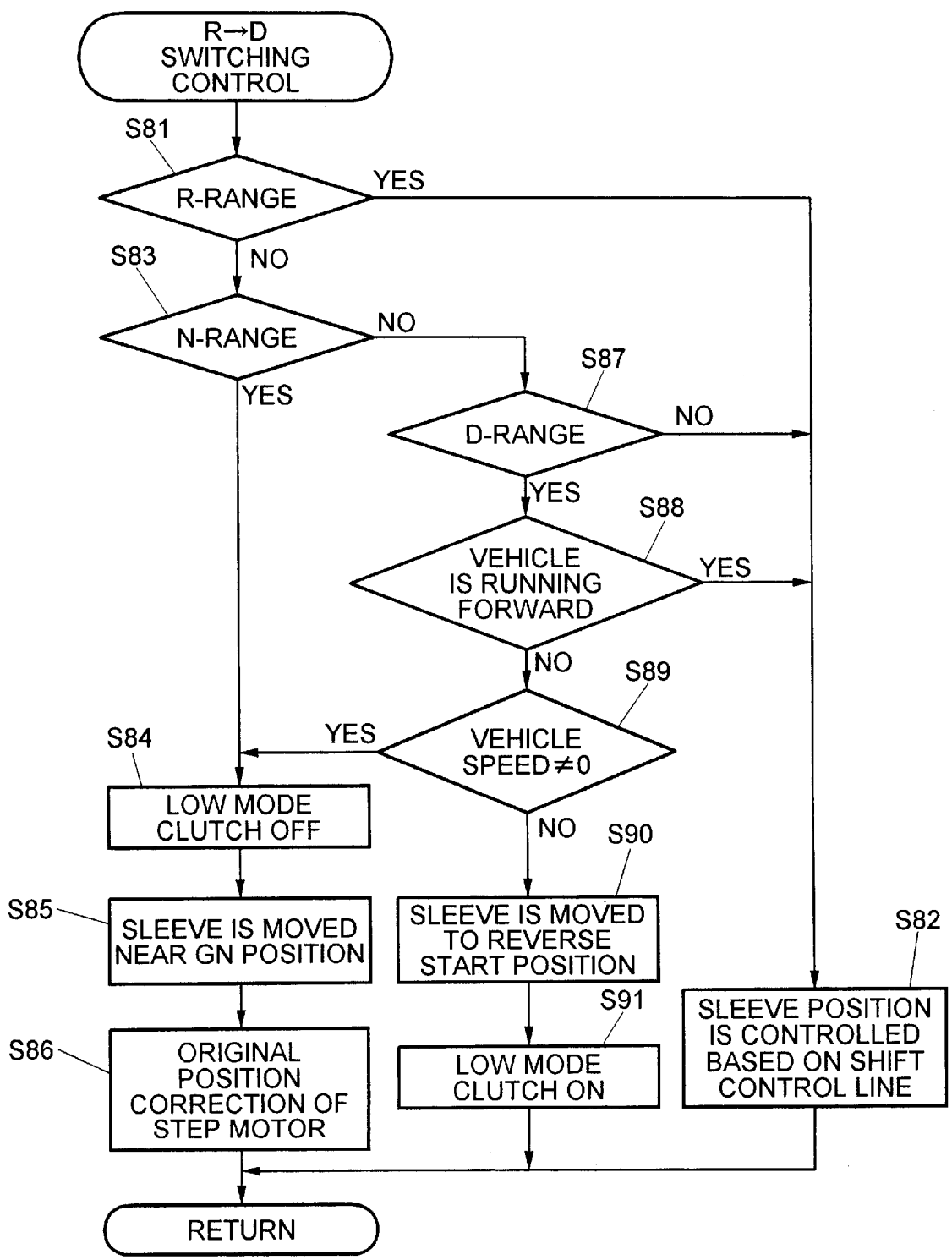
FIG. 37 is another flow chart of the switching control.

Though the flow chart shown in FIG. 36 represents the control of the D-R switching, the same method can be applied to the R-D control. The control flow thereof is shown in FIG. 37.

(2-6) Shift control during backward running

The continuously variable transmission 10 can control the toroidal speed ratio continuously, and, thereby, the final speed ratio can be arbitrarily changed from the geared neutral to either of forward or backward direction by changing the rotation speed of the sun gear 52. Therefore, though an infinite number of gear positions can be set for the backward running, a considerable caution is required while starting especially in the backward running, which is different from the case of the forward running which requires good accelerating ability from standstill.

Figure 38:
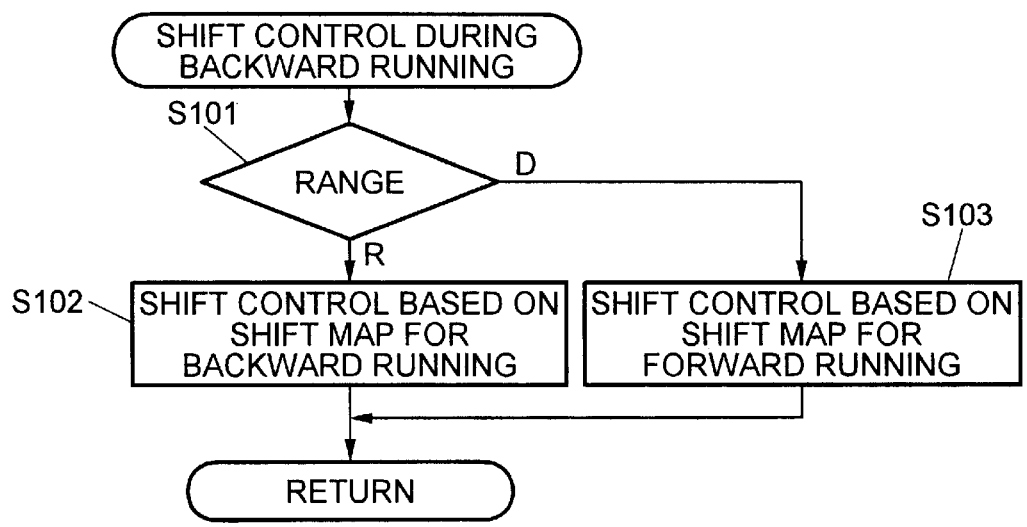
FIG. 38 is a flow chart of the shift control in reverse implemented by said control unit.

Then, the control unit 300 of this continuously variable transmission 10, as shown in FIG. 38, makes a shift control, when the range is in R-range in step S101, by the use of the shift map for backward running in step S102, and, when the range is in D-range in step S101, by the use of the shift map for forward running in step S103.

Figure 39:
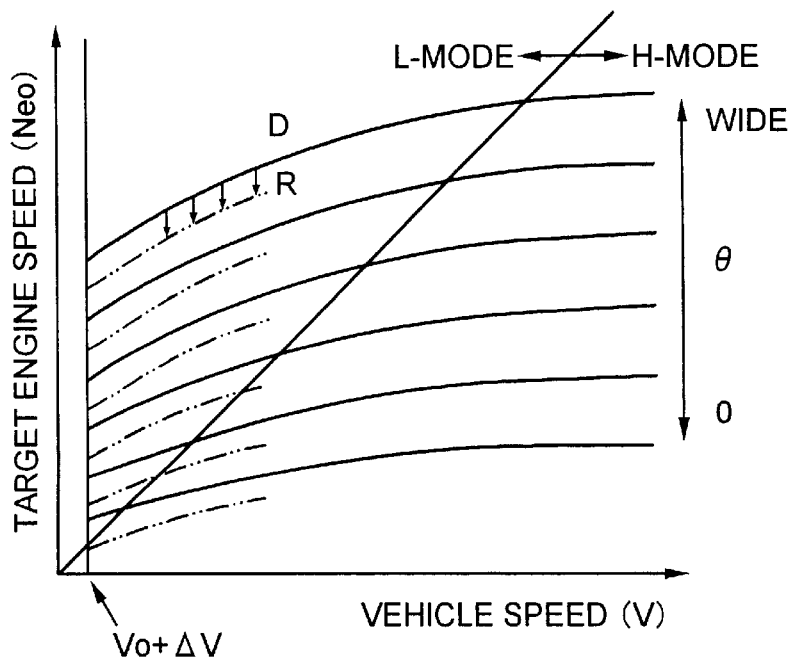
FIG. 39 is a shift-characteristic diagram of said shift control in reverse.

At that time, as shown in FIG. 39, the shift map for the backward running determines lower engine speed value as a target value Neo comparing with that for the forward running for the same vehicle speed V and the same throttle angle θ. In other words, the final speed ratio is shifted to the high speed side as a whole, and thereby too quick starting can be avoided in the backward running.

This characteristic of the shift for backward running may be applied only to the speed range lower than the predetermined one. At that time, the backward running in the same final speed ratio with that of the forward running is enable except the starting where a special caution is required.

FIG. 39 does not show the shift characteristic below a vehicle speed Vo+ΔV, which is used in judgment in the direct control, because this chart is made based on the time chart shown in FIG. 31 where the idle switch 308 is already in ON when the three-layers valve control is switched to the direct control, and thereby the creep control starts immediately, so that the normal shift control is not employed below the vehicle speed for judgement Vo+ΔV, that is, this kind of shift map is not used.

(2-7) Low mode/high mode switching control

As described with reference to FIG. 17, the low mode characteristic curve and the high node characteristic curve of the D-range cross each other in the predetermined pulse number of the toroidal speed ratio. This is represented by a mode switching line in the shift map shown in FIG. 18 or FIG. 39. That is, the low mode clutch 60 and the high mode clutch 70 are switched at a point where the final speed ratio of both modes coincide each other. Thereby, both modes can be switched each other without making shock due to sudden change in the final speed ratio.

Since the switching between both clutches 60, 70, however, takes a certain period of time, the vehicle running condition might not be on the mode switching line when the switching is completed, and, as a result, it may make a sudden change in speed ratio.

Figure 40:
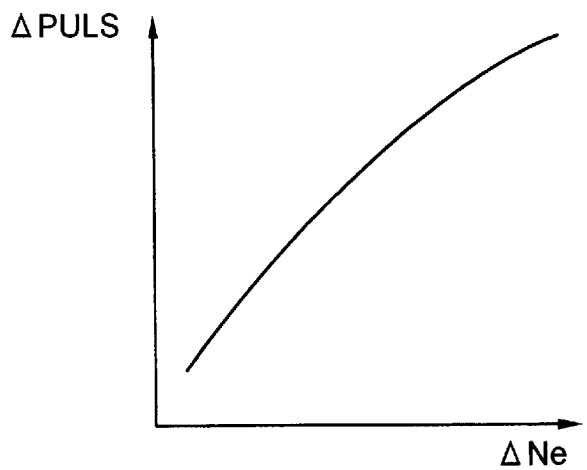
FIG. 40 is a flow chart of the mode-switching control implemented by said control unit.

To cope with this problem, the control unit 300 implements a mode switching control according to the flow chart shown in FIG. 40. At first in step S111, the control unit 300 judges whether or not the actual engine speed Ne detected by the engine speed sensor 302 is on the approach to the value determined by multiplying the final speed ratio Go of the mode switching line by the vehicle speed V detected by the vehicle speed sensor 302. That is, it judges whether the current final speed ratio is nearly equal to that on the mode switching line or not.

Figure 41:
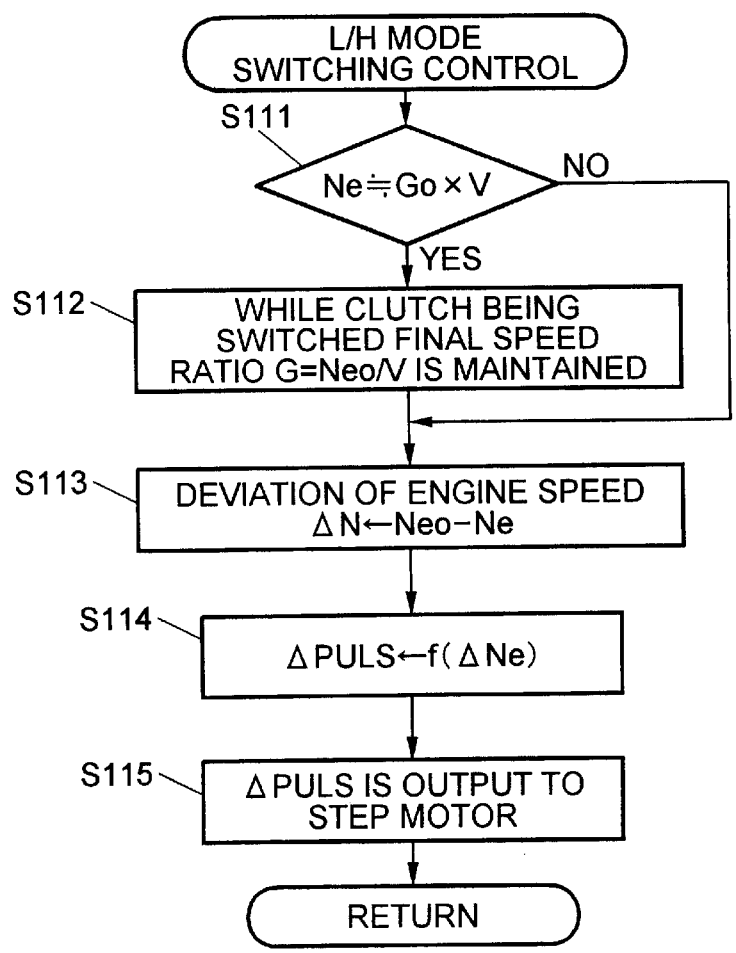
FIG. 41 is a characteristic diagram of said mode-switching control.

When it is YES, in step S112, the toroidal speed ratio is controlled so as for the current final speed ratio G to be kept while the clutches 60, 70 being switched. Then in step S113, a deviation ΔN of the actual engine speed Ne from the target engine speed Neo required to keep the current final speed ratio G is calculated, and, in step 114, a feedback value ΔPLUS of the pulse PULSE is determined from the map shown in FIG. 41 which is set so as for the engine speed deviation ΔN to be made zero, and finally in step S115, the feedback value ΔPLUS is outputted to the step motor 251.

Thereby, the position of the sleeve 222 of the three-layers valve 220 is feedback-controlled, the engine speed deviation ΔN is made to be zero, and, as a result, the final speed ratio is fixed to a constant value. Since the modes are switched during this period, there is no change in speed ratio before and after switching modes, so that, the modes can be switched smoothly without shock.

According to the present invention, since, in the toroidal type continuously variable transmission for the front engine front wheel drive vehicle, which employs geared neutral system, the gear train which transmits the rotation to the second shaft side on which the planetary gear mechanism is mounted is disposed on the opposite side end, with respect to the engine, and the first shaft on which the continuously variable transmission mechanism is mounted, this gear train can be prevented from interfering with the differential gear unit, which is engaged with the engine side ends of the second shaft, or the power transmission mechanism to said unit. Therefore, the length in the axial direction of the transmission can be made shorter comparing with the case where the gear train is disposed with an offset from the differential gear unit and the like in the axial direction, so that the mounting operation to a vehicle body as well as a layout design of the transmission can be improved.

According especially to the fourth invention of the present invention, since, in the construction where two continuously variable transmission mechanism are disposed on the first shaft, the loading mechanism interposed between the first shaft and the input portion of these continuously variable mechanisms is disposed on the opposite side end, with respect to the engine, of the first shaft as the above gear train, the circulating torque which is generated by the planetary gear mechanism on the second shaft and is circulated back to the first shaft side under the geared neutral or the low mode condition is not transmitted to the first shaft, so that the first shaft is required no more than to have a diameter or the strength for transmitting the torque from the engine, and, as a result, the transmission is allowed to be made with lower cost, to be compact, and to have an improved durability and a lighter weight, and, at the same time, the vibration and the noise on the vehicle can be reduced since the vibration from the engine can be effectively absorbed due to the reduced rigidity of the first shaft.

What is claimed is:

1. A toroidal continuously variable transmission comprising:

a first shaft whose one end is coupled with an engine;

a second shaft which is disposed in parallel with said first shaft and whose engine side end is coupled with a differential gear unit for driving a left and a right driven wheels;

a toroidal continuously variable transmission mechanism, disposed on said first shaft, including an input disk coupled with said first shaft, an output disk which is disposed on an engine side of said input disk and is rotatably supported on the first shaft, a roller interposed between said both disks for transmitting power therebetween, and a contact point control member which inclinable supports said roller and varies a speed ratio between both disks by changing contact points between said roller and said input and said output disk;

a planetary gear mechanism, disposed on said second shaft, including three rotary elements of a sun gear, an internal gear and a pinion carrier in which among these rotary elements, the first element is coupled with said output disk of said continuously variable transmission mechanism so as to rotate together therewith and the second element is coupled with the second shaft;

a gear train including a first gear which is disposed on the first shaft at an opposite side, with respect to the engine, of the continuously variable transmission mechanism for a rotatable movement together with the first shaft, a second gear which is rotatably supported on the second shaft at an opposite side, with respect to the engine, of the planetary gear mechanism, and an idle gear which is engaged with said first and said second gears to transmit a power therebetween;

a first clutch mechanism for engaging or disengaging said second gear of said gear train with the third element of the planetary gear mechanism;

a power transmission path for transmitting a driving torque from said output disk to the second shaft without passing it through said planetary gear mechanism;

a second clutch mechanism for engaging or disengaging said power transmission path; and a control unit for controlling an operation of said contact point control member, said first clutch mechanism, and said second clutch mechanism.

2. A toroidal continuously variable transmission as recited in claim 1 further comprising a vehicle speed sensor, wherein said control unit controls said first clutch mechanism so as to engage said second gear with said third element and controls said second clutch mechanism so as to disengage said power transmission path when a vehicle speed is lower than a predetermined vehicle speed, and, on the other hand, controls said first clutch mechanism so as to disengage said second gear from said third element and controls said second clutch mechanism so as to engage said power transmission path when the vehicle speed is higher than the predetermined vehicle speed.

3. A toroidal continuously variable transmission as recited in claim 2 further comprising an engine load detector, wherein said predetermined vehicle speed is set to be higher as an engine load is increased.

4. A toroidal continuously variable transmission as recited in claim 1, wherein said toroidal continuously variable transmission mechanism further comprises, in addition to a first continuously variable transmission mechanism comprising the input disk coupled with the first shaft, the output disk which is disposed on an engine side of said input disk and is rotatable supported on the first shaft, the roller interposed between said both disks, and the contact point control member for changing contact points between said roller and said input or said output disk, a second continuously variable transmission mechanism comprising a second output disk which is disposed on an engine side of the output disk of said first continuously variable transmission mechanism and is rotatably supported on the first shaft, a second input disk which is disposed on the engine side of said second output disk and is coupled with the first shaft, a second roller interposed between said both second disks, and a second contact point control member for changing contact points between said second roller and said input and said output disk, wherein the output disk of said first continuously transmission mechanism and the output disk of said second continuously transmission mechanism are integrated into one unit and a gear is formed on an outer surface of said integrated output disk unit for engaging and rotating said integrated output disk together with the first element of the planetary gear mechanism with each other.

5. A toroidal continuously variable transmission as recited in claim 4, wherein said toroidal continuously variable transmission mechanism further comprises, in addition to said first continuously variable transmission mechanism comprising the input disk coupled with the first shaft, the output disk which is disposed on an engine side of said input disk and is rotatably supported on the first shaft; the roller interposed between said both disks, and the contact point control member for changing contact points between said roller and said input or said output disk, the second continuously variable transmission mechanism comprising the second output disk which is disposed on the engine side of the output disk of said first continuously variable transmission mechanism and is rotatably supported on the first shaft integrally with said second output disk, the second input disk which is disposed on the engine side of said second output disk and is coupled with the first shaft, the second roller interposed between said both second disks, and the second contact point control member for changing contact points between said second roller and said input and said output disk, wherein said first shaft is inserted into a third shaft having a through-hole therein, and each of the input and the output disks of said first and said second continuously variable transmission mechanisms is disposed on said third shaft, one end of said third shaft being supported by a transmission case through a bearing, the other end of said third shaft being fitted into the first gear of the gear train, said first gear being supported by a transmission case through a bearing, and a spring member is interposed in a fitting portion of said third shaft and the first gear for absorbing an axial relative displacement therebetween.

6. A toroidal continuously variable transmission as recited in claim 4, wherein said toroidal continuously variable transmission mechanism further comprises, in addition to said continuously variable transmission mechanism comprising the input disk coupled with the first shaft, the output disk which is disposed on an engine side of said input disk and is rotatably supported on the first shaft, the roller interposed between said both disks, and the contact point control member for changing contact points between said roller and said input or said output disk, the second continuously variable transmission comprising the second output disk which is disposed on the engine side of the output disk of said first continuously variable transmission mechanism and is rotatably supported on the first shaft, the second input disk which is disposed on the engine side of said second output disk and is coupled with the first shaft, the second roller interposed between said both second disks, and the second contact point control member for changing contact points between said second roller and said input and said output disk, wherein said first shaft is inserted into a third shaft having a through-hole therein, and the output disks of the first and the second continuously variable transmission mechanism are integrally and rotatably supported on a middle of said third shaft, and the input disks of the second and the first continuously variable transmission mechanisms are respectively disposed on the engine side and the opposite side, with respect to the engine, of said output disks and are coupled with said third shaft, and a loading mechanism for pressing the rollers by and between the input and the output disks in the first and the second continuously variable transmission mechanisms is disposed between the input disk of the first continuously variable transmission mechanism and the first gear of the gear train disposed on the opposite side thereof with respect to the engine.

7. A toroidal continuously variable transmission as recited in claim 6, wherein said loading mechanism comprises a pair of disks whose surfaces facing with each other are formed into cam surfaces having circumferential concave and convex shapes, and a roller which is interposed between both disks to generate axial force between them by a relative rotation therebetween, and a pin member is interposed between the first gear of the gear train and the disk located in said first gear side to integrally rotate them, said pin member being disposed in a portion where a thickness of the disk located in said first gear side is rather thicker due to the concave and convex figures thereof.

8. A toroidal continuously variable transmission as recited in claim 1, wherein two oil channels for supplying the first clutch mechanism and the second clutch mechanism with a coupling fluid respectively are provided in the second shaft, and said both oil channels are led from a side portion where a hydraulic pressure source is provided.

* * * * *